US010425635B2

(12) United States Patent
Woodgate et al.

(10) Patent No.: US 10,425,635 B2
(45) Date of Patent: Sep. 24, 2019

(54) WIDE ANGLE IMAGING DIRECTIONAL BACKLIGHTS

(71) Applicant: RealD Spark, LLC, Beverly Hills, CA (US)

(72) Inventors: Graham J. Woodgate, Henley-on-Thames (GB); Michael G. Robinson, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 110 days.

(21) Appl. No.: 15/599,189

(22) Filed: May 18, 2017

(65) Prior Publication Data

US 2017/0339398 A1   Nov. 23, 2017

Related U.S. Application Data

(60) Provisional application No. 62/340,382, filed on May 23, 2016.

(51) Int. Cl.
*G06F 3/038* (2013.01)
*G09G 5/00* (2006.01)
(Continued)

(52) U.S. Cl.
CPC .......... *H04N 13/32* (2018.05); *G02B 6/0076* (2013.01); *G02B 27/2264* (2013.01);
(Continued)

(58) Field of Classification Search
CPC .... H04N 13/32; H04N 13/366; H04N 13/368; H04N 13/376; H04N 13/312;
(Continued)

(56) References Cited

U.S. PATENT DOCUMENTS 1,128,979 A   2/1915   Hess
1,970,311 A   8/1934   Ives
(Continued)

FOREIGN PATENT DOCUMENTS

CN   1142869 A    2/1997
CN   1377453 A   10/2002
(Continued)

OTHER PUBLICATIONS

International Search Report and Written Opinion dated Aug. 8, 2017 for International Patent Application No. PCT/US2017/033365.
(Continued)

*Primary Examiner* — Trang U Tran
(74) *Attorney, Agent, or Firm* — Penny L. Lowry; Neil G. J. Mothew

(57) ABSTRACT

An imaging directional backlight apparatus including a waveguide, a light source array, for providing large area directed illumination from localized light sources. The waveguide may include a stepped structure, in which the steps may further include extraction features optically hidden to guided light, propagating in a first forward direction. Returning light propagating in a second backward direction may be refracted, diffracted, or reflected by the features to provide discrete illumination beams exiting from the top surface of the waveguide. Viewing windows are formed through imaging individual light sources by waveguide facets and rear reflector images in cooperation. Viewing windows may be provided at first and second different window planes to improve uniformity in a lateral direction. Further, stray light may be reduced by inner and outer portions of reflective facets with different inclinations for the rear reflector.

26 Claims, 57 Drawing Sheets

(51) Int. Cl.
  *H04N 13/32* (2018.01)
  *H04N 13/366* (2018.01)
  *F21V 8/00* (2006.01)
  *G02B 27/22* (2018.01)
  *G09G 3/00* (2006.01)
  *H04N 13/30* (2018.01)

(52) U.S. Cl.
  CPC ........... *G09G 3/003* (2013.01); *H04N 13/366* (2018.05); *G02B 6/0038* (2013.01); *G02B 6/0048* (2013.01); *G02B 6/0055* (2013.01); *G02B 6/0068* (2013.01); *H04N 2013/405* (2018.05)

(58) Field of Classification Search
  CPC .... H04N 2013/405; G06F 3/038; G02B 6/00; G02B 6/0068; G02B 6/0076; G02B 27/2264; G09G 3/003; G09G 5/00
  USPC .............................. 345/207; 348/51; 362/609
  See application file for complete search history.

(56) References Cited

U.S. PATENT DOCUMENTS

| | | | |
|---|---|---|---|
| 2,133,121 A | 10/1938 | Stearns | |
| 2,247,969 A | 7/1941 | Lemuel | |
| 2,480,178 A | 8/1949 | Zinberg | |
| 2,810,905 A | 10/1957 | Barlow | |
| 3,409,351 A | 11/1968 | Winnek | |
| 3,715,154 A | 2/1973 | Bestenreiner | |
| 4,057,323 A | 11/1977 | Ward | |
| 4,528,617 A | 7/1985 | Blackington | |
| 4,542,958 A | 9/1985 | Young | |
| 4,804,253 A | 2/1989 | Stewart | |
| 4,807,978 A | 2/1989 | Grinberg et al. | |
| 4,829,365 A | 5/1989 | Eichenlaub | |
| 4,914,553 A | 4/1990 | Hamada et al. | |
| 5,050,946 A | 9/1991 | Hathaway et al. | |
| 5,278,608 A | 1/1994 | Taylor et al. | |
| 5,347,644 A | 9/1994 | Sedlmayr | |
| 5,349,419 A | 9/1994 | Taguchi et al. | |
| 5,459,592 A | 10/1995 | Shibatani et al. | |
| 5,466,926 A | 11/1995 | Sasano et al. | |
| 5,510,831 A | 4/1996 | Mayhew | |
| 5,528,720 A | 6/1996 | Winston et al. | |
| 5,581,402 A | 12/1996 | Taylor | |
| 5,588,526 A | 12/1996 | Fantone et al. | |
| 5,697,006 A | 12/1997 | Taguchi et al. | |
| 5,703,667 A | 12/1997 | Ochiai | |
| 5,727,107 A | 3/1998 | Umemoto et al. | |
| 5,771,066 A | 6/1998 | Bamea | |
| 5,796,451 A | 8/1998 | Kim | |
| 5,808,792 A | 9/1998 | Woodgate et al. | |
| 5,875,055 A | 2/1999 | Morishima et al. | |
| 5,896,225 A | 4/1999 | Chikazawa | |
| 5,903,388 A | 5/1999 | Sedlmayr | |
| 5,933,276 A | 8/1999 | Magee | |
| 5,956,001 A | 9/1999 | Sumida et al. | |
| 5,959,664 A | 9/1999 | Woodgate | |
| 5,969,850 A | 10/1999 | Harrold et al. | |
| 5,971,559 A | 10/1999 | Ishikawa et al. | |
| 6,008,484 A | 12/1999 | Woodgate et al. | |
| 6,014,164 A | 1/2000 | Woodgate et al. | |
| 6,023,315 A | 2/2000 | Harrold et al. | |
| 6,055,013 A | 4/2000 | Woodgate et al. | |
| 6,061,179 A | 5/2000 | Inoguchi et al. | |
| 6,061,489 A | 5/2000 | Ezra et al. | |
| 6,064,424 A | 5/2000 | Berkel et al. | |
| 6,075,557 A | 6/2000 | Holliman et al. | |
| 6,094,216 A | 7/2000 | Taniguchi et al. | |
| 6,108,059 A | 8/2000 | Yang | |
| 6,118,584 A | 9/2000 | Berkel et al. | |
| 6,128,054 A | 10/2000 | Schwarzenberger | |
| 6,172,723 B1 | 1/2001 | Inoue et al. | |
| 6,199,995 B1 | 3/2001 | Umemoto et al. | |
| 6,224,214 B1 | 5/2001 | Martin et al. | |
| 6,232,592 B1 | 5/2001 | Sugiyama | |
| 6,256,447 B1 | 7/2001 | Laine | |
| 6,262,786 B1 | 7/2001 | Perlo et al. | |
| 6,295,109 B1 | 9/2001 | Kubo et al. | |
| 6,302,541 B1 | 10/2001 | Grossmann | |
| 6,305,813 B1 | 10/2001 | Lekson et al. | |
| 6,373,637 B1 | 4/2002 | Gulick et al. | |
| 6,377,295 B1 | 4/2002 | Woodgate et al. | |
| 6,422,713 B1 | 7/2002 | Fohl et al. | |
| 6,454,452 B1 * | 9/2002 | Sasagawa | G02B 6/0061 349/65 |
| 6,456,340 B1 | 9/2002 | Margulis | |
| 6,464,365 B1 | 10/2002 | Gunn et al. | |
| 6,476,850 B1 | 11/2002 | Erbey | |
| 6,654,156 B1 | 11/2003 | Crossland et al. | |
| 6,663,254 B2 | 12/2003 | Ohsumi | |
| 6,724,452 B1 | 4/2004 | Takeda et al. | |
| 6,731,355 B2 | 5/2004 | Miyashita | |
| 6,736,512 B2 | 5/2004 | Balogh | |
| 6,798,406 B1 | 9/2004 | Jones et al. | |
| 6,801,243 B1 | 10/2004 | Berkel | |
| 6,816,158 B1 | 11/2004 | Lemelson et al. | |
| 6,825,985 B2 | 11/2004 | Brown et al. | |
| 6,847,488 B2 | 1/2005 | Travis | |
| 6,859,240 B1 | 2/2005 | Brown et al. | |
| 6,867,828 B2 | 3/2005 | Taira et al. | |
| 7,001,058 B2 | 2/2006 | Inditsky | |
| 7,058,252 B2 | 6/2006 | Woodgate et al. | |
| 7,091,931 B2 | 8/2006 | Yoon | |
| 7,101,048 B2 | 9/2006 | Travis | |
| 7,136,031 B2 | 11/2006 | Lee et al. | |
| 7,192,175 B2 * | 3/2007 | Parikka | G02B 6/0031 359/566 |
| 7,215,391 B2 | 5/2007 | Kuan et al. | |
| 7,215,475 B2 | 5/2007 | Woodgate et al. | |
| 7,227,567 B1 | 6/2007 | Beck et al. | |
| 7,239,293 B2 | 7/2007 | Perlin et al. | |
| 7,365,908 B2 | 4/2008 | Dolgoff | |
| 7,375,886 B2 | 5/2008 | Lipton et al. | |
| 7,410,286 B2 | 8/2008 | Travis | |
| 7,430,358 B2 | 9/2008 | Qi et al. | |
| 7,492,346 B2 | 2/2009 | Manabe et al. | |
| 7,528,893 B2 | 5/2009 | Schultz et al. | |
| 9,235,057 B2 | 1/2016 | Robinson et al. | |
| 9,519,153 B2 | 12/2016 | Robinson et al. | |
| 10,012,782 B2 * | 7/2018 | Lee | G02B 6/0016 |
| 2001/0001566 A1 | 5/2001 | Moseley et al. | |
| 2001/0050686 A1 | 12/2001 | Allen | |
| 2002/0018299 A1 | 2/2002 | Daniell | |
| 2002/0113866 A1 | 8/2002 | Taniguchi et al. | |
| 2003/0117790 A1 | 6/2003 | Lee et al. | |
| 2003/0133191 A1 | 7/2003 | Morita et al. | |
| 2003/0137821 A1 | 7/2003 | Gotoh et al. | |
| 2004/0021809 A1 | 2/2004 | Sumiyoshi et al. | |
| 2004/0042233 A1 | 3/2004 | Suzuki et al. | |
| 2004/0046709 A1 | 3/2004 | Yoshino | |
| 2004/0066480 A1 | 4/2004 | Yoshida et al. | |
| 2004/0108971 A1 | 6/2004 | Waldern et al. | |
| 2004/0109303 A1 | 6/2004 | Olczak | |
| 2004/0135741 A1 | 7/2004 | Tomisawa et al. | |
| 2004/0170011 A1 | 9/2004 | Kim et al. | |
| 2004/0263968 A1 | 12/2004 | Kobayashi et al. | |
| 2004/0263969 A1 | 12/2004 | Lipton et al. | |
| 2005/0007753 A1 | 1/2005 | Hees et al. | |
| 2005/0094295 A1 | 5/2005 | Yamashita et al. | |
| 2005/0110980 A1 | 5/2005 | Maehara et al. | |
| 2005/0135116 A1 | 6/2005 | Epstein et al. | |
| 2005/0180167 A1 | 8/2005 | Hoelen et al. | |
| 2005/0190180 A1 | 9/2005 | Jin et al. | |
| 2005/0190345 A1 | 9/2005 | Dubin et al. | |
| 2005/0237488 A1 | 10/2005 | Yamasaki et al. | |
| 2005/0254127 A1 | 11/2005 | Evans et al. | |
| 2005/0264717 A1 | 12/2005 | Chien et al. | |
| 2005/0276071 A1 | 12/2005 | Sasagawa et al. | |
| 2005/0280637 A1 | 12/2005 | Ikeda et al. | |
| 2006/0002678 A1 | 1/2006 | Weber et al. | |
| 2006/0012845 A1 | 1/2006 | Edwards | |
| 2006/0056166 A1 | 3/2006 | Yeo et al. | |

(56) References Cited

U.S. PATENT DOCUMENTS

| | | |
|---|---|---|
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0267040 A1 | 11/2006 | Baek et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0279554 A1 | 12/2007 | Kowarz et al. |
| 2007/0279727 A1 | 12/2007 | Gandhi et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Benitez et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0115997 A1 | 5/2011 | Kim |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0292321 A1 | 12/2011 | Travis et al. |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Mich et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0106193 A1 | 5/2012 | Kim et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0327101 A1 | 12/2012 | Blixt et al. |
| 2012/0327172 A1 | 12/2012 | El-Saban et al. |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0156265 A1 | 6/2013 | Hennessy |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Facke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |

(56) References Cited

U.S. PATENT DOCUMENTS

| | | |
|---|---|---|
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0009508 A1 | 1/2014 | Woodgate et al. |
| 2014/0016354 A1 | 1/2014 | Lee et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0340728 A1 | 11/2014 | Taheri |
| 2014/0368602 A1 | 12/2014 | Woodgate et al. |
| 2015/0116212 A1 | 4/2015 | Freed et al. |
| 2015/0177447 A1 | 6/2015 | Woodgate et al. |
| 2015/0268479 A1 | 9/2015 | Woodgate et al. |
| 2015/0334365 A1 | 11/2015 | Tsubaki et al. |
| 2015/0339512 A1 | 11/2015 | Son et al. |
| 2016/0299281 A1 | 10/2016 | Robinson et al. |
| 2016/0349444 A1 | 12/2016 | Robinson et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102147079 A | 8/2011 |
| EP | 0653891 A1 | 5/1995 |
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 10-2011-0090611 A | 8/2011 |
| KR | 20120049890 A | 5/2012 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2007111436 A1 | 10/2007 |
| WO | 2011020962 A1 | 2/2011 |
| WO | 2012158574 A1 | 11/2012 |

OTHER PUBLICATIONS

International search report and written opinion of international searching authority for PCT application No. PCT/US2017/033365 dated Aug. 8, 2017.

3M™ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-EPFPRO&cpncode=37-7582919&srccode=cii_10191459#PO; Copyright 2007-2016.

Bahadur, "Liquid crystals applications and uses," World Scientific, vol. 1, pp. 178 (1990).

Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].

Cootes et al., "Active Appearance Models", IEEE Trans. Pattern Analysis and Machine Intelligence, 23(6):681-685, 2001.

Cootes et al., "Active Shape Models—Their Training and Application" Computer Vision and Image Understanding 61 (1):38-59 Jan. 1995.

Dalal et al., "Histogram of Oriented Gradients for Human Detection", Computer Vision and Pattern Recognition, pp. 386-893, 2005.

Drucker et al., "Support Vector Regression Machines", Advances in Neural Information Processing Systems 9, pp. 155-161, NIPS 1996.

Ho, "Random Decision Forests", Proceedings of the 3rd International Conference on Document Analysis and Recognition, Montreal, QC, pp. 278-282, Aug. 14-16, 1995.

Ian Sexton et al: "Stereoscopic and autostereoscopic display-systems", –IEEE Signal Processing Magazine, May 1, 1999 (May 1, 1999), pp. 85-99, XP055305471, Retrieved from the Internet: RL:http://ieeexplore.ieee.org/el5/79/16655/00768575.pdf [retrieved on Sep. 26, 2016].

Kalantar, et al. "Backlight Unit With Double Surface Light Emission," J. Soc. Inf. Display, vol. 12, Issue 4, pp. 379-387 (Dec. 2004).

Kononenko et al., "Learning to Look Up: Realtime Monocular Gaze Correction Using Machine Learning", Computer Vision and Pattern Recognition, pp. 4667-4675, 2015.

Languy et al., "Performance comparison of four kinds of flat nonimaging Fresnel lenses made of polycarbonates and polymethyl methacrylate for concentrated photovoltaics", Optics Letters, 36, pp. 2743-2745.

Lipton, "Stereographics: Developers' Handbook", Stereographic Developers Handbook, Jan. 1, 1997, XP002239311, p. 42-49.

Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].

Lowe' "Distinctive Image Features from Scale-Invariant Keypoints", International Journal of Computer Vision 60 (2), pp. 91-110, 2004.

Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].

Marjanovic, M.,"Interlace, Interleave, and Field Dominance," http://www.mir.com/DMG/interl.html, pp. 1-5 (2001).

Ozuysal et al., "Fast Keypoint recognition in Ten Lines of Code", Computer Vision and Pattern Recognition, pp. 1-8, 2007.

Tabiryan et al., "The Promise of Diffractive Waveplates," Optics and Photonics News, vol. 21, Issue 3, pp. 40-45 (Mar. 2010).

Travis, et al. "Backlight for view-sequential autostereo 3D", Microsoft E&DD Applied Sciences, (date unknown), 25 pages.

Travis, et al. "Collimated light from a waveguide for a display," Optics Express, vol. 17, No. 22, pp. 19714-19 (2009).

Viola and Jones, "Rapid Object Detection using a Boosted Cascade of Simple Features", pp. 1-9 CVPR 2001.

(56) References Cited

OTHER PUBLICATIONS

Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.

Zach et al., "A Duality Based Approach for Realtime TV-L1 Optical Flow", Pattern Recognition (Proc. DAGM), 2007, pp. 214-223.

* cited by examiner

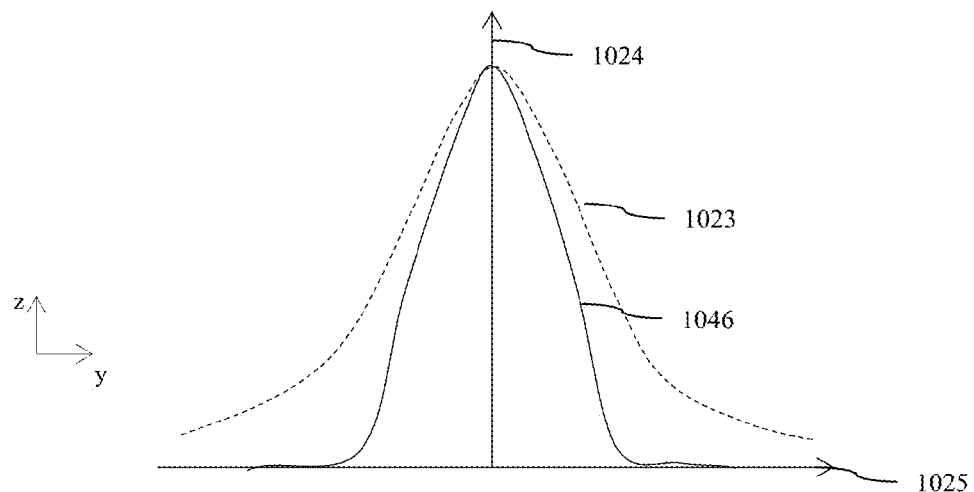
FIG. 48
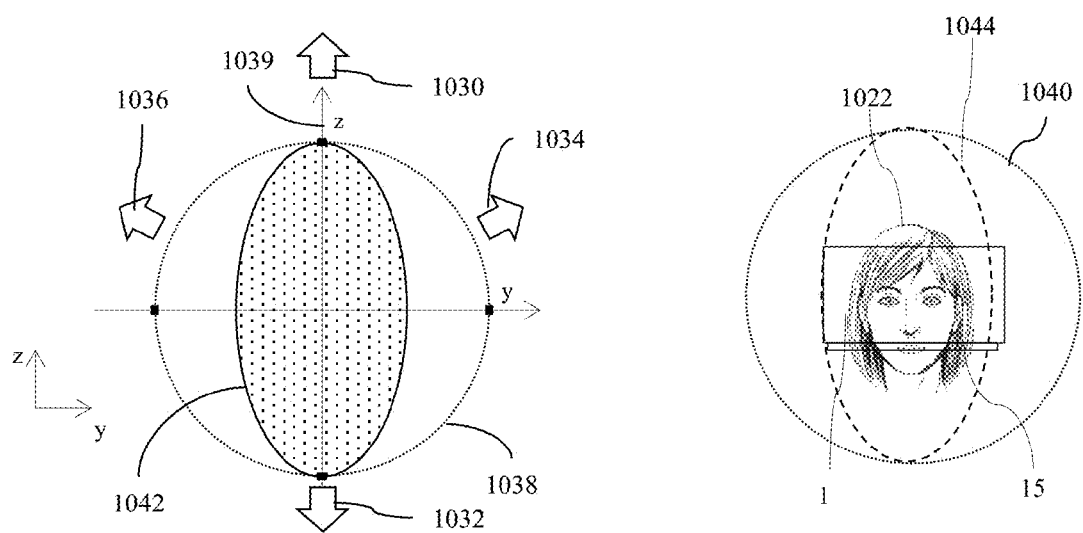
FIG. 49
FIG. 50

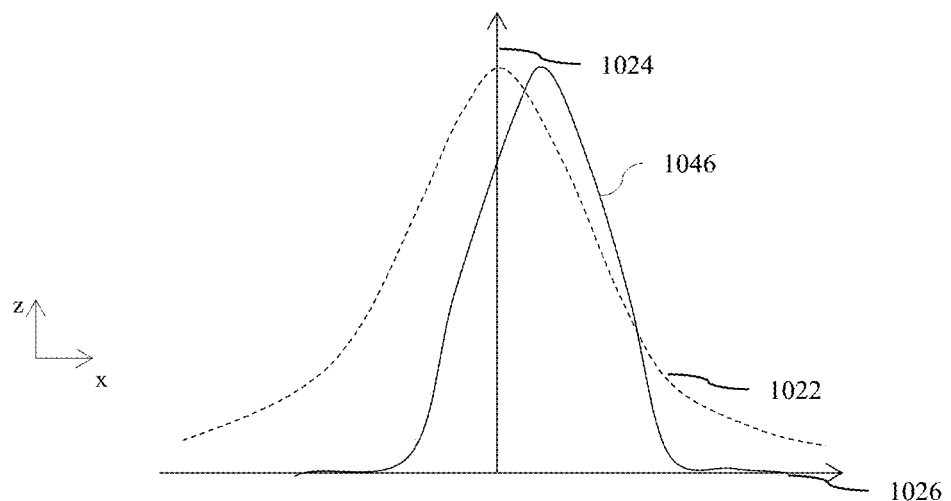
FIG. 51
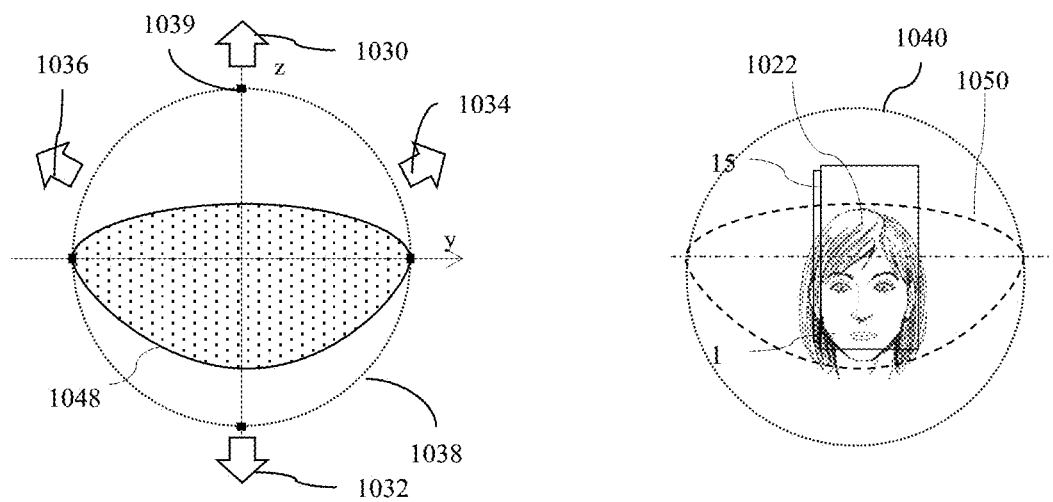
FIG. 52
FIG. 53

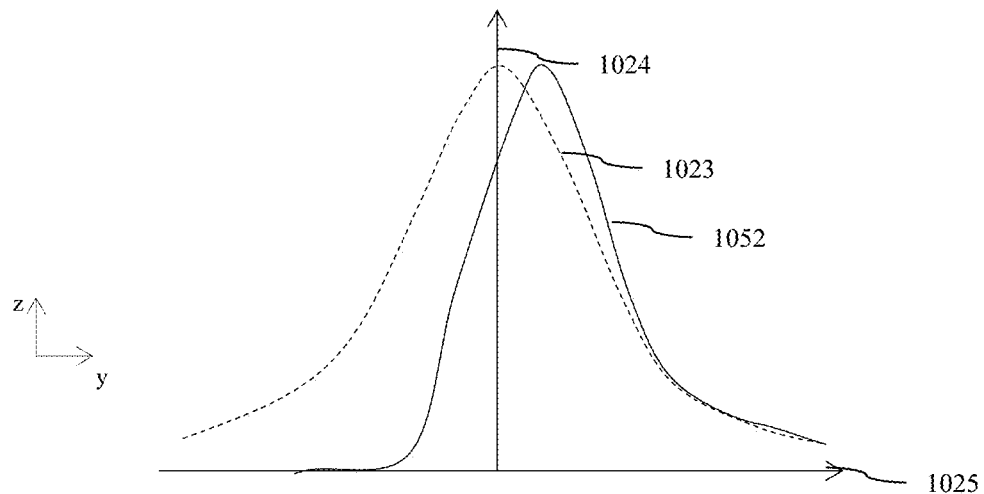
FIG. 54
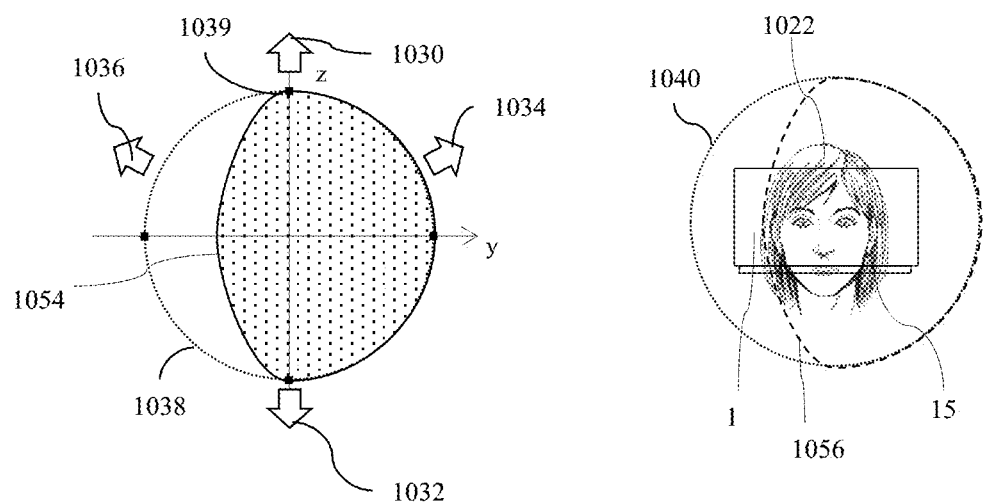
FIG. 55
FIG. 56

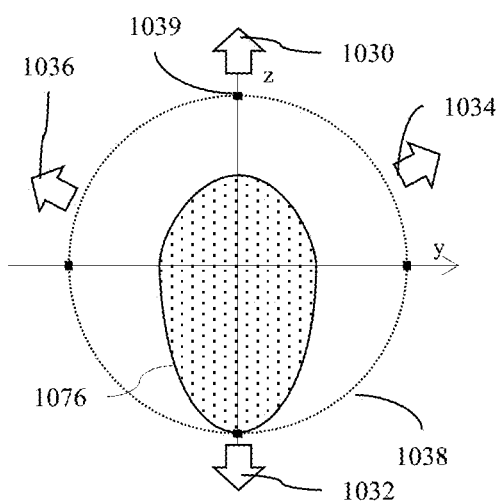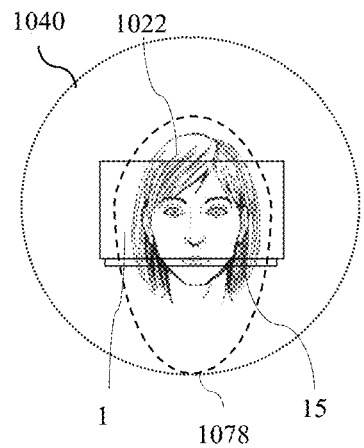
FIG. 67A                FIG. 67B
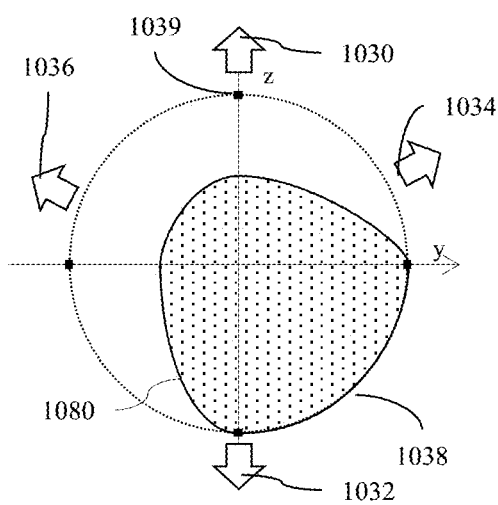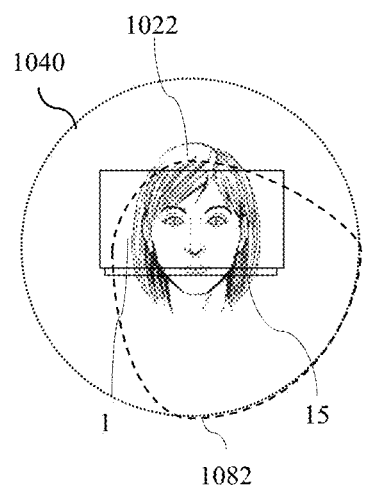
FIG. 68A                FIG. 68B

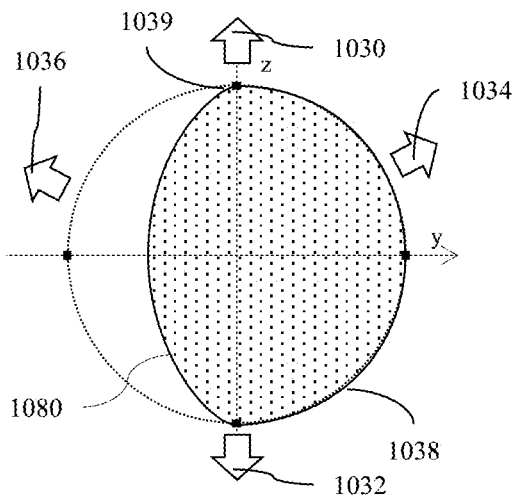
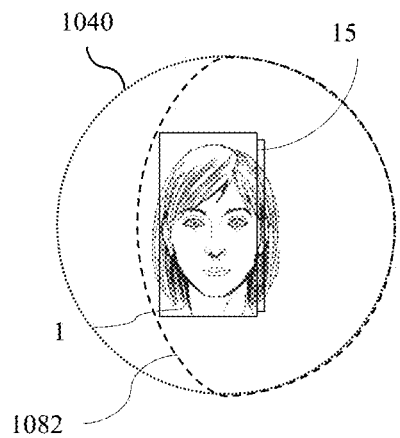
*FIG. 69A*  *FIG. 69B*
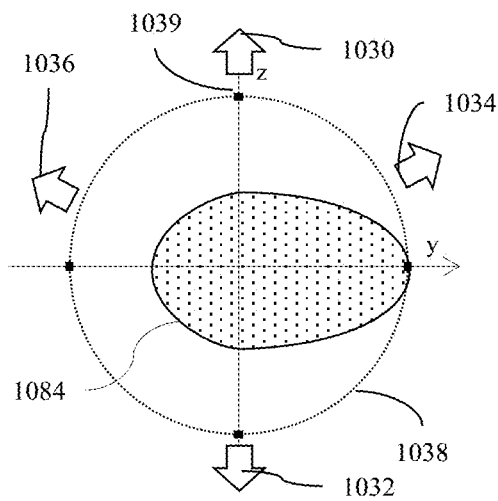
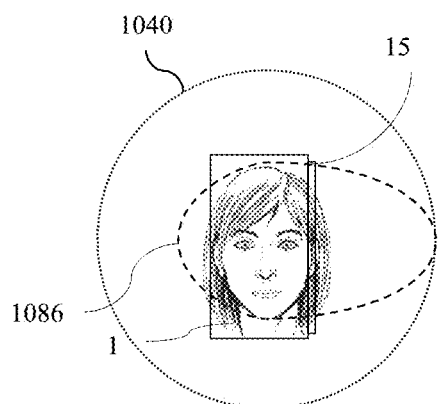
*FIG. 70A*  *FIG. 70B*

WIDE ANGLE IMAGING DIRECTIONAL BACKLIGHTS

TECHNICAL FIELD

This disclosure generally relates to illumination of light modulation devices, and more specifically relates to light guides for providing large area illumination from localized light sources for use in 2D, 3D, and/or autostereoscopic display devices.

BACKGROUND

Spatially multiplexed autostereoscopic displays typically align a parallax component such as a lenticular screen or parallax barrier with an array of images arranged as at least first and second sets of pixels on a spatial light modulator, for example an LCD. The parallax component directs light from each of the sets of pixels into different respective directions to provide first and second viewing windows in front of the display. An observer with an eye placed in the first viewing window can see a first image with light from the first set of pixels; and with an eye placed in the second viewing window can see a second image, with light from the second set of pixels.

Such displays have reduced spatial resolution compared to the native resolution of the spatial light modulator and further, the structure of the viewing windows is determined by the pixel aperture shape and parallax component imaging function. Gaps between the pixels, for example for electrodes, typically produce non-uniform viewing windows. Undesirably such displays exhibit image flicker as an observer moves laterally with respect to the display and so limit the viewing freedom of the display. Such flicker can be reduced by defocusing the optical elements; however such defocusing results in increased levels of image cross talk and increases visual strain for an observer. Such flicker can be reduced by adjusting the shape of the pixel aperture, however such changes can reduce display brightness and can comprise addressing electronics in the spatial light modulator.

BRIEF SUMMARY

According to the present disclosure, a directional illumination apparatus may include an imaging directional backlight for directing light, an illuminator array for providing light to the imaging directional backlight. The imaging directional backlight may include a waveguide for guiding light. The waveguide may include a first light guiding surface and a second light guiding surface, opposite the first light guiding surface.

Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. patent application Ser. No. 13/300,293 (now U.S. Pat. No. 9,519,153), which is herein incorporated by reference in its entirety.

Directional backlights provide illumination through a waveguide with directions within the waveguide imaged to viewing windows. Diverging light from light sources at the input end and propagating within the waveguide is provided with reduced divergence, and typically collimated, by a curved reflecting mirror at a reflecting end of the waveguide and is imaged towards a viewing window by means of curved light extraction features or a lens such as a Fresnel lens. For the on-axis viewing window, the collimated light is substantially parallel to the edges of a rectangular shaped waveguide and so light is output across the entire area of the waveguide towards the viewing window. For off-axis positions, the direction of the collimated light is not parallel to the edges of a rectangular waveguide but is inclined at a non-zero angle. Thus a non-illuminated (or void) outer portion (that may be triangular in shape) is formed between one edge of the collimated beam and the respective edge of the waveguide. Ideally, no light is directed to the respective viewing window from within the outer portion and the display will appear dark in this region. It would be desirable to reduce the appearance of the dark outer portions for off-axis viewing positions so that more of the area of the waveguide can be used to illuminate a spatial light modulator, advantageously reducing system size and cost.

In general with this and related imaging directional backlight systems, not all the backlight area may be useable due to vignetting at high angles. Modification of the system may overcome this limitation by introducing light into regions that are void. Such modified illumination apparatus embodiments may lead to increased brightness, local independent illumination and directional capabilities.

According to a first aspect of the present disclosure there may be provided a directional backlight comprising: a waveguide; an array of light sources arranged to input light into the waveguide at different input positions laterally across the waveguide, wherein the waveguide comprises first and second, opposed guide surfaces for guiding input light along the waveguide, the first guide surface being arranged to guide light by total internal reflection, and the second guide surface comprising: (a) a plurality of extraction features that are (i) arranged to reflect some of the input light so as to output it from the waveguide through the first guide surface and (ii) laterally curved to have positive optical power laterally so that the input light reflected from the extraction features laterally forms real images of the light sources in front of the directional backlight in a first window plane that provide viewing windows, the extraction features also transmitting some of the input light; and (b) intermediate regions between the extraction features that are arranged to guide light by total internal reflection; and a rear reflector comprising a linear array of reflective facets that are (i) arranged to reflect at least some of the input light that is transmitted through the extraction features of the waveguide, so as to direct it back through the waveguide to exit through the first guide surface, and (ii) laterally curved to have optical power laterally so that the input light reflected from the reflective facets laterally forms images of the light sources in a second window plane that is separated from the first window plane.

In comparison to displays providing a single window plane, advantageously lateral uniformity may be improved for an observer moving in a lateral direction and not at the window plane. Further streak and other artifacts in the display may have reduced luminance and thus lower visibility.

The images formed from the input light reflected from the reflective facets may be real images of the light sources in front of the directional backlight that provide further viewing windows. The second window plane may be closer to the directional backlight than the first window plane. The second window plane may be further from the directional backlight than the first window plane. The images formed from the input light reflected from the reflective facets may be virtual images of the light sources behind the directional backlight.

Advantageously a rear reflector with linear facets may be used, to achieve lower cost and reduced Moiré.

The waveguide further comprises a reflective end, the light sources being arranged to input light into the waveguide towards the reflective end, the reflective end being arranged to reflect the input light back along the waveguide, the extraction features being arranged to reflect some of the input light after reflection from the reflective end. The waveguide may further comprise a rear end opposite to the reflective end, and side surfaces between the first and second guide surfaces. The array of light sources is arranged along the rear end.

The light sources may include light sources arranged along a said side surface, and the reflective end may comprise first and second facets alternating with each other laterally, the first facets being reflective and forming reflective facets of a Fresnel reflector having positive optical power laterally, the second facets forming draft facets of the Fresnel reflector, the Fresnel reflector having an optical axis that is inclined towards said side surface in a direction in which the Fresnel reflector deflects input light from the array of light sources into the waveguide. The reflective end may have positive optical power laterally. The reflective end may be a Fresnel reflector. The rear reflector may further comprise intermediate facets extending between the reflective facets of the rear reflector and inclined in opposite senses from the reflective facets of the rear reflector so that pairs of a reflective facet and an intermediate facet together form corner facets arranged to reflect at least some of the input light that is incident thereon.

Advantageously a directional display may be provided with comfortable viewing characteristics for moving observers not at a single window plane, and achieving directional illumination for privacy, night operation, autostereoscopic, bright sunlight as well as wide angle modes of operation.

According to a second aspect of the present disclosure there may be provided a directional display device comprising: a directional backlight according to the first aspect; and a transmissive spatial light modulator arranged to receive the output light from the waveguide and to modulate it to display an image.

According to a third aspect of the present disclosure there may be provided a directional display apparatus comprising a directional display device according to the second aspect and a control system arranged to control the light sources.

According to a fourth aspect of the present disclosure there may be provided a directional backlight comprising: a waveguide; an array of light sources arranged to input light into the waveguide at different input positions laterally across the waveguide, wherein the waveguide comprises first and second, opposed guide surfaces for guiding input light along the waveguide, the first guide surface being arranged to guide light by total internal reflection, and the second guide surface comprising: (a) a plurality of extraction features that are (i) arranged to reflect some of the input light so as to output it from the waveguide through the first guide surface, the extraction features also transmitting some of the input light; and (b) intermediate regions between the extraction features that are arranged to guide light by total internal reflection; and a rear reflector comprising a linear array of pairs of reflective corner facets that are arranged to reflect at least some of the input light that is transmitted through the extraction features of the waveguide, so as to direct it back through the waveguide to exit through the first guide surface, wherein each pair of reflective corner facets includes a first facet on which light transmitted through the extraction features of the waveguide is incident and second facet, each first facet comprising an outer portion and an inner portion with different inclinations.

Advantageously light streaks for light that is passing from the input side towards the reflective end may be reduced in visibility. Uniformity of privacy mode of operation may be improved for off-axis viewing positions.

The inner portion may have a shallower inclination than the outer portion. The inner portion of the first facet and the second facet may have an internal angle in a range from 85 to 95 degrees and preferably from 89.5 to 90.5 degrees. The first facets may be laterally curved to have optical power laterally so that the input light reflected from the reflective facets laterally forms images of the light sources in a second window plane that is separated from the first window plane. The waveguide may further comprise a reflective end, the light sources being arranged to input input light into the waveguide towards the reflective end, the reflective end being arranged to reflect the input light back along the waveguide, the extraction features being arranged to reflect some of the input light after reflection from the reflective end. The waveguide may further comprise a rear end opposite to the reflective end, and side surfaces between the first and second guide surfaces. The array of light sources may be arranged along the rear end.

The light sources may include light sources arranged along a said side surface, and the reflective end comprises first and second facets alternating with each other laterally, the first facets being reflective and forming reflective facets of a Fresnel reflector having positive optical power laterally, the second facets forming draft facets of the Fresnel reflector, the Fresnel reflector having an optical axis that is inclined towards said side surface in a direction in which the Fresnel reflector deflects input light from the array of light sources into the waveguide.

According to a fifth aspect of the present disclosure there may be provided a directional display device comprising a directional backlight according to the first aspect; and a transmissive spatial light modulator arranged to receive the output light from the waveguide and to modulate it to display an image.

According to a sixth aspect of the present disclosure there may be provided a directional display apparatus comprising: a directional display device according to the fifth aspect; and a control system arranged to control the light sources.

Any of the aspects of the present disclosure may be applied in any combination.

Embodiments herein may provide an autostereoscopic display that provides wide angle viewing which may allow for directional viewing and conventional 2D compatibility. The wide angle viewing mode may be for observer tracked autostereoscopic 3D display, observer tracked 2D display (for example for privacy or power saving applications), for wide viewing angle 2D display or for wide viewing angle stereoscopic 3D display. Further, embodiments may provide a controlled illuminator for the purposes of an efficient autostereoscopic display. Such components can be used in directional backlights, to provide directional displays including autostereoscopic displays. Additionally, embodiments may relate to a directional backlight apparatus and a directional display which may incorporate the directional backlight apparatus. Such an apparatus may be used for autostereoscopic displays, privacy displays, multi-user displays and other directional display applications that may achieve for example power savings operation and/or high luminance operation.

Embodiments herein may provide an autostereoscopic display with large area and thin structure. Further, as will be described, the optical valves of the present disclosure may achieve thin optical components with large back working distances. Such components can be used in directional backlights, to provide directional displays including autostereoscopic displays. Further, embodiments may provide a controlled illuminator for the purposes of an efficient autostereoscopic display.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left and right eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 48 is a schematic graph illustrating the angular variation of luminance of a directional display in landscape orientation, in accordance with the present disclosure;

FIG. 49 is a schematic graph illustrating an isoluminance profile of a directional display in landscape orientation, in accordance with the present disclosure;

FIG. 50 is a schematic diagram illustrating the illuminance of an occupant by a conventionally illuminated display in landscape orientation, in accordance with the present disclosure;

FIG. 51 is a schematic graph illustrating the angular variation of luminance of a directional display in portrait orientation for an off-axis eye position, in accordance with the present disclosure;

FIG. 52 is a schematic graph illustrating an isoluminance profile of a directional display in portrait orientation, in accordance with the present disclosure;

FIG. 53 is a schematic diagram illustrating the illuminance of an occupant by a conventionally illuminated display in portrait orientation, in accordance with the present disclosure;

FIG. 54 is a schematic graph illustrating the angular variation of luminance of a directional display in landscape orientation with increased lateral freedom, in accordance with the present disclosure;

FIG. 55 is a schematic graph illustrating an isoluminance profile of a directional display in landscape orientation with increased lateral freedom, in accordance with the present disclosure;

FIG. 56 is a schematic diagram illustrating the illuminance of an occupant by a conventionally illuminated display in landscape orientation with increased lateral freedom, in accordance with the present disclosure;

FIG. 67A is a schematic diagram illustrating an isoluminance profile of a directional display in landscape orientation with a narrow lateral angular profile and the orthogonal direction angular profile of FIG. 64, in accordance with the present disclosure;

FIG. 67B is a schematic diagram illustrating the illuminance of an occupant by a directional display in landscape orientation with a narrow lateral angular profile and the orthogonal direction angular profile of FIG. 64, in accordance with the present disclosure;

FIG. 68A is a schematic diagram illustrating an isoluminance profile of a directional display in landscape orientation with a narrow lateral angular profile towards an occupant and wide angular profile away from the driver and the orthogonal direction angular profile of FIG. 64, in accordance with the present disclosure;

FIG. 68B is a schematic diagram illustrating the illuminance of an occupant by a directional display in landscape orientation with a narrow lateral angular profile towards a driver and wide angular profile away from the driver and the orthogonal direction angular profile of FIG. 64, in accordance with the present disclosure;

FIG. 69A is a schematic diagram illustrating an isoluminance profile of a directional display in portrait orientation with a wide lateral angular profile and the orthogonal direction angular profile of FIG. 64, in accordance with the present disclosure;

FIG. 69B is a schematic diagram illustrating the illuminance of an occupant by a directional display in portrait orientation with the wide lateral angular profile and the orthogonal direction angular profile of FIG. 64, in accordance with the present disclosure;

FIG. 70A is a schematic diagram illustrating an isoluminance profile of a directional display in portrait orientation with a narrow lateral angular profile and the orthogonal direction angular profile of FIG. 64, in accordance with the present disclosure;

FIG. 70B is a schematic diagram illustrating the illuminance of an occupant by a directional display in portrait orientation with a narrow lateral angular profile and the orthogonal direction angular profile of FIG. 64, in accordance with the present disclosure;

DETAILED DESCRIPTION

Figure 1A:
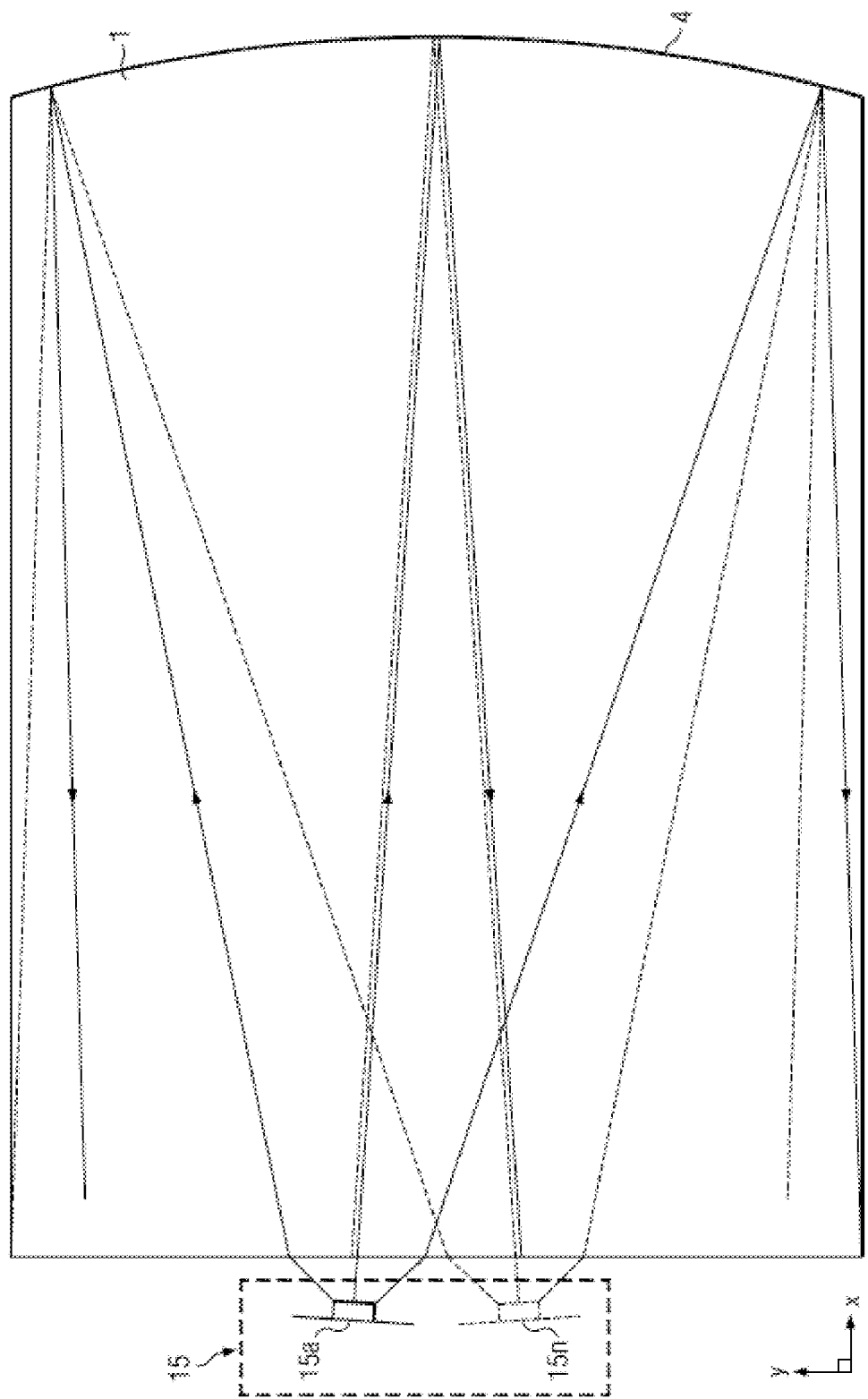
FIG. 1A is a schematic diagram illustrating a front view of light propagation in one embodiment of a directional display device, in accordance with the present disclosure.

Time multiplexed autostereoscopic displays can advantageously improve the spatial resolution of autostereoscopic display by directing light from all of the pixels of a spatial light modulator to a first viewing window in a first time slot, and all of the pixels to a second viewing window in a second time slot. Thus an observer with eyes arranged to receive light in first and second viewing windows will see a full resolution image across the whole of the display over multiple time slots. Time multiplexed displays can advantageously achieve directional illumination by directing an illuminator array through a substantially transparent time multiplexed spatial light modulator using directional optical elements, wherein the directional optical elements substantially form an image of the illuminator array in the window plane.

The uniformity of the viewing windows may be advantageously independent of the arrangement of pixels in the spatial light modulator. Advantageously, such displays can provide observer tracking displays which have low flicker, with low levels of cross talk for a moving observer.

To achieve high uniformity in the window plane, it is desirable to provide an array of illumination elements that have a high spatial uniformity. The illuminator elements of the time sequential illumination system may be provided, for example, by pixels of a spatial light modulator with size approximately 100 micrometers in combination with a lens array. However, such pixels suffer from similar difficulties as for spatially multiplexed displays. Further, such devices may have low efficiency and higher cost, requiring additional display components.

High window plane uniformity can be conveniently achieved with macroscopic illuminators, for example, an array of LEDs in combination with homogenizing and diffusing optical elements that are typically of size 1 mm or greater. However, the increased size of the illuminator elements means that the size of the directional optical elements increases proportionately. For example, a 16 mm wide illuminator imaged to a 65 mm wide viewing window may require a 200 mm back working distance. Thus, the increased thickness of the optical elements can prevent useful application, for example, to mobile displays, or large area displays.

Addressing the aforementioned shortcomings, optical valves as described in commonly-owned U.S. patent application Ser. No. 13/300,293 (now U.S. Pat. No. 9,519,153) advantageously can be arranged in combination with fast switching transmissive spatial light modulators to achieve time multiplexed autostereoscopic illumination in a thin package while providing high resolution images with flicker free observer tracking and low levels of cross talk. Described is a one dimensional array of viewing positions, or windows, that can display different images in a first, typically horizontal, direction, but contain the same images when moving in a second, typically vertical, direction.

Conventional non-imaging display backlights commonly employ optical waveguides and have edge illumination from light sources such as LEDs. However, it should be appreciated that there are many fundamental differences in the function, design, structure, and operation between such conventional non-imaging display backlights and the imaging directional backlights discussed in the present disclosure.

Generally, for example, in accordance with the present disclosure, imaging directional backlights are arranged to direct the illumination from multiple light sources through a display panel to respective multiple viewing windows in at least one axis. Each viewing window is substantially formed as an image in at least one axis of a light source by the imaging system of the imaging directional backlight. An imaging system may be formed between multiple light sources and the respective window images. In this manner, the light from each of the multiple light sources is substantially not visible for an observer's eye outside of the respective viewing window.

In contradistinction, conventional non-imaging backlights or light guiding plates (LGPs) are used for illumination of 2D displays. See, e.g., KäIil Käläntär et al., *Backlight Unit With Double Surface Light Emission*, J. Soc. Inf. Display, Vol. 12, Issue 4, pp. 379-387 (December 2004). Non-imaging backlights are typically arranged to direct the illumination from multiple light sources through a display panel into a substantially common viewing zone for each of the multiple light sources to achieve wide viewing angle and high display uniformity. Thus non-imaging backlights do not form viewing windows. In this manner, the light from each of the multiple light sources may be visible for an observer's eye at substantially all positions across the viewing zone. Such conventional non-imaging backlights may have some directionality, for example, to increase screen gain compared to Lambertian illumination, which may be provided by brightness enhancement films such as BEF™ from 3M. However, such directionality may be substantially the same for each of the respective light sources. Thus, for these reasons and others that should be apparent to persons of ordinary skill, conventional non-imaging backlights are different to imaging directional backlights. Edge lit non-imaging backlight illumination structures may be used in liquid crystal display systems such as those seen in 2D Laptops, Monitors and TVs. Light propagates from the edge of a lossy waveguide which may include sparse features; typically local indentations in the surface of the guide which cause light to be lost regardless of the propagation direction of the light.

As used herein, an optical valve is an optical structure that may be a type of light guiding structure or device referred to as, for example, a light valve, an optical valve directional backlight, and a valve directional backlight ("v-DBL"). In the present disclosure, optical valve is different to a spatial light modulator (even though spatial light modulators may be sometimes generally referred to as a "light valve" in the art). One example of an imaging directional backlight is an optical valve that may employ a folded optical system. Light may propagate substantially without loss in one direction through the optical valve, may be incident on an imaging reflector, and may counter-propagate such that the light may be extracted by reflection off tilted light extraction features, and directed to viewing windows as described in U.S. patent application Ser. No. 13/300,293 (now U.S. Pat. No. 9,519, 153), which is herein incorporated by reference in its entirety.

Additionally, as used herein, a stepped waveguide imaging directional backlight may be at least one of an optical valve. A stepped waveguide is a waveguide for an imaging directional backlight comprising a waveguide for guiding light, further comprising: a first light guiding surface; and a second light guiding surface, opposite the first light guiding surface, further comprising a plurality of light guiding features interspersed with a plurality of extraction features arranged as steps.

In operation, light may propagate within an exemplary optical valve in a first direction from an input side to a reflective side and may be transmitted substantially without loss. Light may be reflected at the reflective side and propagates in a second direction substantially opposite the first direction. As the light propagates in the second direction, the light may be incident on light extraction features, which are operable to redirect the light outside the optical valve. Stated differently, the optical valve generally allows light to propagate in the first direction and may allow light to be extracted while propagating in the second direction.

The optical valve may achieve time sequential directional illumination of large display areas. Additionally, optical elements may be employed that are thinner than the back working distance of the optical elements to direct light from macroscopic illuminators to a window plane. Such displays may use an array of light extraction features arranged to extract light counter propagating in a substantially parallel waveguide.

Thin imaging directional backlight implementations for use with LCDs have been proposed and demonstrated by 3M, for example U.S. Pat. No. 7,528,893; by Microsoft, for example U.S. Pat. No. 7,970,246 which may be referred to herein as a "wedge type directional backlight;" by RealD, for example U.S. patent application Ser. No. 13/300,293 (now U.S. Pat. No. 9,519,153) which may be referred to herein as an "optical valve" or "optical valve directional backlight," all of which are herein incorporated by reference in their entirety.

The present disclosure provides stepped waveguide imaging directional backlights in which light may reflect back and forth between the internal faces of, for example, a stepped waveguide which may include a first side and a first set of features. As the light travels along the length of the stepped waveguide, the light may not substantially change angle of incidence with respect to the first side and first set of surfaces and so may not reach the critical angle of the medium at these internal faces. Light extraction may be advantageously achieved by a second set of surfaces (the step "risers") that are inclined to the first set of surfaces (the step "treads"). Note that the second set of surfaces may not be part of the light guiding operation of the stepped waveguide, but may be arranged to provide light extraction from the structure. By contrast, a wedge type imaging directional backlight may allow light to guide within a wedge profiled waveguide having continuous internal surfaces. The optical valve is thus not a wedge type imaging directional backlight.

Figure 1B:
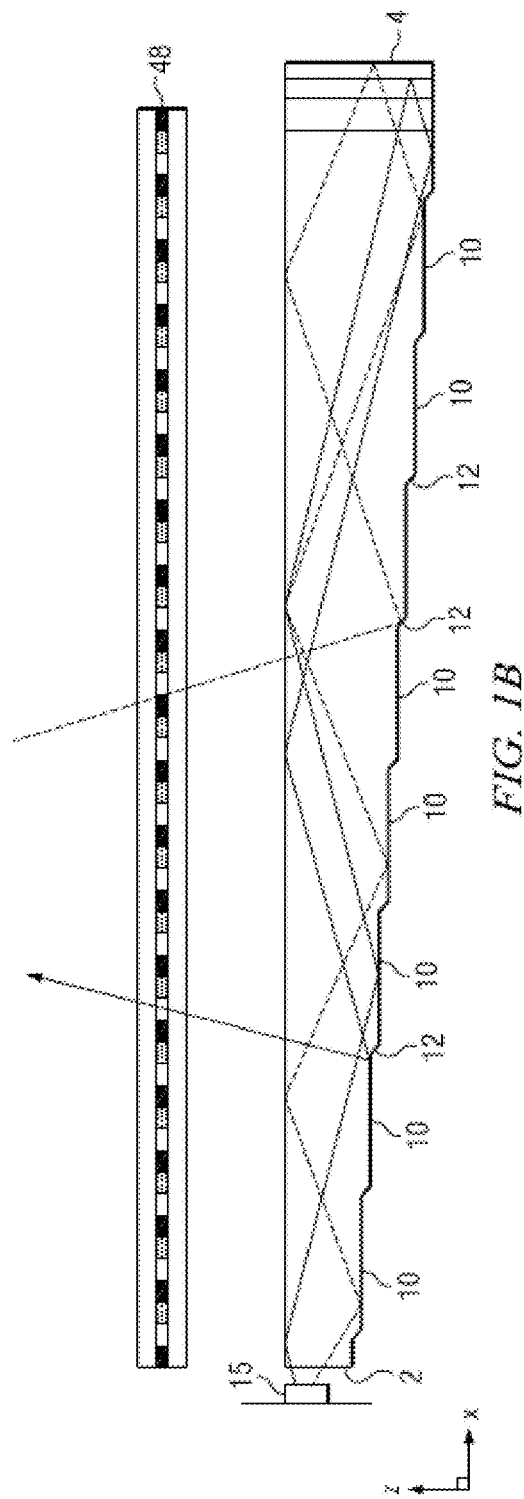
FIG. 1B is a schematic diagram illustrating a side view of light propagation in one embodiment of the directional display device of FIG. 1A, in accordance with the present disclosure.

FIG. 1A is a schematic diagram illustrating a front view of light propagation in one embodiment of a directional display device, and FIG. 1B is a schematic diagram illustrating a side view of light propagation in the directional display device of FIG. 1A.

FIG. 1A illustrates a front view in the xy plane of a directional backlight of a directional display device, and includes an illuminator array 15 which may be used to illuminate a stepped waveguide 1. Illuminator array 15 includes illuminator element 15a through illuminator element 15n (where n is an integer greater than one). In one example, the stepped waveguide 1 of FIG. 1A may be a stepped, display sized waveguide 1. Illumination elements 15a through 15n are light sources that may be light emitting diodes (LEDs). Although LEDs are discussed herein as illuminator elements 15a-15n, other light sources may be used such as, but not limited to, diode sources, semiconductor sources, laser sources, local field emission sources, organic emitter arrays, and so forth. Additionally, FIG. 1B illustrates a side view in the xz plane, and includes illuminator array 15, SLM 48, extraction features 12, guiding features 10, and stepped waveguide 1, arranged as shown. The side view provided in FIG. 1B is an alternative view of the front view shown in FIG. 1A. Accordingly, the illuminator array 15 of FIGS. 1A and 1B corresponds to one another and the stepped waveguide 1 of FIGS. 1A and 1B may correspond to one another.

Further, in FIG. 1B, the stepped waveguide 1 may have an input end 2 that is thin and a reflective end 4 that is thick. Thus the waveguide 1 extends between the input end 2 that receives input light and the reflective end 4 that reflects the input light back through the waveguide 1. The length of the input end 2 in a lateral direction across the waveguide is greater than the height of the input end 2. The illuminator elements 15a-15n are disposed at different input positions in a lateral direction across the input end 2.

The waveguide 1 has first and second, opposed guide surfaces extending between the input end 2 and the reflective end 4 for guiding light forwards and back along the waveguide 1. The second guide surface has a plurality of light extraction features 12 facing the reflective end 4 and arranged to reflect at least some of the light guided back through the waveguide 1 from the reflective end from different input positions across the input end in different directions through the first guide surface that are dependent on the input position.

In this example, the light extraction features 12 are reflective facets, although other reflective features could be used. The light extraction features 12 do not guide light through the waveguide, whereas the intermediate regions of the second guide surface intermediate the light extraction features 12 guide light without extracting it. Those regions of the second guide surface are planar and may extend parallel to the first guide surface, or at a relatively low inclination. The light extraction features 12 extend laterally to those regions so that the second guide surface has a stepped shape which may include the light extraction features 12 and intermediate regions. The light extraction features 12 are oriented to reflect light from the light sources, after reflection from the reflective end 4, through the first guide surface.

The light extraction features 12 are arranged to direct input light from different input positions in the lateral direction across the input end in different directions relative to the first guide surface that are dependent on the input position. As the illumination elements 15a-15n are arranged at different input positions, the light from respective illumination elements 15a-15n is reflected in those different directions. In this manner, each of the illumination elements 15a-15n directs light into a respective optical window in output directions distributed in the lateral direction in dependence on the input positions. The lateral direction across the input end 2 in which the input positions are distributed corresponds with regard to the output light to a lateral direction to the normal to the first guide surface. The lateral directions as defined at the input end 2 and with regard to the output light remain parallel in this embodiment where the deflections at the reflective end 4 and the first guide surface are generally orthogonal to the lateral direction. Under the control of a control system, the illuminator elements 15a-15n may be selectively operated to direct light into a selectable optical window. The optical windows may be used individually or in groups as viewing windows.

The SLM 48 extends across the waveguide and modulates the light output therefrom. Although the SLM 48 may a liquid crystal display (LCD), this is merely by way of example and other spatial light modulators or displays may be used including LCOS, DLP devices, and so forth, as this illuminator may work in reflection. In this example, the SLM 48 is disposed across the first guide surface of the waveguide and modulates the light output through the first guide surface after reflection from the light extraction features 12.

The operation of a directional display device that may provide a one dimensional array of viewing windows is illustrated in front view in FIG. 1A, with its side profile shown in FIG. 1B. In operation, in FIGS. 1A and 1B, light may be emitted from an illuminator array 15, such as an array of illuminator elements 15a through 15n, located at different positions, y, along the surface of thin end side 2, x=0, of the stepped waveguide 1. The light may propagate along +x in a first direction, within the stepped waveguide 1, while at the same time, the light may fan out in the xy plane and upon reaching the far curved end side 4, may substantially or entirely fill the curved end side 4. While propagating, the light may spread out to a set of angles in the xz plane up to, but not exceeding the critical angle of the guide material. The extraction features 12 that link the guiding features 10 of the bottom side of the stepped waveguide 1 may have a tilt angle greater than the critical angle and hence may be missed by substantially all light propagating along +x in the first direction, ensuring the substantially lossless forward propagation.

Continuing the discussion of FIGS. 1A and 1B, the curved end side 4 of the stepped waveguide 1 may be made reflective, typically by being coated with a reflective material such as, for example, silver, although other reflective techniques may be employed. Light may therefore be redirected in a second direction, back down the guide in the direction of −x and may be substantially collimated in the xy or display plane. The angular spread may be substantially preserved in the xz plane about the principal propagation direction, which may allow light to hit the riser edges and reflect out of the guide. In an embodiment with approximately 45 degree tilted extraction features 12, light may be effectively directed approximately normal to the xy display plane with the xz angular spread substantially maintained relative to the propagation direction. This angular spread may be increased when light exits the stepped waveguide 1 through refraction, but may be decreased somewhat dependent on the reflective properties of the extraction features 12.

In some embodiments with uncoated extraction features 12, reflection may be reduced when total internal reflection (TIR) fails, squeezing the xz angular profile and shifting off normal. However, in other embodiments having silver coated or metallized extraction features, the increased angular spread and central normal direction may be preserved. Continuing the description of the embodiment with silver coated extraction features, in the xz plane, light may exit the stepped waveguide 1 approximately collimated and may be directed off normal in proportion to the y-position of the respective illuminator element 15a-15n in illuminator array 15 from the input edge center. Having independent illuminator elements 15a-15n along the input edge 2 then enables light to exit from the entire first light directing side 6 and propagate at different external angles, as illustrated in FIG. 1A.

Figure 2A:
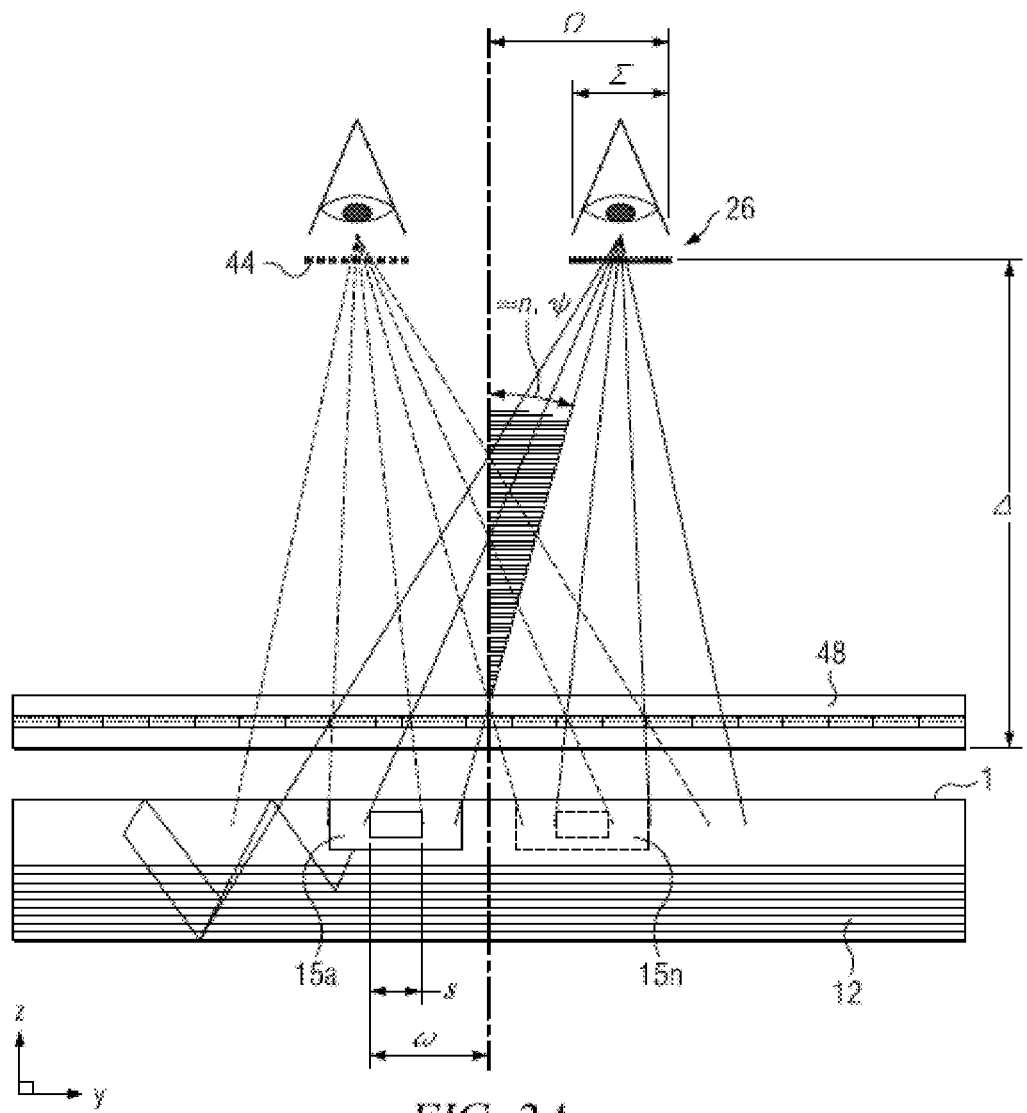
FIG. 2A is a schematic diagram illustrating in a top view of light propagation in another embodiment of a directional display device, in accordance with the present disclosure.
Figure 2B:
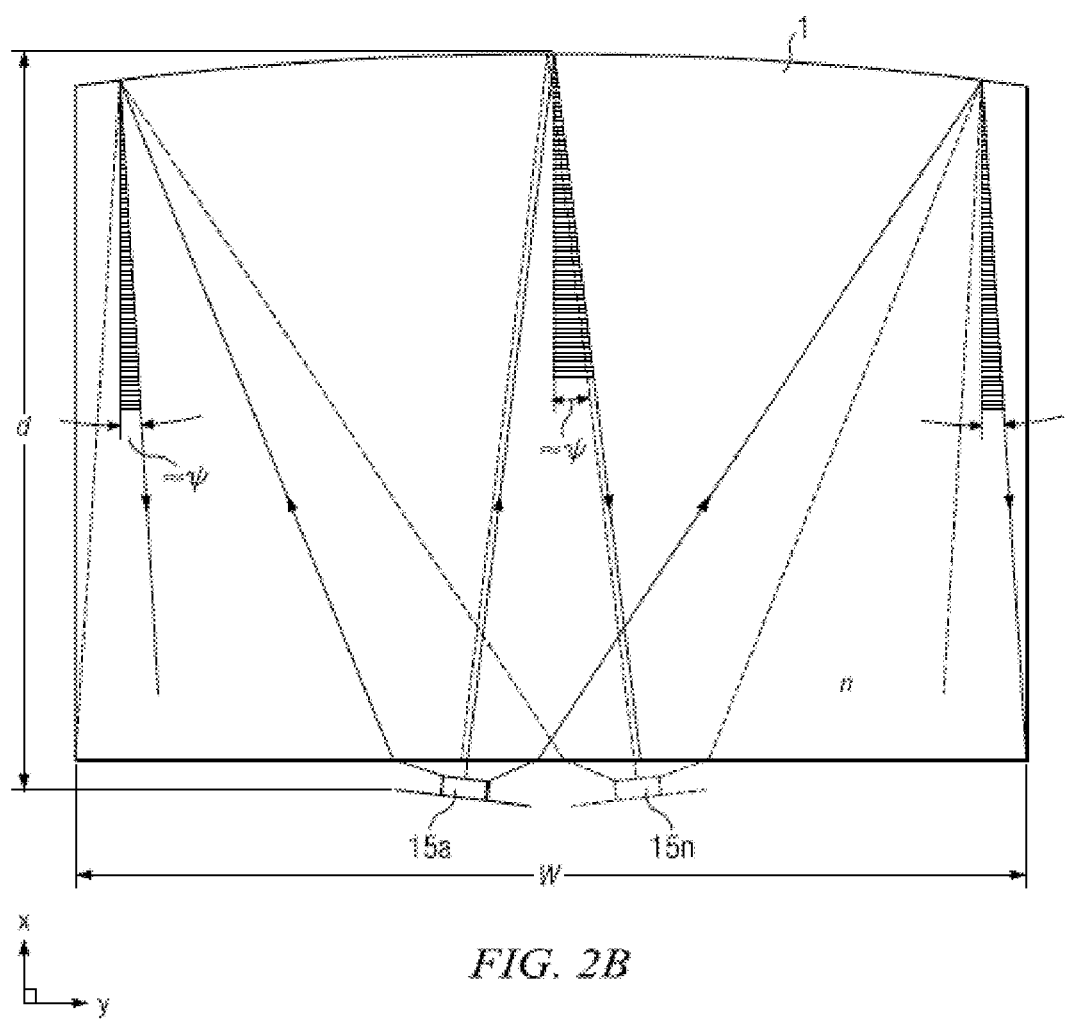
FIG. 2B is a schematic diagram illustrating light propagation in a front view of the directional display device of FIG. 2A, in accordance with the present disclosure.
Figure 2C:
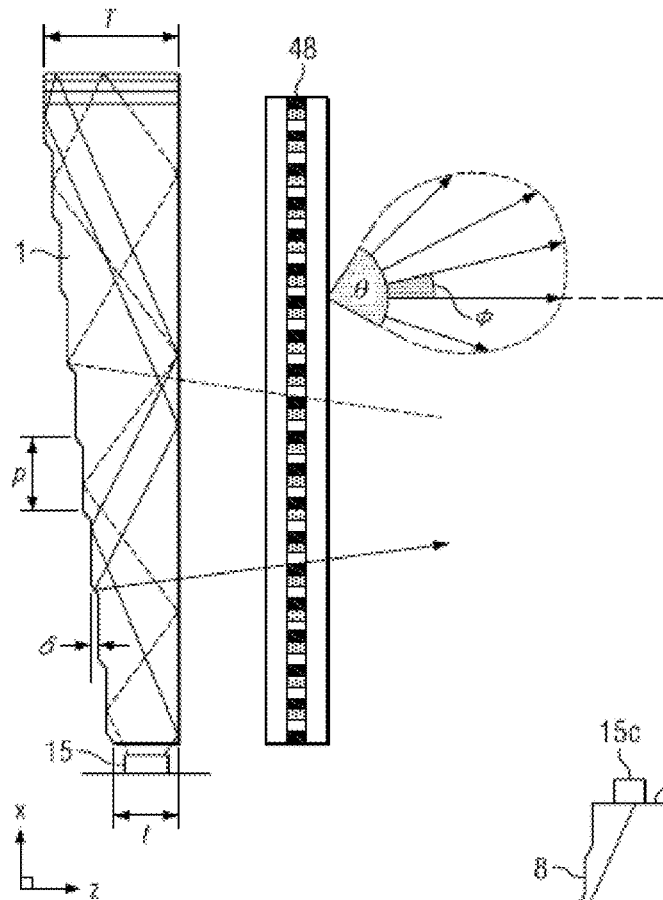
FIG. 2C is a schematic diagram illustrating light propagation in a side view of the directional display device of FIG. 2A, in accordance with the present disclosure.

Illuminating a spatial light modulator (SLM) 48 such as a fast liquid crystal display (LCD) panel with such a device may achieve autostereoscopic 3D as shown in top view or yz-plane viewed from the illuminator array 15 end in FIG. 2A, front view in FIG. 2B and side view in FIG. 2C. FIG. 2A is a schematic diagram illustrating in a top view, propagation of light in a directional display device, FIG. 2B is a schematic diagram illustrating in a front view, propagation of light in a directional display device, and FIG. 2C is a schematic diagram illustrating in side view propagation of light in a directional display device. As illustrated in FIGS. 2A, 2B, and 2C, a stepped waveguide 1 may be located behind a fast (e.g., greater than 100 Hz) LCD panel SLM 48 that displays sequential right and left eye images. In synchronization, specific illuminator elements 15a through 15n of illuminator array 15 (where n is an integer greater than one) may be selectively turned on and off, providing illuminating light that enters right and left eyes substantially independently by virtue of the system's directionality. In the simplest case, sets of illuminator elements of illuminator array 15 are turned on together, providing a one dimensional viewing window 26 or an optical pupil with limited width in the horizontal direction, but extended in the vertical direction, in which both eyes horizontally separated may view a left eye image, and another viewing window 44 in which a right eye image may primarily be viewed by both eyes, and a central position in which both the eyes may view different images. In this way, 3D may be viewed when the head of a viewer is approximately centrally aligned. Movement to the side away from the central position may result in the scene collapsing onto a 2D image.

The reflective end 4 may have positive optical power in the lateral direction across the waveguide. In embodiments in which typically the reflective end 4 has positive optical power, the optical axis may be defined with reference to the shape of the reflective end 4, for example being a line that passes through the center of curvature of the reflective end 4 and coincides with the axis of reflective symmetry of the end 4 about the x-axis. In the case that the reflecting surface 4 is flat, the optical axis may be similarly defined with respect to other components having optical power, for example the light extraction features 12 if they are curved, or the Fresnel lens 62 described below. The optical axis 238 is typically coincident with the mechanical axis of the waveguide 1. In the present embodiments that typically comprise a substantially cylindrical reflecting surface at end 4, the optical axis 238 is a line that passes through the center of curvature of the surface at end 4 and coincides with the axis of reflective symmetry of the side 4 about the x-axis. The optical axis 238 is typically coincident with the mechanical axis of the waveguide 1. The cylindrical reflecting surface at end 4 may typically comprise a spherical profile to optimize performance for on-axis and off-axis viewing positions. Other profiles may be used.

Figure 3:
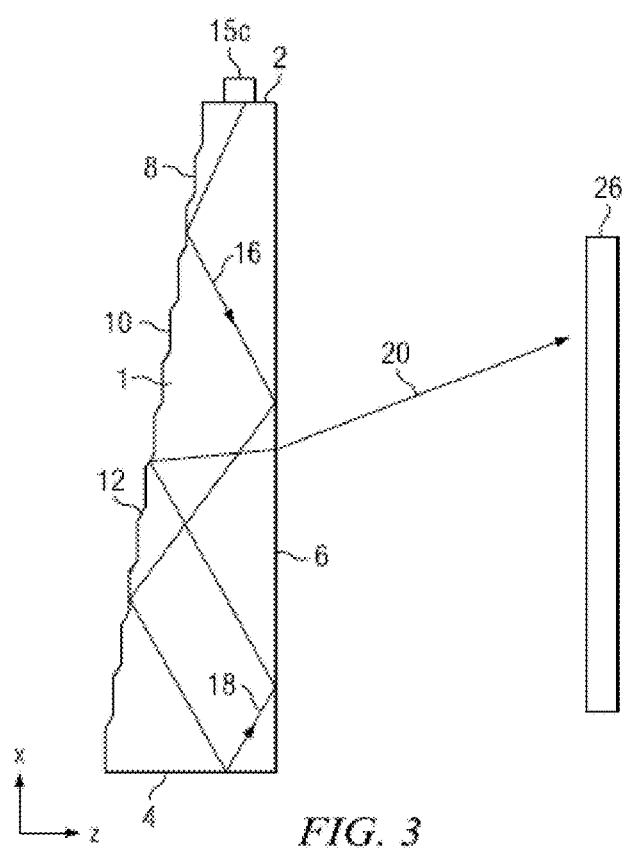
FIG. 3 is a schematic diagram illustrating in a side view of a directional display device, in accordance with the present disclosure.

FIG. 3 is a schematic diagram illustrating in side view a directional display device. Further, FIG. 3 illustrates additional detail of a side view of the operation of a stepped waveguide 1, which may be a transparent material. The stepped waveguide 1 may include an illuminator input side 2, a reflective side 4, a first light directing side 6 which may be substantially planar, and a second light directing side 8 which includes guiding features 10 and light extraction features 12. In operation, light rays 16 from an illuminator element 15c of an illuminator array 15 (not shown in FIG. 3), that may be an addressable array of LEDs for example, may be guided in the stepped waveguide 1 by means of total internal reflection by the first light directing side 6 and total internal reflection by the guiding feature 10, to the reflective side 4, which may be a mirrored surface. Although reflective side 4 may be a mirrored surface and may reflect light, it may in some embodiments also be possible for light to pass through reflective side 4.

Continuing the discussion of FIG. 3, light ray 18 reflected by the reflective side 4 may be further guided in the stepped waveguide 1 by total internal reflection at the reflective side 4 and may be reflected by extraction features 12. Light rays 18 that are incident on extraction features 12 may be substantially deflected away from guiding modes of the stepped waveguide 1 and may be directed, as shown by ray 20, through the side 6 to an optical pupil that may form a viewing window 26 of an autostereoscopic display. The width of the viewing window 26 may be determined by at least the size of the illuminator, output design distance and optical power in the side 4 and extraction features 12. The height of the viewing window may be primarily determined by the reflection cone angle of the extraction features 12 and the illumination cone angle input at the input side 2. Thus each viewing window 26 represents a range of separate output directions with respect to the surface normal direction of the spatial light modulator 48 that intersect with a plane at the nominal viewing distance.

Figure 4A:
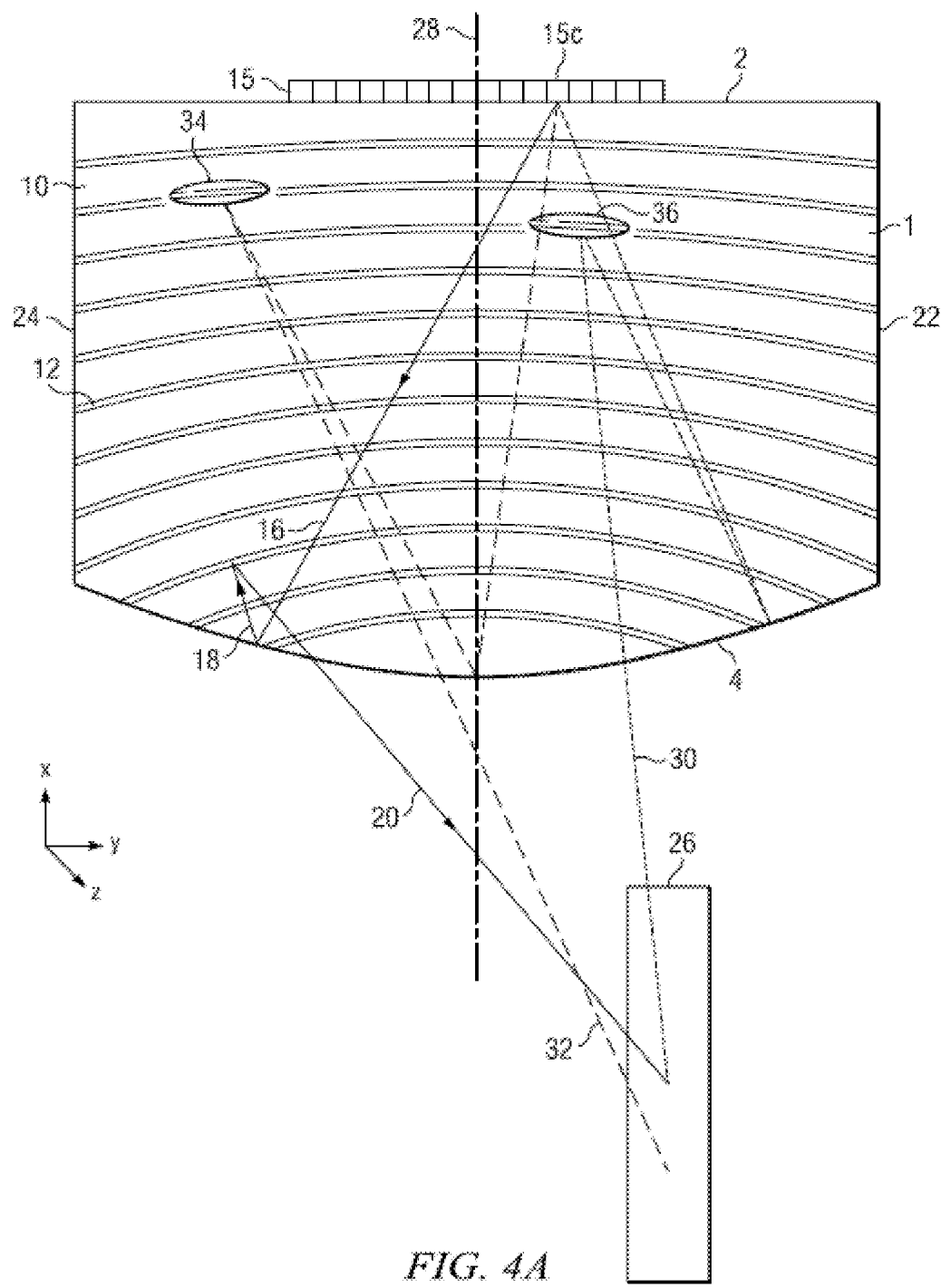
FIG. 4A is schematic diagram illustrating in a front view, generation of a viewing window in a directional display device including curved light extraction features, in accordance with the present disclosure.

FIG. 4A is a schematic diagram illustrating in front view a directional display device which may be illuminated by a first illuminator element and including curved light extraction features. Further, FIG. 4A shows in front view further guiding of light rays from illuminator element 15c of illuminator array 15, in the stepped waveguide 1. Each of the output rays are directed towards the same viewing window 26 from the respective illuminator 14. Thus light ray 30 may intersect the ray 20 in the window 26, or may have a different height in the window as shown by ray 32. Additionally, in various embodiments, sides 22, 24 of the waveguide 1 may be transparent, mirrored, or blackened surfaces.

Continuing the discussion of FIG. 4A, light extraction features 12 may be elongate, and the orientation of light extraction features 12 in a first region 34 of the light directing side 8 (light directing side 8 shown in FIG. 3, but not shown in FIG. 4A) may be different to the orientation of light extraction features 12 in a second region 36 of the light directing side 8.

Figure 4B:
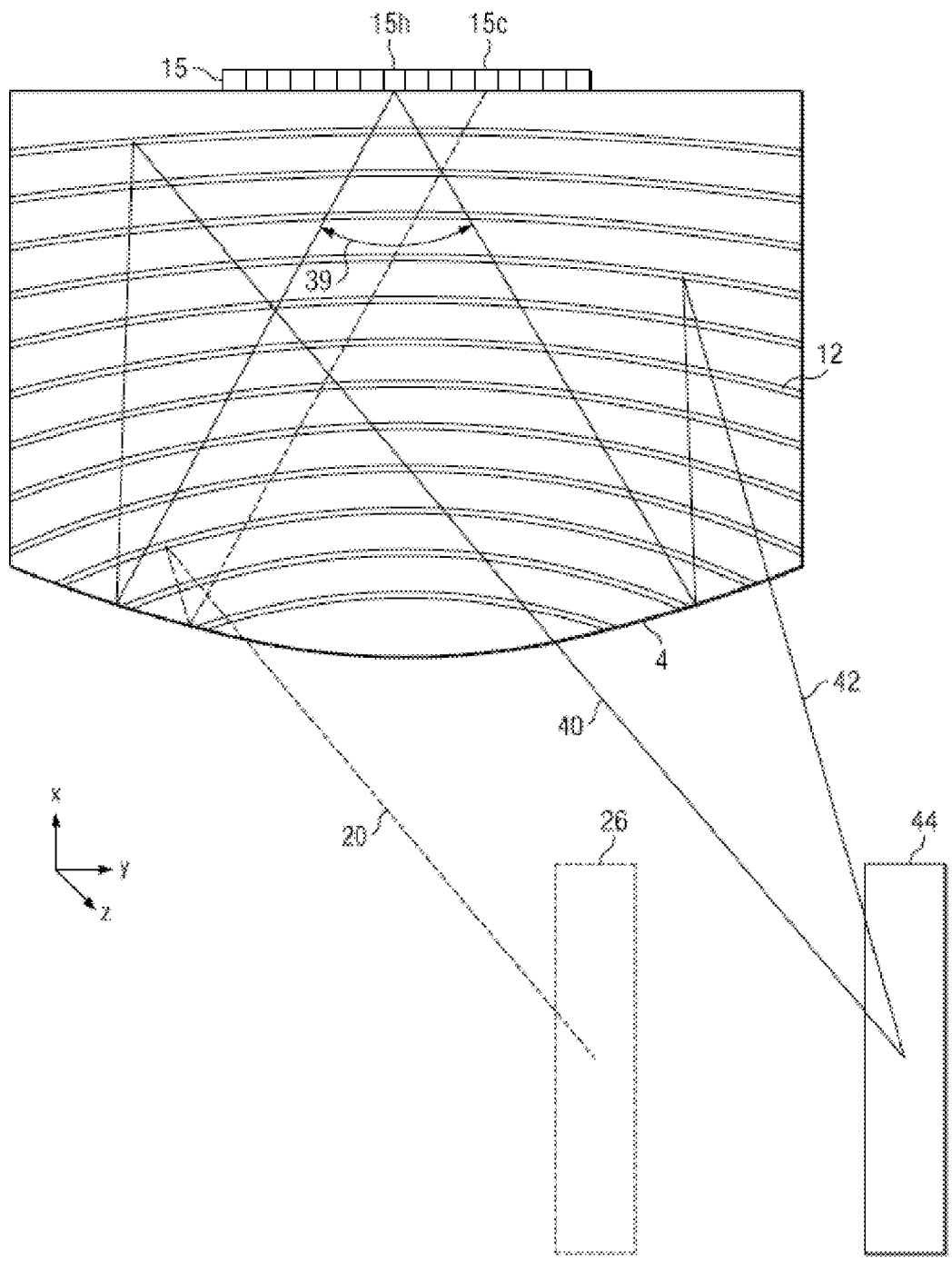
FIG. 4B is a schematic diagram illustrating in a front view, generation of a first and a second viewing window in a directional display device including curved light extraction features, in accordance with the present disclosure.

FIG. 4B is a schematic diagram illustrating in front view an optical valve which may illuminated by a second illuminator element. Further, FIG. 4B shows the light rays 40, 42 from a second illuminator element 15h of the illuminator array 15. The curvature of the reflective end on the side 4 and the light extraction features 12 cooperatively produce a second viewing window 44 laterally separated from the viewing window 26 with light rays from the illuminator element 15h.

Advantageously, the arrangement illustrated in FIG. 4B may provide a real image of the illuminator element 15c at a viewing window 26 in which the real image may be formed by cooperation of optical power in reflective side 4 and optical power which may arise from different orientations of elongate light extraction features 12 between regions 34 and 36, as shown in FIG. 4A. The arrangement of FIG. 4B may achieve improved aberrations of the imaging of illuminator element 15c to lateral positions in viewing window 26. Improved aberrations may achieve an extended viewing freedom for an autostereoscopic display while achieving low cross talk levels.

Figure 5:
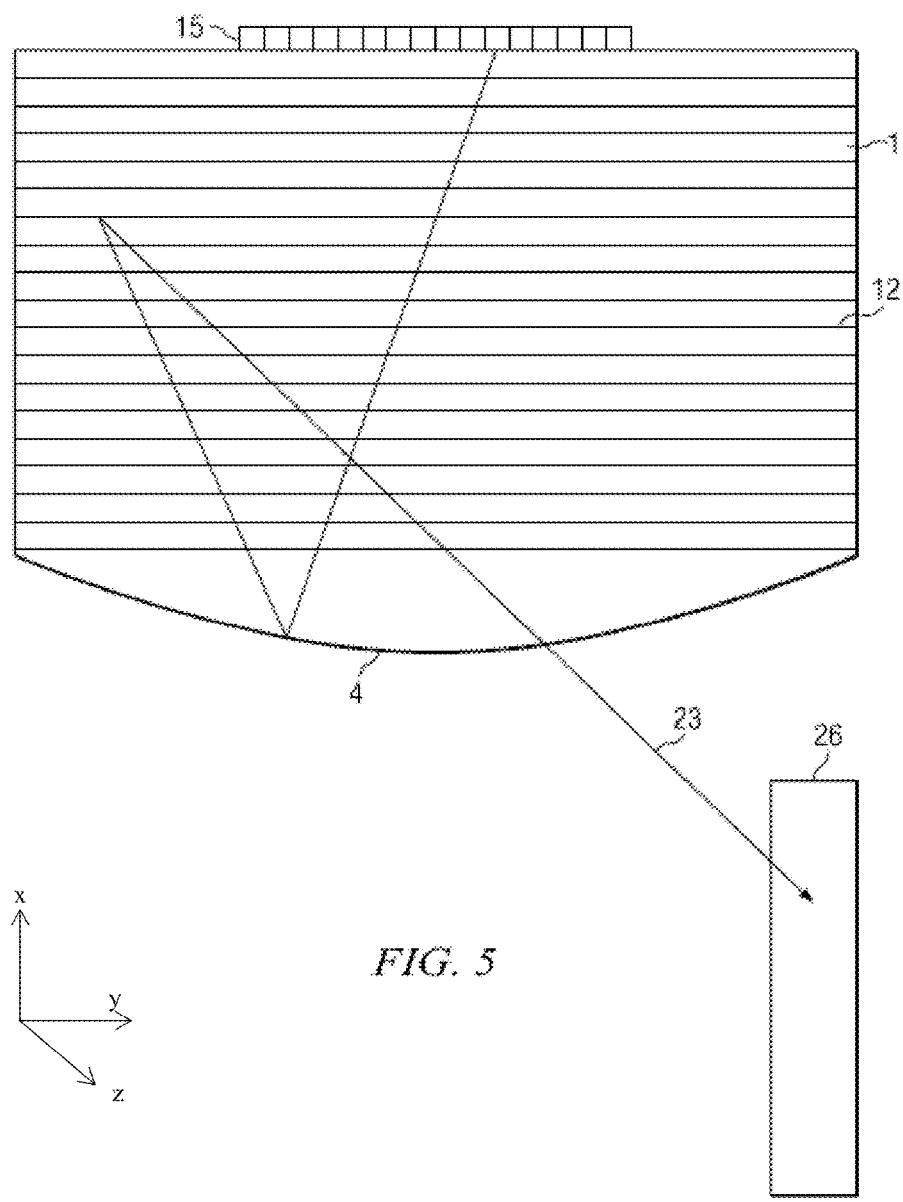
FIG. 5 is a schematic diagram illustrating generation of a first viewing window in a directional display device including linear light extraction features, in accordance with the present disclosure.

FIG. 5 is a schematic diagram illustrating in front view an embodiment of a directional display device having substantially linear light extraction features. Further, FIG. 5 shows a similar arrangement of components to FIG. 1 (with corresponding elements being similar), with one of the differences being that the light extraction features 12 are substantially linear and parallel to each other. Advantageously, such an arrangement may provide substantially uniform illumination across a display surface and may be more convenient to manufacture than the curved extraction features of FIG. 4A and FIG. 4B.

Figure 6A:
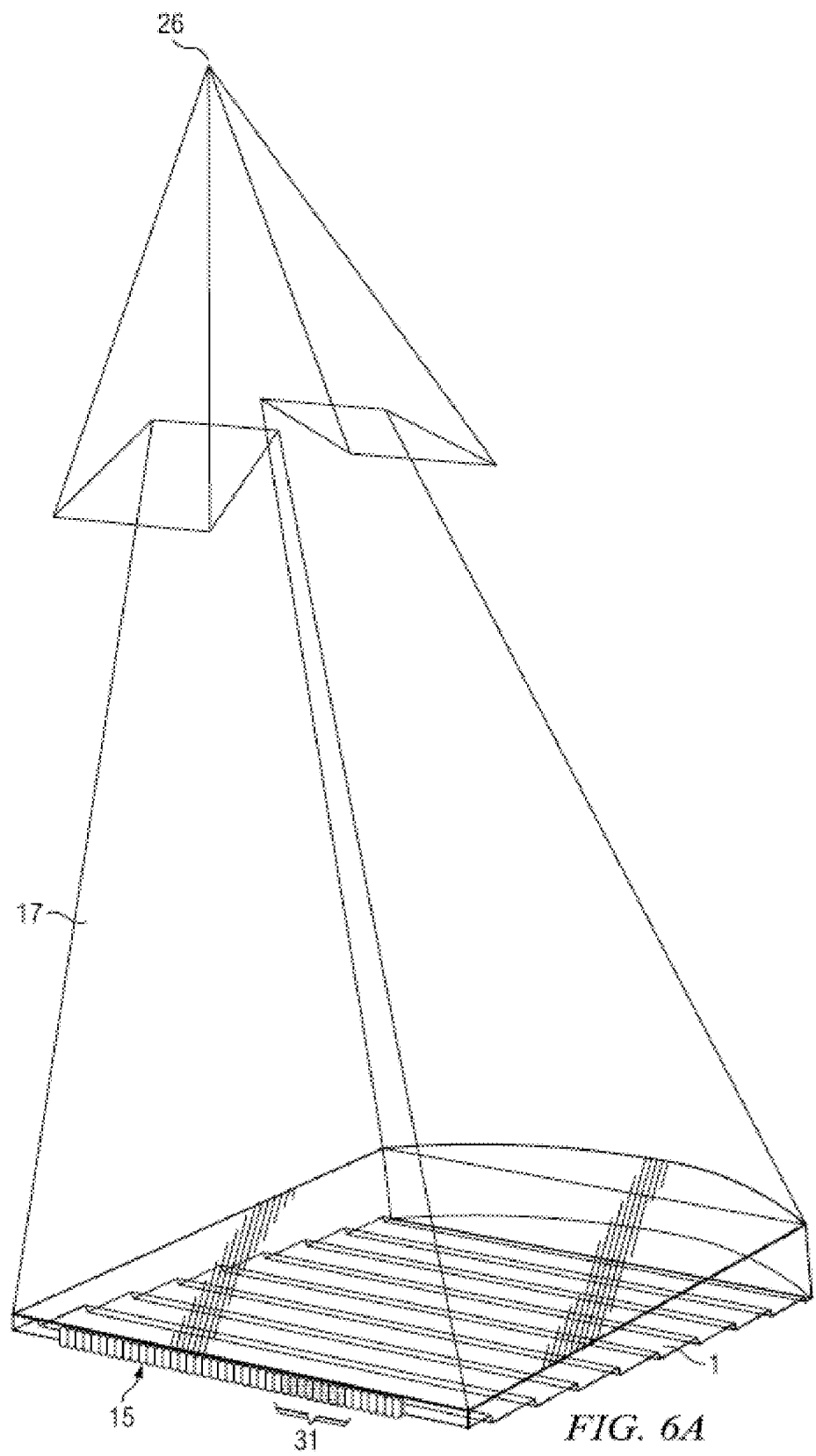
FIG. 6A is a schematic diagram illustrating one embodiment of the generation of a first viewing window in a time multiplexed directional display device in a first time slot, in accordance with the present disclosure.
Figure 6B:
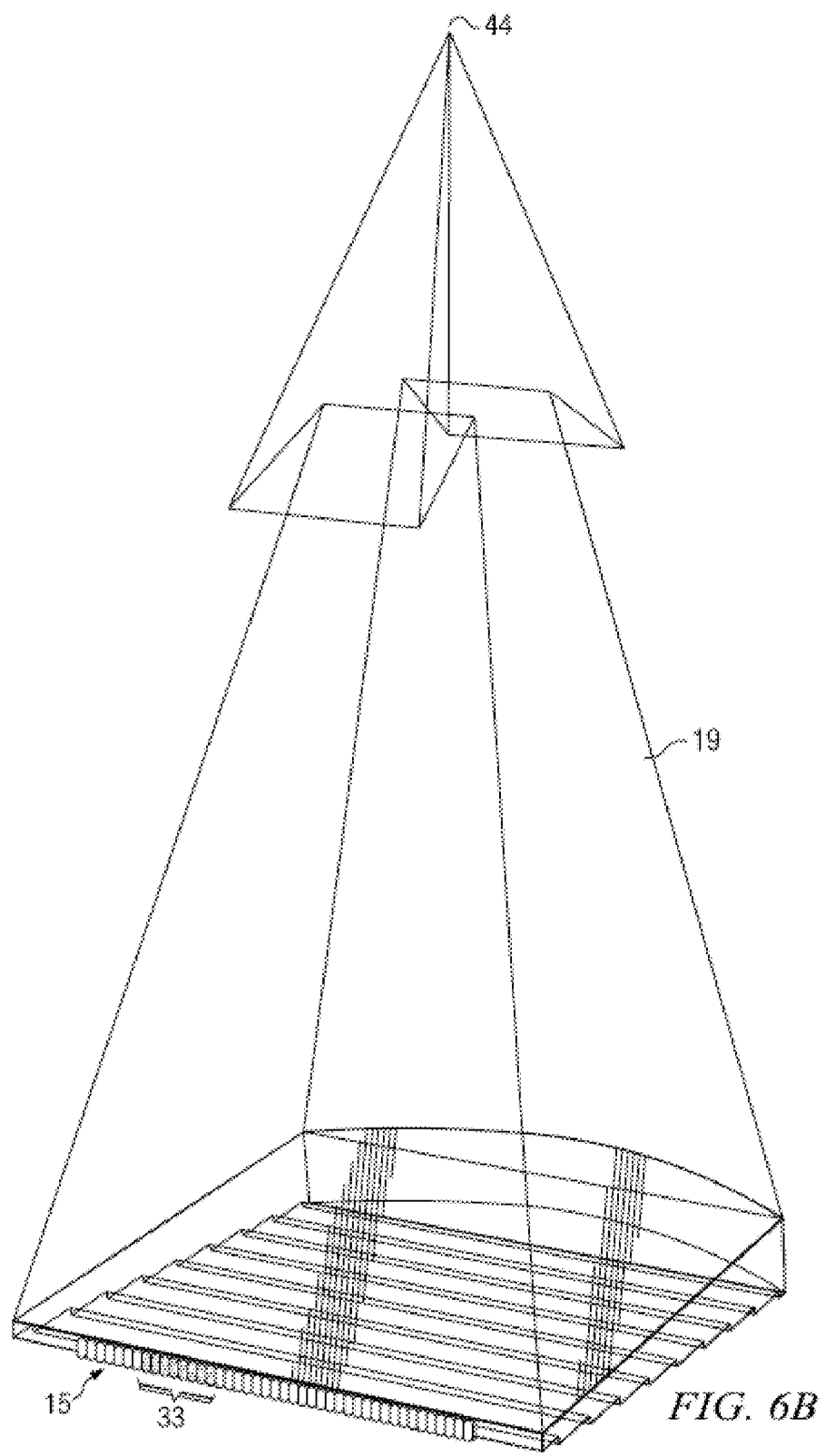
FIG. 6B is a schematic diagram illustrating another embodiment of the generation of a second viewing window in a time multiplexed directional display device in a second time slot, in accordance with the present disclosure.
Figure 6C:
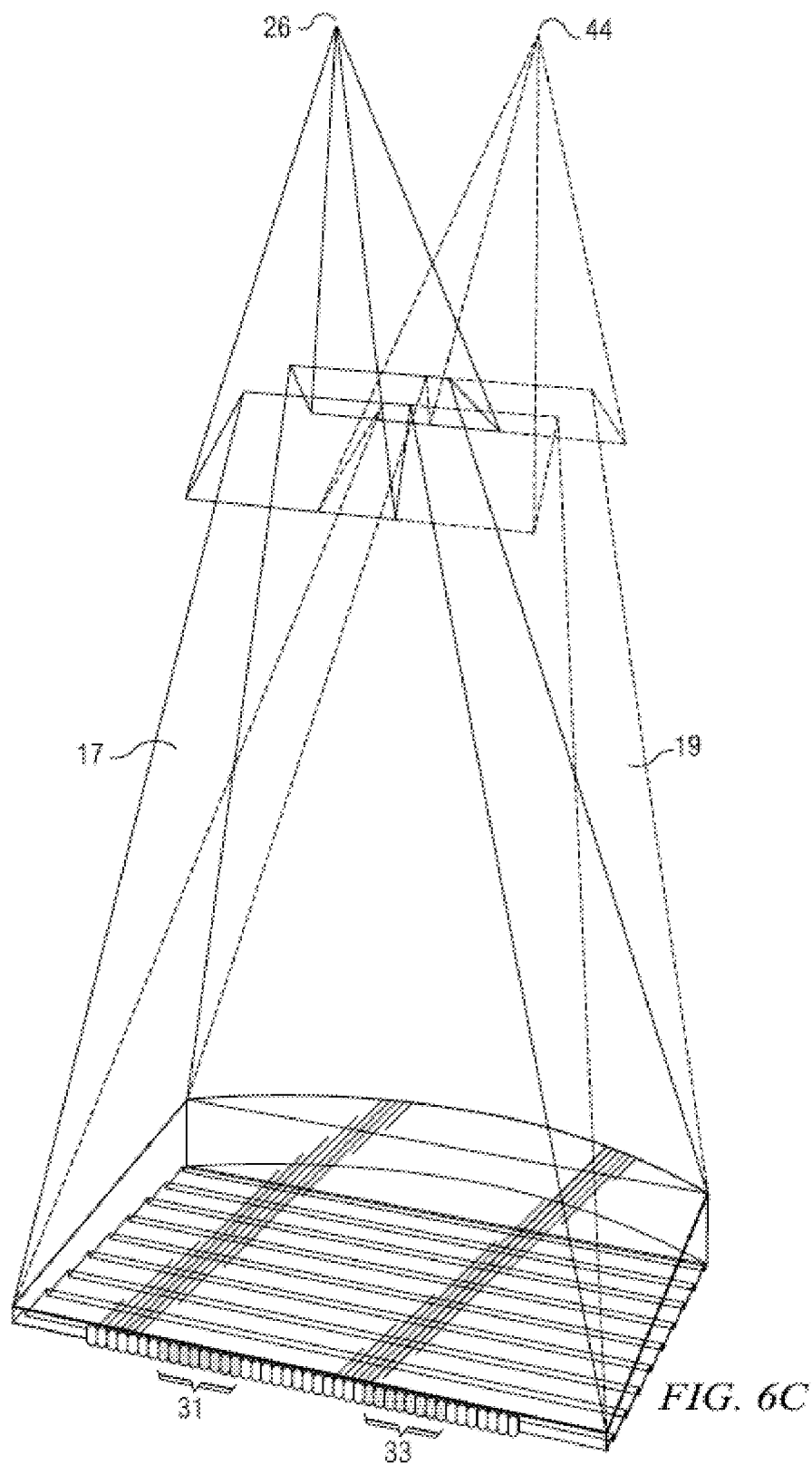
FIG. 6C is a schematic diagram illustrating another embodiment of the generation of a first and a second viewing window in a time multiplexed directional display device, in accordance with the present disclosure.

FIG. 6A is a schematic diagram illustrating one embodiment of the generation of a first viewing window in a time multiplexed imaging directional display device in a first time slot, FIG. 6B is a schematic diagram illustrating another embodiment of the generation of a second viewing window in a time multiplexed imaging directional backlight apparatus in a second time slot, and FIG. 6C is a schematic diagram illustrating another embodiment of the generation of a first and a second viewing window in a time multiplexed imaging directional display device. Further, FIG. 6A shows schematically the generation of illumination window 26 from stepped waveguide 1. Illuminator element group 31 in illuminator array 15 may provide a light cone 17 directed towards a viewing window 26. FIG. 6B shows schematically the generation of illumination window 44. Illuminator element group 33 in illuminator array 15 may provide a light cone 19 directed towards viewing window 44. In cooperation with a time multiplexed display, windows 26 and 44 may be provided in sequence as shown in FIG. 6C. If the image on a spatial light modulator 48 (not shown in FIGS. 6A, 6B, 6C) is adjusted in correspondence with the light direction output, then an autostereoscopic image may be achieved for a suitably placed viewer. Similar operation can be achieved with all the directional backlights described herein. Note that illuminator element groups 31, 33 each include one or more illumination elements from illumination elements 15a to 15n, where n is an integer greater than one.

Figure 7:
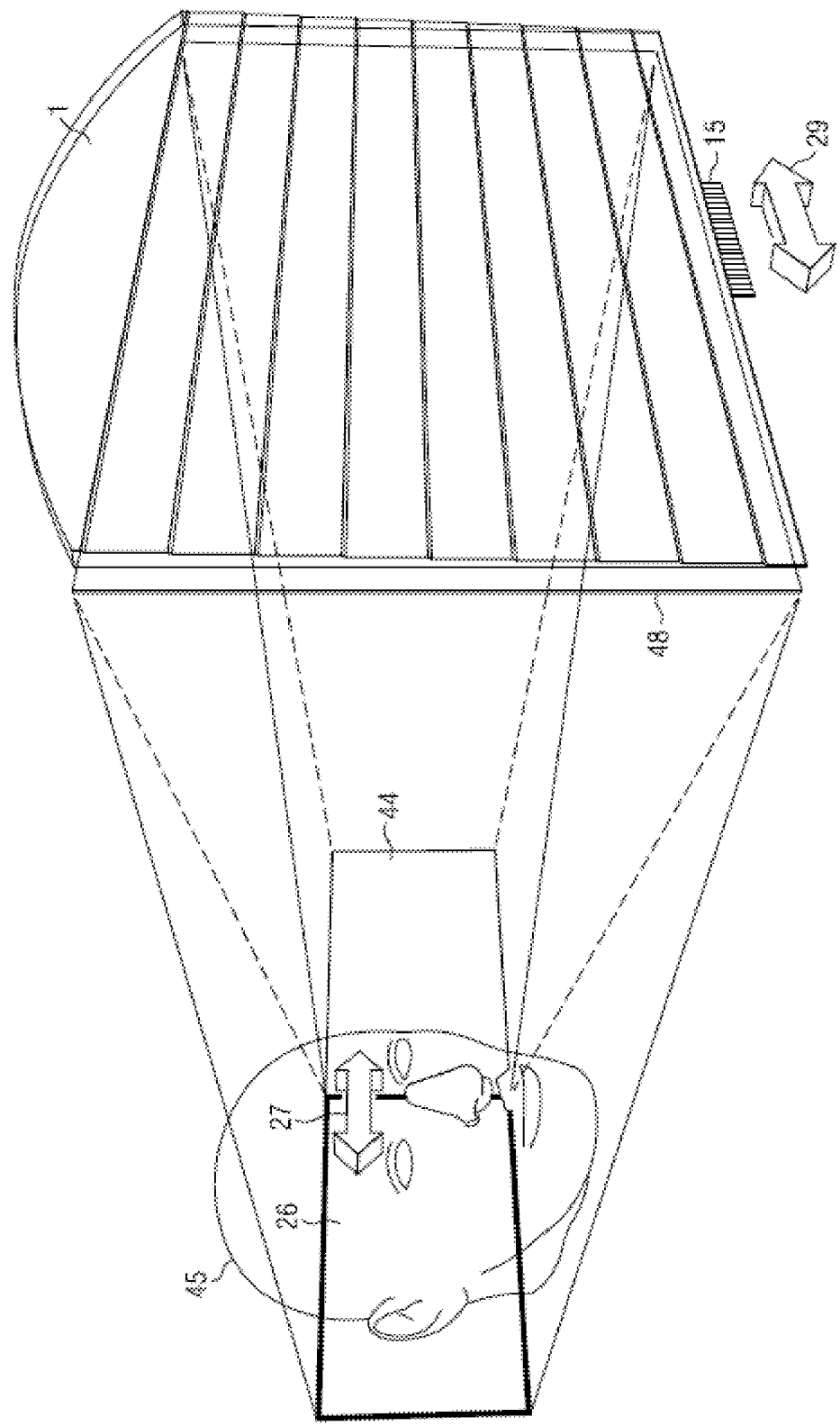
FIG. 7 is a schematic diagram illustrating an observer tracking autostereoscopic directional display device, in accordance with the present disclosure.

FIG. 7 is a schematic diagram illustrating one embodiment of an observer tracking autostereoscopic directional display device. As shown in FIG. 7, selectively turning on and off illuminator elements 15a to 15n along axis 29 provides for directional control of viewing windows. The head 45 position may be monitored with a camera, motion sensor, motion detector, or any other appropriate optical, mechanical or electrical means, and the appropriate illuminator elements of illuminator array 15 may be turned on and off to provide substantially independent images to each eye irrespective of the head 45 position. The head tracking system (or a second head tracking system) may provide monitoring of more than one head 45, 47 (head 47 not shown in FIG. 7) and may supply the same left and right eye images to each viewers' left and right eyes providing 3D to all viewers. Again similar operation can be achieved with all the directional backlights described herein.

Figure 8:
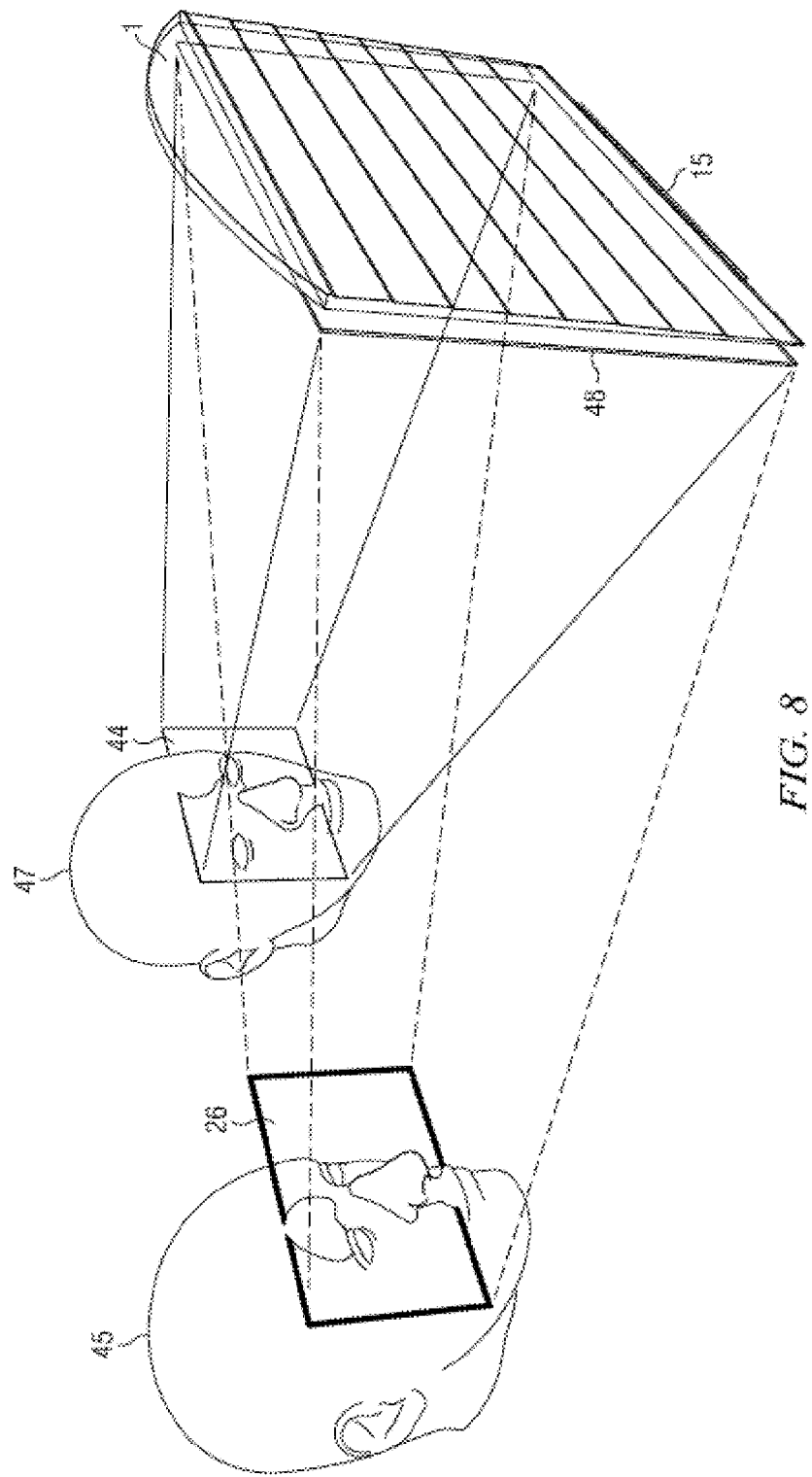
FIG. 8 is a schematic diagram illustrating a multi-viewer directional display device, in accordance with the present disclosure.

FIG. 8 is a schematic diagram illustrating one embodiment of a multi-viewer directional display device as an example including an imaging directional backlight. As shown in FIG. 8, at least two 2D images may be directed towards a pair of viewers 45, 47 so that each viewer may watch a different image on the spatial light modulator 48. The two 2D images of FIG. 8 may be generated in a similar manner as described with respect to FIG. 7 in that the two images would be displayed in sequence and in synchronization with sources whose light is directed toward the two viewers. One image is presented on the spatial light modulator 48 in a first phase, and a second image is presented on the spatial light modulator 48 in a second phase different from the first phase. In correspondence with the first and second phases, the output illumination is adjusted to provide first and second viewing windows 26, 44 respectively. An observer with both eyes in window 26 will perceive a first image while an observer with both eyes in window 44 will perceive a second image.

Figure 9:
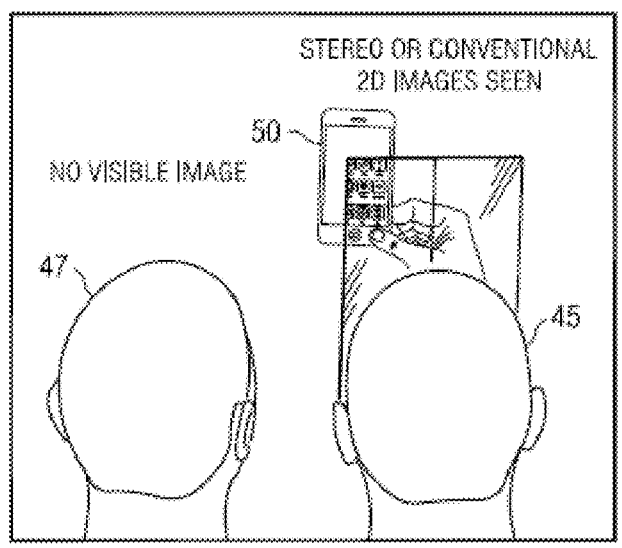
FIG. 9 is a schematic diagram illustrating a privacy directional display device, in accordance with the present disclosure.

FIG. 9 is a schematic diagram illustrating a privacy directional display device which includes an imaging directional backlight. 2D display systems may also utilize directional backlighting for security and efficiency purposes in which light may be primarily directed at the eyes of a first viewer 45 as shown in FIG. 9. Further, as illustrated in FIG. 9, although first viewer 45 may be able to view an image on device 50, light is not directed towards second viewer 47. Thus second viewer 47 is prevented from viewing an image on device 50. Each of the embodiments of the present disclosure may advantageously provide autostereoscopic, dual image or privacy display functions.

Figure 10:
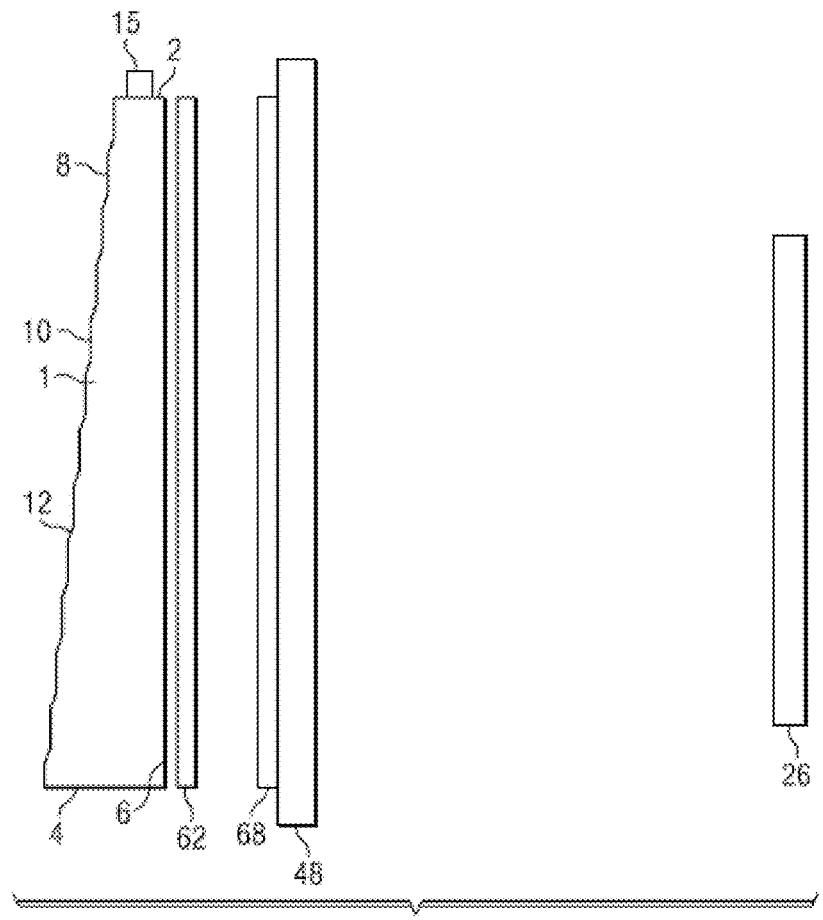
FIG. 10 is a schematic diagram illustrating in side view, the structure of a time multiplexed directional display device, in accordance with the present disclosure.

FIG. 10 is a schematic diagram illustrating in side view the structure of a time multiplexed directional display device as an example including an imaging directional backlight. Further, FIG. 10 shows in side view an autostereoscopic directional display device, which may include the stepped waveguide 1 and a Fresnel lens 62 arranged to provide the viewing window 26 in a window plane 106 at a nominal viewing distance from the spatial light modulator for a substantially collimated output across the stepped waveguide 1 output surface. A vertical diffuser 68 may be arranged to extend the height of the window 26 further. The light may then be imaged through the spatial light modulator 48. The illuminator array 15 may include light emitting diodes (LEDs) that may, for example, be phosphor converted blue LEDs, or may be separate RGB LEDs. Alternatively, the illuminator elements in illuminator array 15 may include a uniform light source and spatial light modulator arranged to provide separate illumination regions. Alternatively the illuminator elements may include laser light source(s). The laser output may be directed onto a diffuser by means of scanning, for example, using a galvo or MEMS scanner. In one example, laser light may thus be used to provide the appropriate illuminator elements in illuminator array 15 to provide a substantially uniform light source with the appropriate output angle, and further to provide reduction in speckle. Alternatively, the illuminator array 15 may be an array of laser light emitting elements. Additionally in one example, the diffuser may be a wavelength converting phosphor, so that illumination may be at a different wavelength to the visible output light.

A further wedge type directional backlight is generally discussed by U.S. Pat. No. 7,660,047 which is herein incorporated by reference in its entirety. The wedge type directional backlight and optical valve further process light beams in different ways. In the wedge type waveguide, light input at an appropriate angle will output at a defined position on a major surface, but light rays will exit at substantially the same angle and substantially parallel to the major surface. By comparison, light input to a stepped waveguide of an optical valve at a certain angle may output from points across the first side, with output angle determined by input angle. Advantageously, the stepped waveguide of the optical valve may not require further light re-direction films to extract light towards an observer and angular non-uniformities of input may not provide non-uniformities across the display surface.

There will now be described some waveguides, directional backlights and directional display devices that are based on and incorporate the structures of FIGS. 1 to 10 above. Except for the modifications and/or additional features which will now be described, the above description applies equally to the following waveguides, directional backlights and display devices, but for brevity will not be repeated. The waveguides described below may be incorporated into a directional backlight or a directional display device as described above. Similarly, the directional backlights described below may be incorporated into a directional display device as described above.

Figure 11:
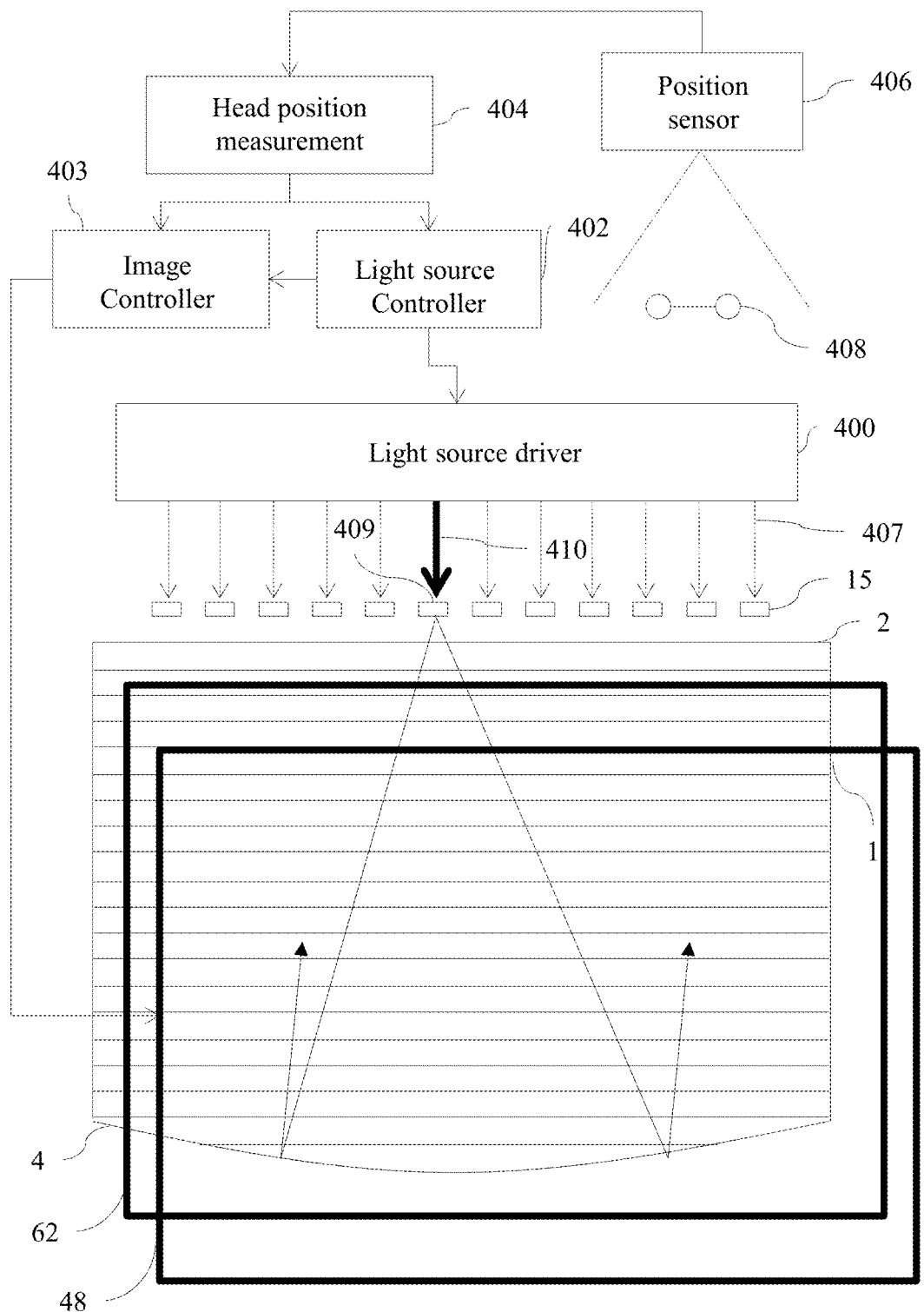
FIG. 11 is a schematic diagram illustrating a directional display apparatus comprising a directional display device and a control system, in accordance with the present disclosure.

FIG. 11 is a schematic diagram illustrating a directional display apparatus comprising a directional display device and a control system. The arrangement and operation of the control system will now be described and may be applied, with changes as necessary, to each of the display devices disclosed herein. The directional backlight comprises a waveguide 1 and an array 15 of illumination elements 15a-15n arranged as described above. The control system is arranged to selectively operate the illumination elements 15a-15n to direct light into selectable viewing windows.

The reflective end 4 converges the reflected light. Fresnel lens 62 may be arranged to cooperate with reflective end 4 to achieve viewing windows at a viewing plane. Transmissive spatial light modulator 48 may be arranged to receive the light from the directional backlight. The image displayed on the SLM 48 may be presented in synchronization with the illumination of the light sources of the array 15.

The control system may comprise a sensor system arranged to detect the position of the observer 99 relative to the display device 100. The sensor system comprises a position sensor 406, such as a camera arranged to determine the position of an observer 408; and a head position measurement system 404 that may for example comprise a computer vision image processing system. The position sensor 406 may comprise known sensors including those comprising cameras and image processing units arranged to detect the position of observer faces. Position sensor 406 may further comprise a stereo sensor arranged to improve the measure of longitudinal position compared to a monoscopic camera. Alternatively position sensor 406 may comprise measurement of eye spacing to give a measure of required placement of respective arrays of viewing windows from tiles of the directional display.

The control system may further comprise an illumination controller and an image controller 403 that are both supplied with the detected position of the observer supplied from the head position measurement system 404.

The illumination controller comprises an LED controller 402 arranged to determine which light sources of array 15 should be switched to direct light to respective eyes of observer 408 in cooperation with waveguide 1; and an LED driver 400 arranged to control the operation of light sources of light source array 15 by means of drive lines 407. The illumination controller 74 selects the illuminator elements 15 to be operated in dependence on the position of the observer detected by the head position measurement system 72, so that the viewing windows 26 into which light is directed are in positions corresponding to the left and right eyes of the observer 99. In this manner, the lateral output directionality of the waveguide 1 corresponds with the observer position.

The image controller 403 is arranged to control the SLM 48 to display images. To provide an autostereoscopic display, the image controller 403 and the illumination controller may operate as follows. The image controller 403 controls the SLM 48 to display temporally multiplexed left and right eye images and the LED controller 402 operates the light sources 15 to direct light into viewing windows in positions corresponding to the left and right eyes of an observer synchronously with the display of left and right eye images. In this manner, an autostereoscopic effect is achieved using a time division multiplexing technique. In one example, a single viewing window may be illuminated by operation of light source 409 (which may comprise one or more LEDs) by means of drive line 410 wherein other drive lines are not driven as described elsewhere.

The head position measurement system 404 detects the position of an observer relative to the display device 100. The LED controller 402 selects the light sources 15 to be operated in dependence on the position of the observer detected by the head position measurement system 404, so that the viewing windows into which light is directed are in positions corresponding to the left and right eyes of the observer. In this manner, the output directionality of the waveguide 1 may be achieved to correspond with the viewer position so that a first image may be directed to the observer's right eye in a first phase and directed to the observer's left eye in a second phase.

Figure 12:
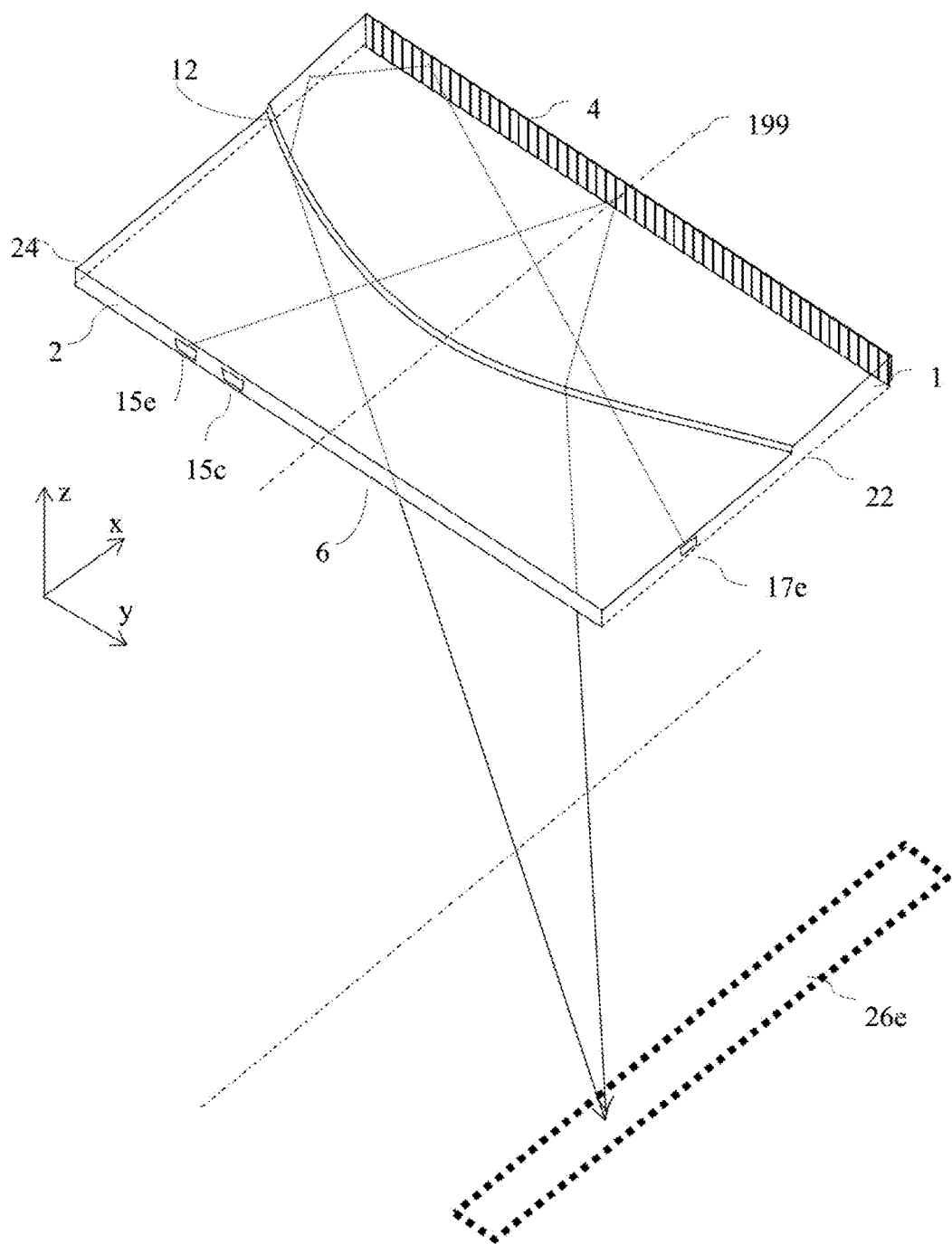
FIG. 12 is a schematic diagram illustrating in perspective view the formation of an optical window by a directional waveguide, in accordance with the present disclosure.

FIG. 12 is a schematic diagram illustrating in perspective view the formation of an optical window by a directional waveguide. Thus light source arrays 15*c*, 15*e* may be arranged on a side opposite reflective end 4, and optional light source 17*e* may be arranged on a side. Light sources 15*e*, 17*e* may cooperate to form optical windows 26*e* in a window plane on the same side of the optical valve 1 as the output side 6, that are substantially real images of the light sources.

Figure 13:
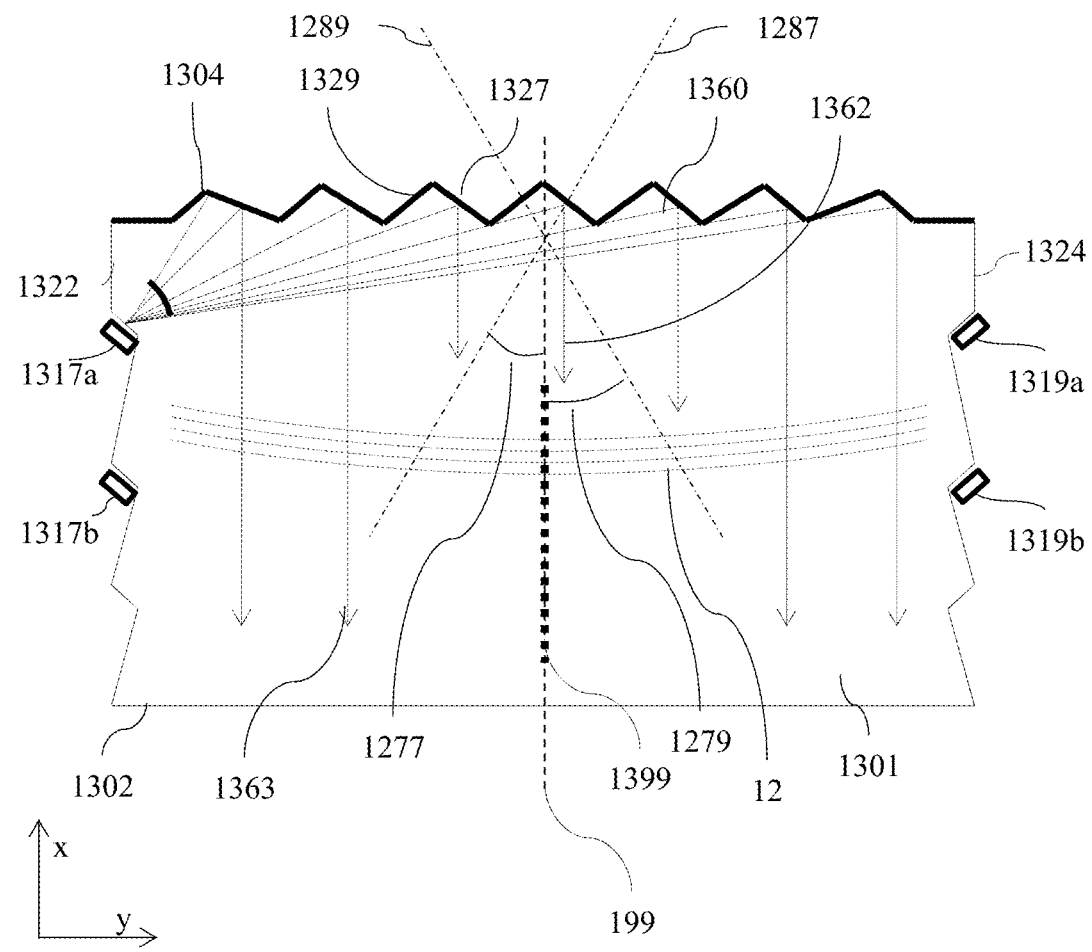
FIG. 13 is a schematic diagram illustrating in front view, an optical valve comprising a side light source arranged to achieve an on-axis optical window, in accordance with the present disclosure.
Figure 14:
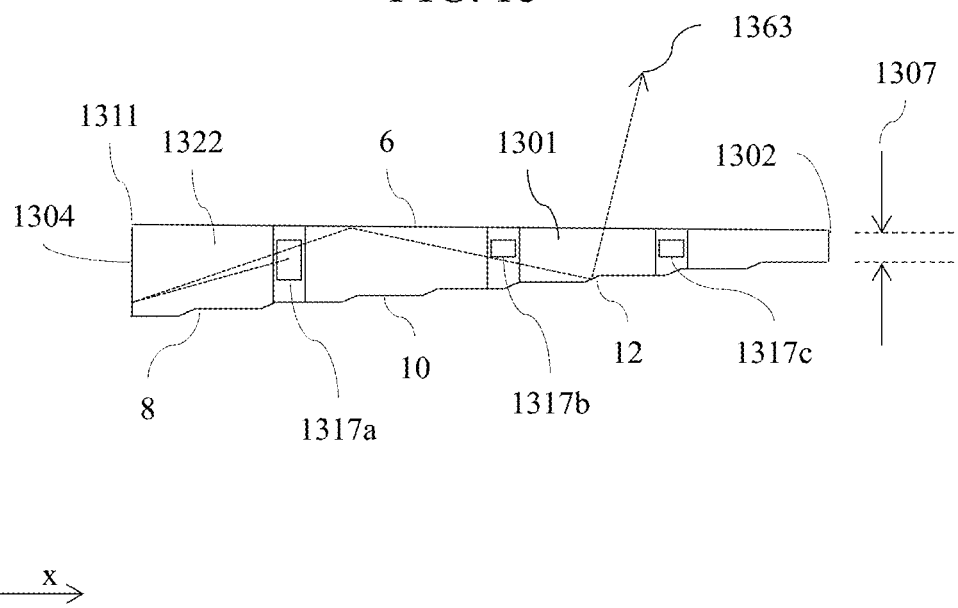
FIG. 14 is a schematic diagram illustrating in side view, an optical valve comprising a side light source arranged to achieve an on-axis optical window, in accordance with the present disclosure.

FIG. 13 is a schematic diagram illustrating in front view, an optical valve comprising a side light source arranged to achieve an on-axis optical window and FIG. 14 is a schematic diagram illustrating in side view, an optical valve comprising a side light source arranged to achieve an on-axis optical window.

By way of comparison with the optical valve illustrated for example in FIG. 12 and as described in U.S. Provisional Pat. Appl. No. 62/167,203 now U.S. patent application Ser. No. 15/165,960; U.S. Pat. Publ. No. 2016-0349444; herein incorporated by reference in its entirety, a directional display device may comprise a waveguide 1301 that further comprises a reflective end 1304 that is elongated in a lateral direction (y-axis), the first and second guide surfaces 6, 8 extending from laterally extending edges of the reflective end 1304, the waveguide 1301 further comprising side surfaces 1322, 1324 extending between the first and second guide surfaces 6, 8, and wherein the light sources include an array 1317 of light sources 1317*a-n* arranged along a side surface 1322 to provide said input light through that side surface 1322, and the reflective end 1304, comprises first and second facets 1327, 1329 alternating with each other in the lateral direction, the first facets 1327 being reflective and forming reflective facets of a Fresnel reflector having positive optical power in the lateral direction, the second facets 1329 forming draft facets of the Fresnel reflector, the Fresnel reflector 1304 having an optical axis 1287 that is inclined towards the side surface 1322 in a direction in which the Fresnel reflector 1304 deflects input light from the array of light sources 1317 into the waveguide 1301. Thus angle 1277 is non-zero. Similarly the second facets 1329 may be reflective and form reflective facets of a Fresnel reflector having positive optical power in the lateral direction, the Fresnel reflector 1304 having an optical axis 1289 that is inclined towards the side surface 1324 in a direction in which the Fresnel reflector 1304 deflects input light from the array of light sources 1319 into the waveguide 1301.

Illustrative light ray 1363 from source 1317*a* may be arranged to provide optical window 1326*a* and light ray 1365 from source 1317*b* may be arranged to provide optical window 1326*b*. Other layers such as diffusers, prismatic reflection films, retarders and spatial light modulators may be arranged in series with the waveguide 1301 in a similar manner to that described for waveguide 1 in the arrangement of FIG. 13 for example.

Advantageously a thin backlight with low bezel size may be achieved. Such an arrangement has light sources that are not arranged on the long sides of the waveguide 1301 and thus may have small form factor. Further light sources 1317 and 1319 may be arranged with overlapping optical windows, and thus display luminance may be increased.

Figure 15:
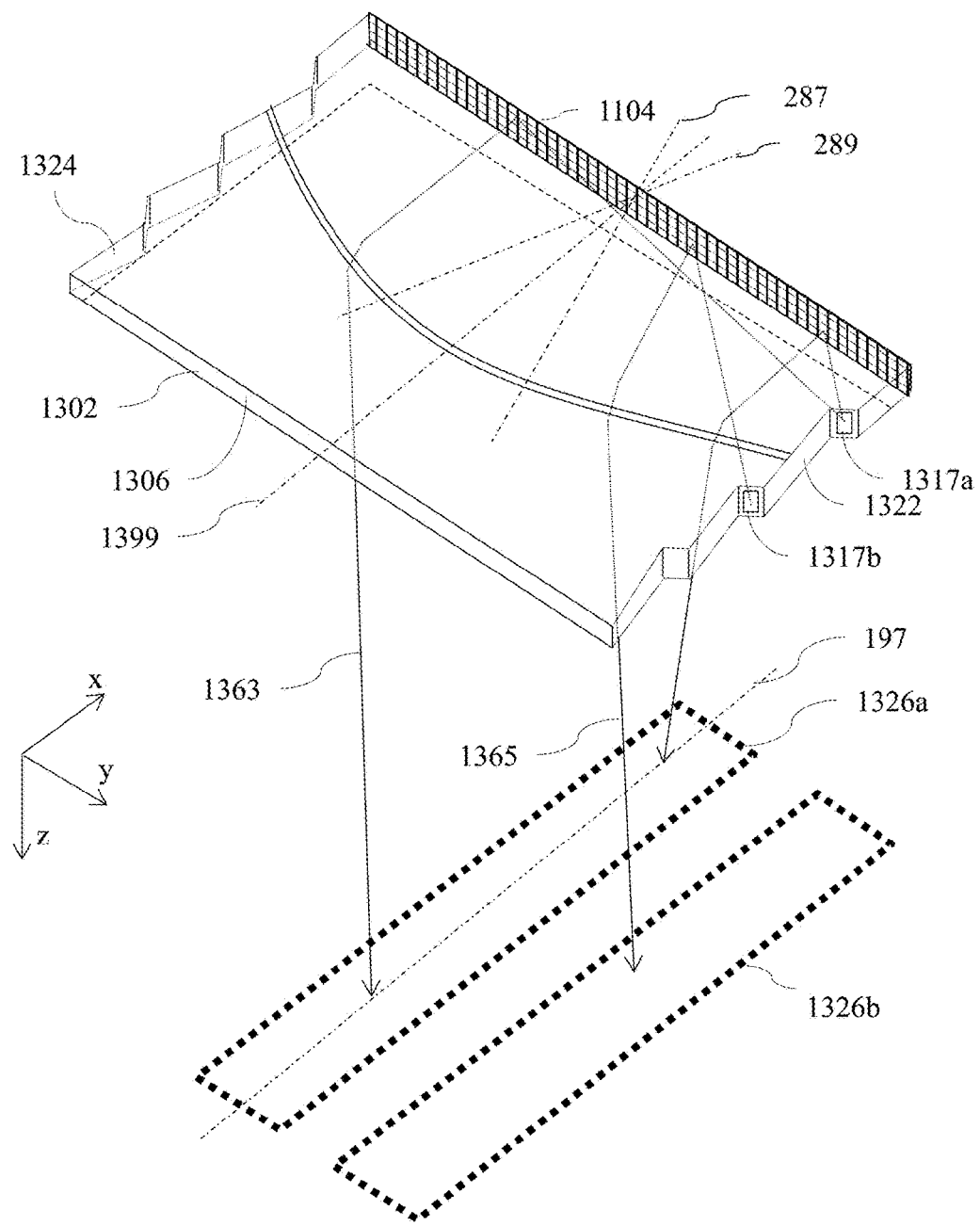
FIG. 15 is a schematic diagram illustrating in perspective view, the formation of first and second optical windows by edge and side light sources with a valve with arrangement similar to that shown in FIGS. 13-14, in accordance with the present disclosure.

FIG. 15 is a schematic diagram illustrating in perspective view, the formation of first and second optical windows by edge and side light sources with a valve with arrangement similar to that shown in FIGS. 13A-B. Thus optical window 1326*a* may be formed in a window plane by rays 1363 originating at source 1371*a* about an axis 197. Further optical windows 1326*b* formed by rays 1365 may be offset in the window plane and originate from source 1317*b*. Thus optical windows 1326*a*, 1326*b* are further examples of real images of light sources 1317*a*, 1317*b* respectively.

Figure 16:
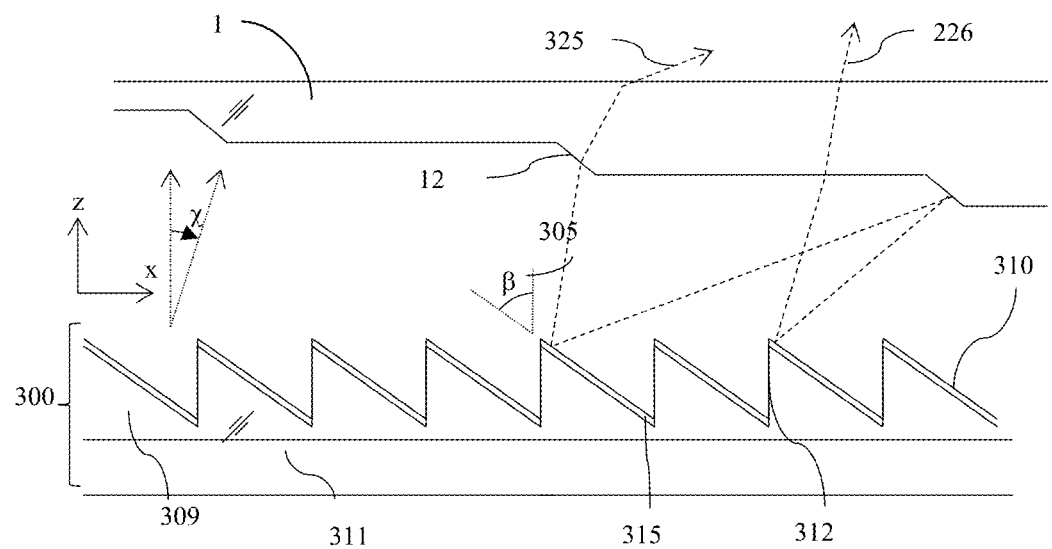
FIGS. 16 and FIG. 17 are schematic diagrams illustrating a detail of side views of a waveguide with a rear reflector with an array of reflective facets, in accordance with the present disclosure.
Figure 17:
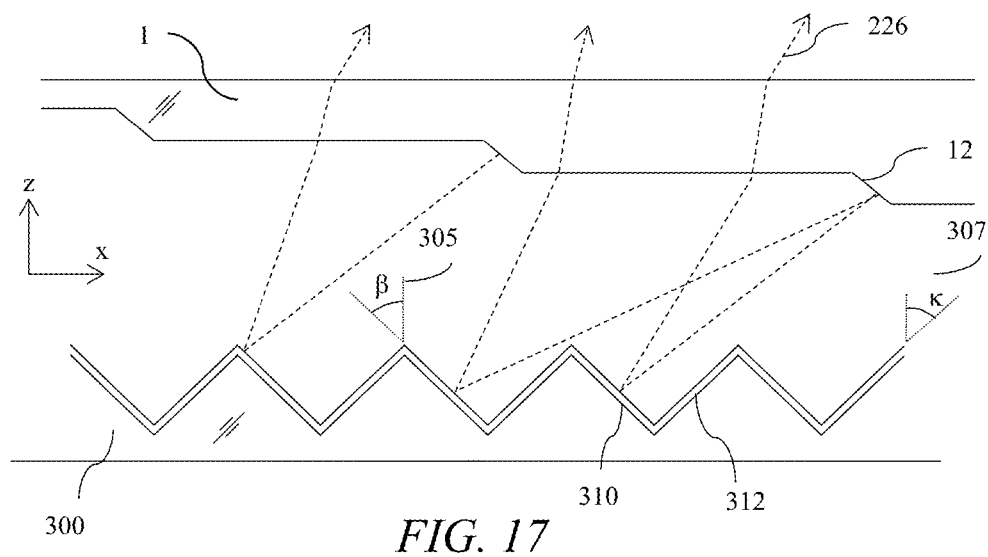

FIGS. 16-17 are schematic diagrams illustrating a detail of side views of a waveguide with a rear reflector with an array of reflective facets as described in U.S. Pat. Publ. No. 2014-0240828, herein incorporated by reference in its entirety.

FIG. 16 is a schematic diagram illustrating a detail of a side view of a waveguide 1 including a rear reflector including an array of reflective facets. Thus reflector 300 may include a saw-tooth structure with reflective facets 310 and drafts, or intermediate facets 312. The tilt angle $\beta$ 305 from the vertical of the facet 310 may be determined as will be described below. Thus light rays 226 transmitted through the feature 12 (otherwise termed herein facet 12) are directed back through the waveguide 1. The light rays 226 advantageously increase the brightness of the viewing windows while maintaining the directionality of the viewing windows, reducing image cross talk.

FIG. 17 is a schematic diagram illustrating a detail of a side view of a waveguide 1 including a rear reflector including an array of reflective facets. In this embodiment the intermediate facets 312 may be arranged with a tilt angle κ 307 from the vertical that is arranged so that transmitted light from the features 12 is arranged not to reflect from the intermediate facets 312 by shielding provided by the reflective facets 310.

The rear reflector may be spaced from the waveguide 1 such that the light from an individual facet of the waveguide 1 is incident on plural reflective facets 310 of the rear reflector 300, the rear reflector 300 may further include intermediate facets 312 extending between the reflective facets of the rear reflector, the intermediate facets being inclined in an opposite sense from the reflective facets of the rear reflector at an angle such that said light from the light sources that is transmitted through the plurality of facets of the waveguide is not incident on the intermediate facets.

Advantageously the arrangement of FIG. 17 may be more conveniently manufactured with uniform reflectivity and is less susceptible to incorrect fitting during the display assembly process. Further, the arrangement of FIG. 17 may achieve polarization recirculation as described in U.S. Pat. Publ. No. 2014-0240828 and in U.S. Pat. No. 9,235,057, herein incorporated by reference in its entirety.

Figure 18:
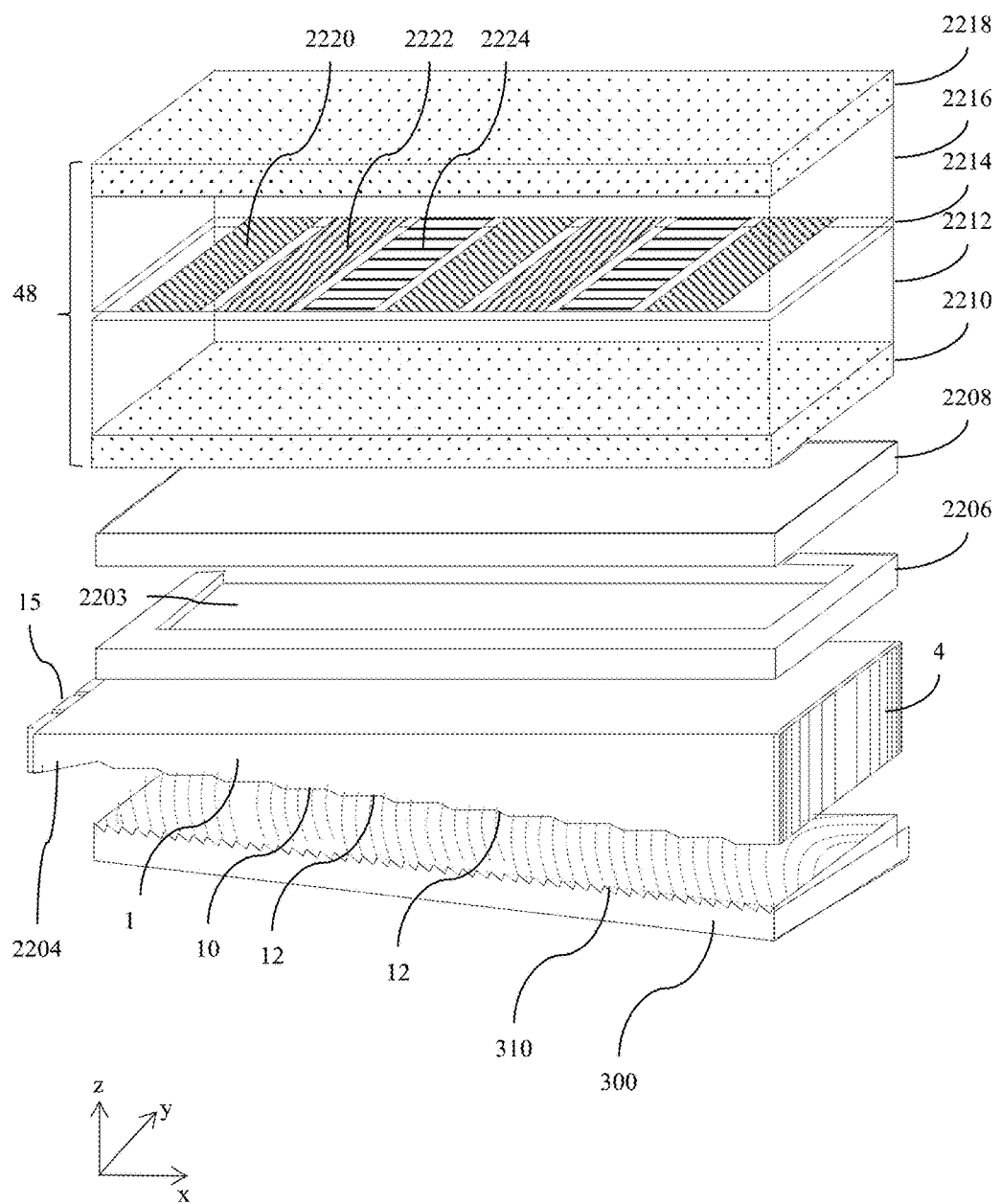
FIG. 18 is a schematic diagram illustrating in perspective view, the structure of a directional display device comprising a directional backlight comprising input on a side that is opposite the reflective end and arranged with a spatial light modulator, in accordance with the present disclosure.

FIG. 18 is a schematic diagram illustrating in perspective view, the structure of a directional display device comprising a waveguide 1 arranged with a spatial light modulator 48. Reflective end 4 may be provided by a Fresnel mirror. Taper region 2204 may be arranged at the input to the waveguide 1 to increase input coupling efficiency from the light sources 15a-15n of the array of illuminator elements 15 and to increase illumination uniformity. Shading layer 2206 with aperture 2203 may be arranged to hide light scattering regions at the edge of the waveguide 1. Rear reflector 300 may comprise facets 310 that are curved and arranged to provide viewing windows 26 from groups of optical windows provided by imaging light sources of the array 15 to the window plane 106. Optical stack 2208 may comprise reflective polarizers, retarder layers and diffusers. Rear reflectors 300 and optical stack 2208 are described further in U.S. patent application Ser. No. 14/186,862, filed Feb. 21, 2014, entitled "Directional backlight" (U.S. Pat. Publ. No. 2014-0240828; incorporated herein by reference in its entirety.

Spatial light modulator 48 may comprise a liquid crystal display that may comprise an input polarizer 2210, TFT glass substrate 2212, liquid crystal layer 2214, color filter glass substrate 2216 and output polarizer 2218. Red pixels 2220, green pixels 2222 and blue pixels 2224 may be arranged in an array at the liquid crystal layer 2214. White, yellow, additional green or other color pixels (not shown) may be further arranged in the liquid crystal layer to increase transmission efficiency, color gamut or perceived image resolution.

In the embodiment of FIG. 18, injection of input light into the waveguide is along the long edge. The physical size of the LED packages of the array 15 and scatter from waveguide and other surfaces near the input end 2 limit the minimum bezel width that can be achieved.

Thus a directional display device may comprising a directional backlight 1, 300, 2208; and a transmissive spatial light modulator 48 arranged to receive the output light from the waveguide 1 and to modulate it to display an image.

Further a directional display apparatus may comprise said directional display device and a control system such as illustrated in FIG. 11 arranged to control the light sources 15a-n.

Figure 19:
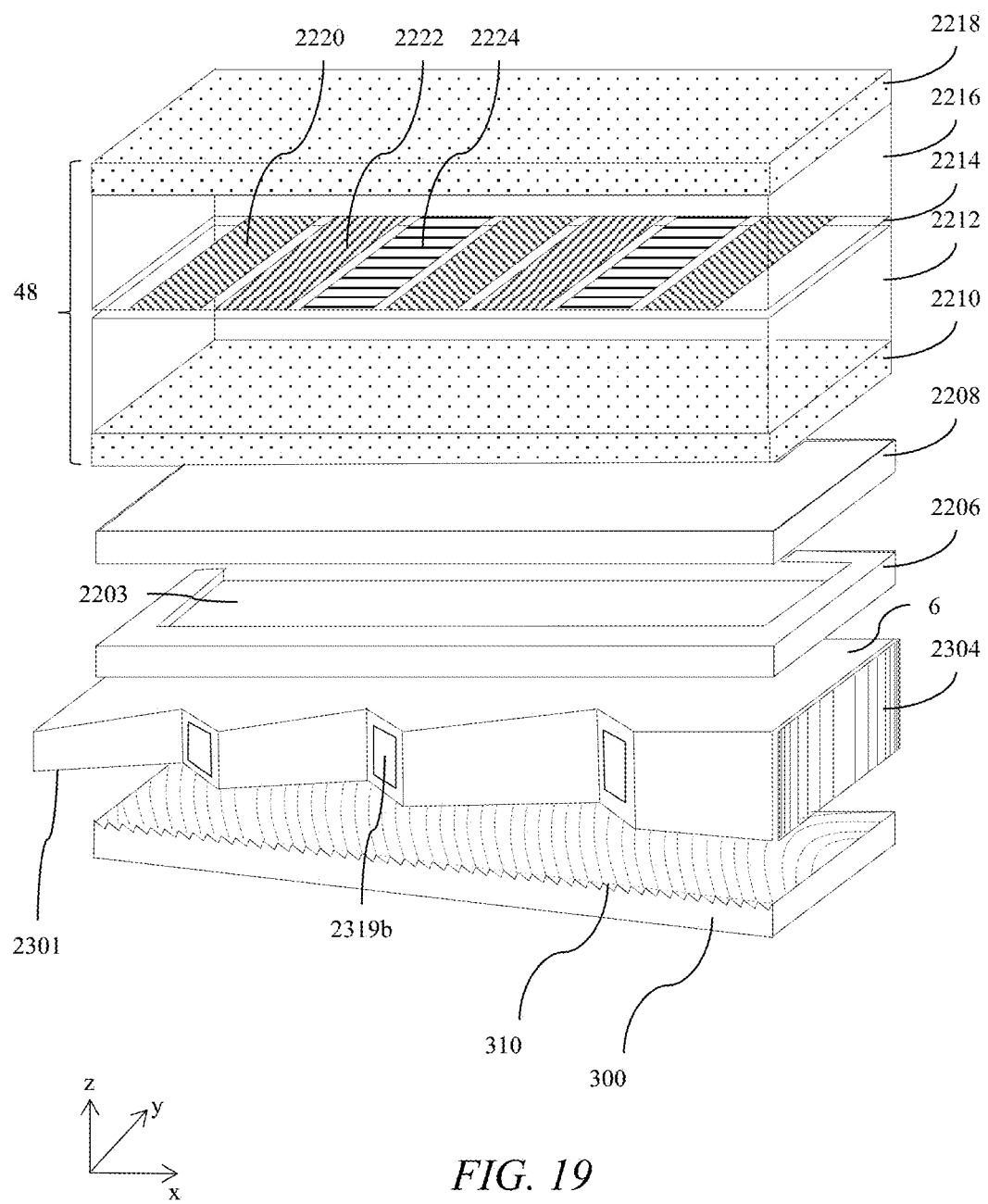
FIG. 19 is a schematic diagram illustrating in perspective view, the structure of a directional display device comprising an directional backlight comprising a side light source arranged with a spatial light modulator, in accordance with the present disclosure.

FIG. 19 illustrates in perspective view a display apparatus comprising an optical stack comprising a waveguide as illustrated in FIGS. 13A-14.

The lateral uniformity of a display with a single window plane and viewed from different longitudinal positions in front of a display apparatus will now be described.

Figure 20A:
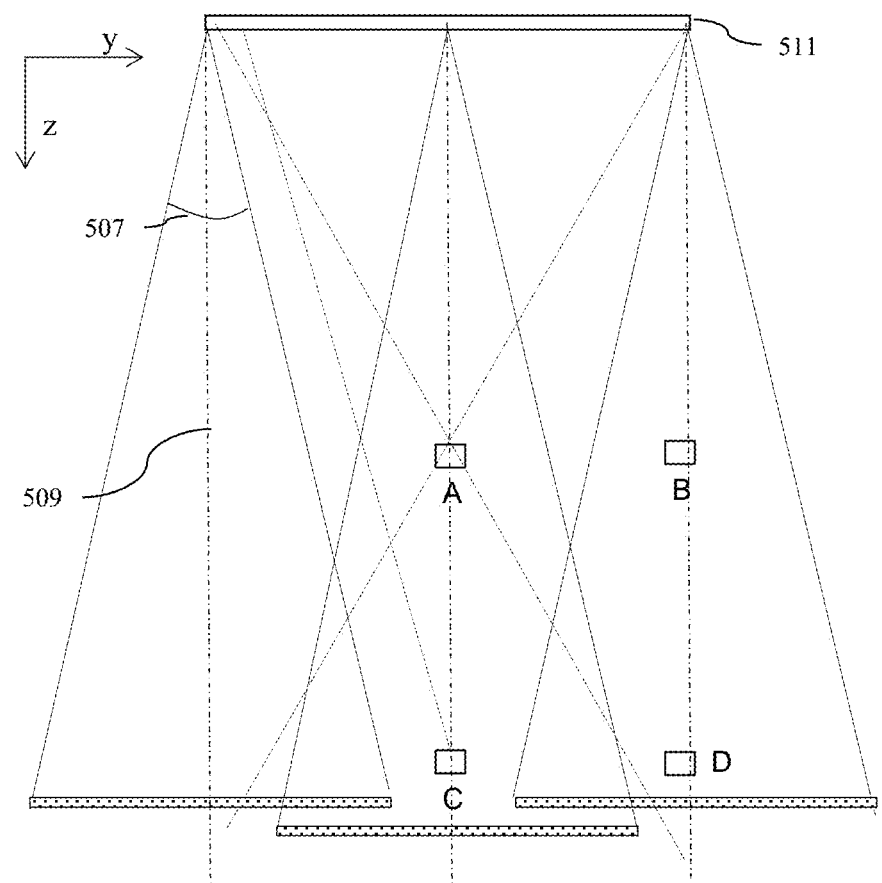
FIG. 20A is a schematic diagram illustrating in top view camera locations for observation of an optical valve with an infinite distance window plane, in accordance with the present disclosure.
Figure 20B:
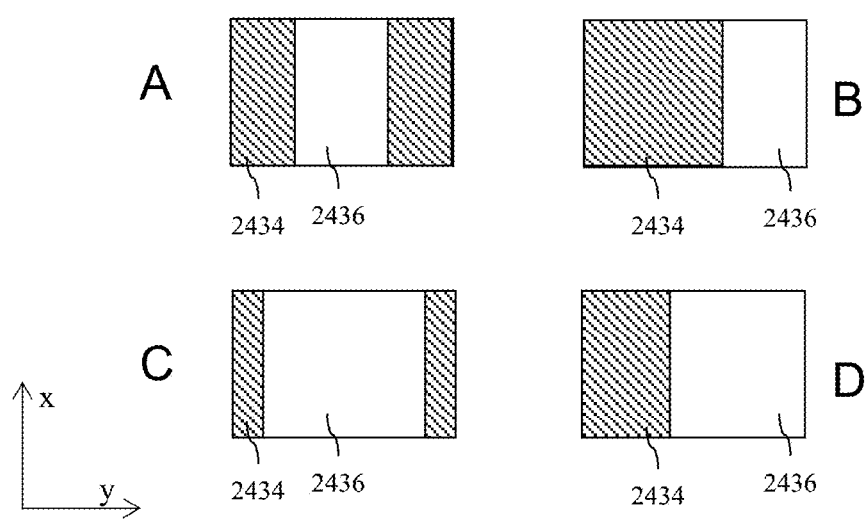
FIG. 20B is a schematic diagram illustrating in front view camera images at different locations of an optical valve with an infinite distance window plane, in accordance with the present disclosure.

FIG. 20A is a schematic diagram illustrating in top view camera locations for observation of an optical valve with an infinite distance window plane. FIG. 20B is a schematic diagram illustrating in front view camera images at different locations of an optical valve with an infinite distance window plane.

Such display may be referred to as a collimated display 511 and is typical of the output of a display without a directional backlight, for example display backlights comprising BEF™ prismatic films from 3M Corporation. Such displays have a lateral roll-off with angle that is uniform across the display area. Thus for all positions, the luminance in the normal direction is greater than the luminance in off-axis viewing positions.

For clarity of explanation, it is assumed that a collimated display can be represented as having a top-hat angular luminance function that is white for a range of angles 507 around the normal directions 509, and dark for regions outside the angular range 507. In practice, the luminance rolls off uniformly with angle, however the following explanation of lateral uniformity represents the relative luminance seen across the display width.

In operation for camera positions A and C then the center of the display is brighter (high luminance region 2436) than the edges of the display (low luminance region 2434). For camera positions B and D the near side of the display (i.e. the right side of the display if the observers move right) is brighter than the far side of the display. Such a display appearance is typically considered a natural luminance behavior for lateral movement with respect to the display.

It would be desirable to achieve a natural looking directional display for lateral movement of an observer.

Figure 21A:
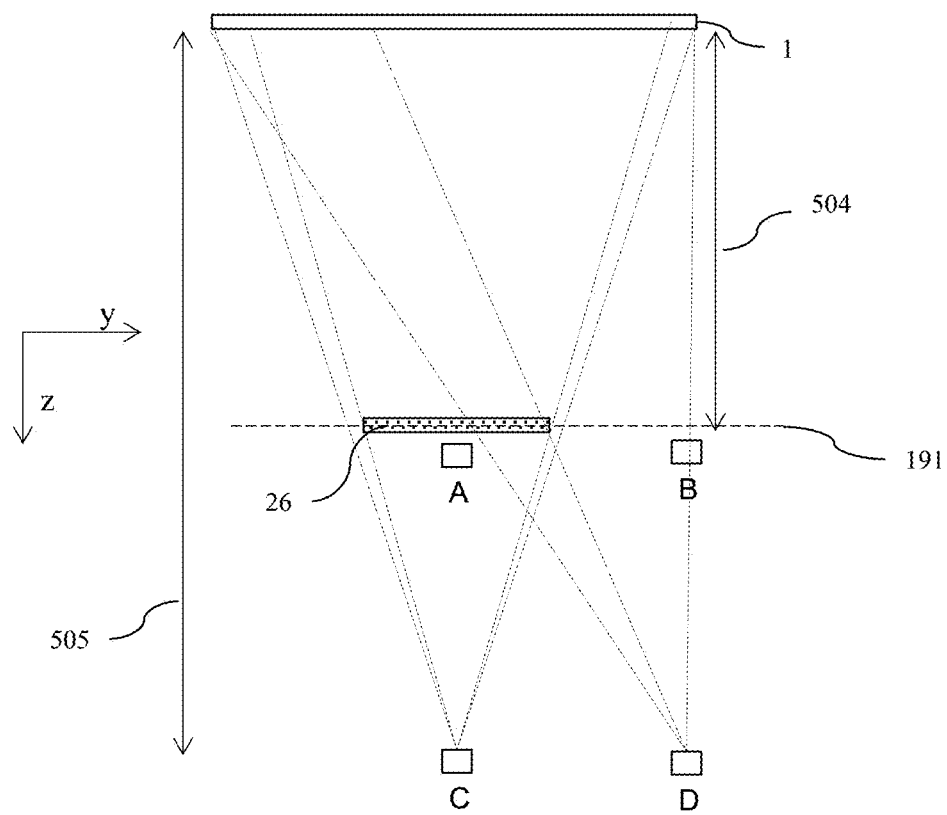
FIG. 21A is a schematic diagram illustrating in top view camera locations for observation of an optical valve with a finite distance window plane, in accordance with the present disclosure.
Figure 21B:
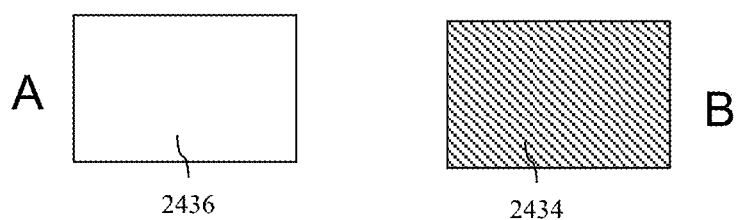
FIG. 21B is a schematic diagram illustrating in front view camera images at different locations of an optical valve with a finite distance window plane, in accordance with the present disclosure.

FIG. 21A is a schematic diagram illustrating in top view camera locations for observation of a directional display comprising an optical valve 1 with a finite distance window plane 191 and FIG. 21B is a schematic diagram illustrating in front view camera images at different locations of an optical valve 1 with a finite distance window plane 191. The SLM 48 is presented with a uniform white image.

Thus camera A in the window plane 191, at window distance 504 from the waveguide 1, and within the viewing window 26 will see light from a single point in viewing window 26 (that may comprise multiple optical windows). Thus a substantially uniform white (high luminance region 2436) image will be seen at position A as shown in FIG. 21B. Camera B in the window plane 191 but outside the window 26 will see no light, and a uniform image with low luminance will be seen in region 2434.

For camera C at a distance 505 then high luminance region will be seen in the center of the image, while low luminance 2434 edge regions will be seen at the sides, in a similar manner to FIG. 20B. Camera B has a uniformly dark appearance. Advantageously such a directional display can provide high lateral uniformity for observers in the window plane 191.

However camera D has a near side region that is a low luminance region 2434, in comparison to the high luminance region of FIG. 20B. Such a near side dark region can be considered unnatural appearance for observers outside the window plane 191.

Figure 22A:
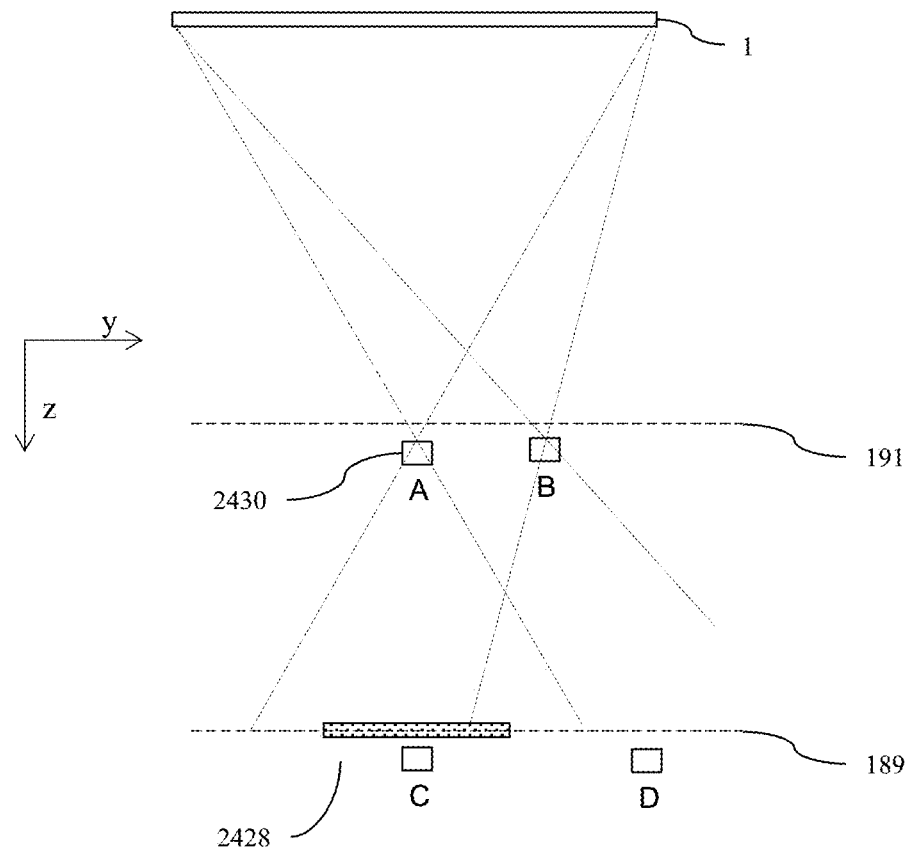
FIG. 22A is a schematic diagram illustrating in top view camera locations for observation of an optical valve with two finite distance window planes, in accordance with the present disclosure.
Figure 22B:
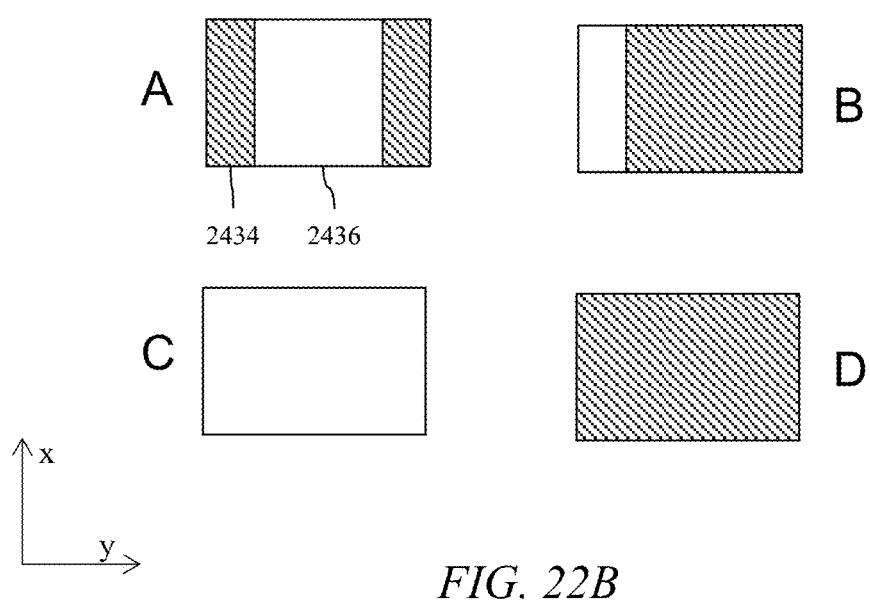
FIG. 22B is a schematic diagram illustrating in front view camera images at different locations of an optical valve with two finite distance window planes, in accordance with the present disclosure.

FIG. 22A is a schematic diagram illustrating in top view camera locations for observation of an optical valve a second finite distance window plane 189. FIG. 22B is a schematic diagram illustrating in front view camera images at different locations of an optical valve with two finite distance window planes.

Thus observers C and D see uniform images, while observer B sees a near side dark image. Thus the uniformity of the image seen by observer D is a weighted average of the luminance contributions from each of the window plane. Advantageously, the lateral uniformity of the display is increased for observers that are away from the window plane 191.

The formation of viewing windows in displays comprising a single window plane 191 will now be described in more detail.

Figure 23:
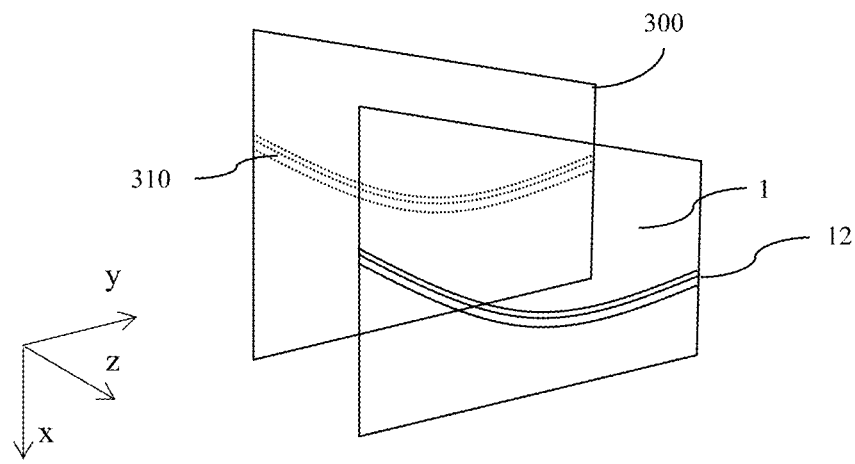
FIG. 23 is a schematic diagram illustrating in perspective front view an arrangement of rear reflector and valve with first and second facet curvatures arranged to achieve a common window plane, in accordance with the present disclosure.

FIG. 23 is a schematic diagram illustrating in perspective front view an arrangement of rear reflector 300 and directional waveguide 1 with first and second facet curvatures arranged to achieve a common viewing window plane 191.

Figure 24:
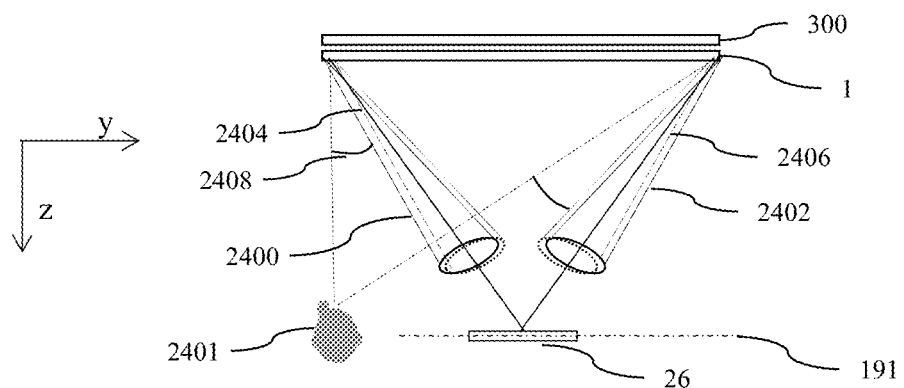
FIG. 24 is a schematic diagram illustrating in top view the formation of optical windows from the arrangement of FIG. 23, in accordance with the present disclosure.

FIG. 24 is a schematic diagram illustrating in top view the formation of optical windows from the arrangement of FIG. 23. Thus for a single light source, light cones 2400, 2402 directly from the reflective facets 12 and light cones 2404, 2406 from the reflective facets 310 of the rear reflector 300 are aligned to provide common optical window 26 in a common window plane 191.

Figure 25:
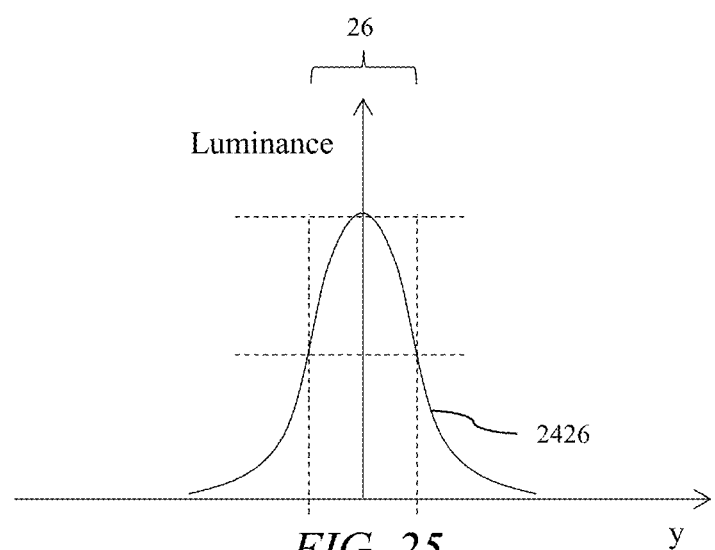
FIG. 25 is a schematic diagram illustrating a graph of the variation of luminance with lateral position in the window plane for a viewing window, in accordance with the present disclosure.

FIG. 25 is a schematic diagram illustrating a graph of the variation of luminance with lateral position in the window plane for a viewing window. Such a profile 2426 represents the typical lateral uniformity variation in the window plane 191 for the display of FIG. 24 when the optical windows from multiple light sources are combined to provide a privacy mode of operation. The viewing window 26 may be defined as the full width half maximum of the profile 2426.

The off axis appearance of images from directional displays will now be described.

Figure 26:
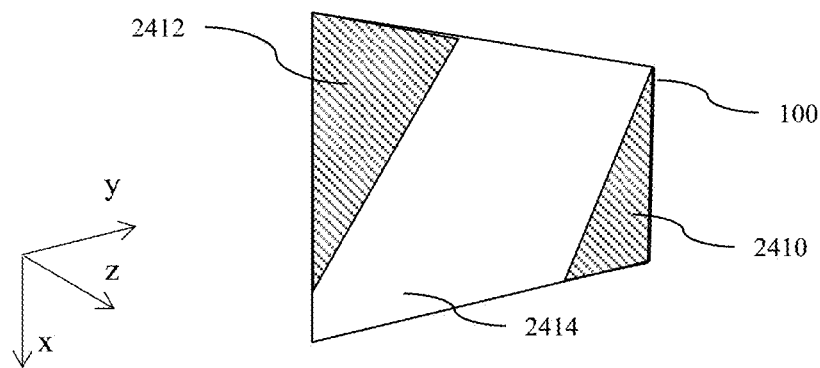
FIG. 26 is a schematic diagram illustrating in perspective front view the appearance of a display comprising the arrangement of FIG. 23 from an off-axis viewing position, in accordance with the present disclosure.

FIG. 26 is a schematic diagram illustrating in perspective front view the appearance of a display comprising the arrangement of FIG. 23 from an off-axis viewing position. Void regions 2412, 2410 may be observed in arrangements where insufficient light is available to provide uniformity for such wide angle viewing positions, or the voids are of different luminance to the luminance of the main beam region 2414, as described in U.S. patent application Ser. No. 15/097,750 (U.S. Pat. Publ. No. 2016-0299281; herein incorporated by reference in its entirety.

Figure 27:
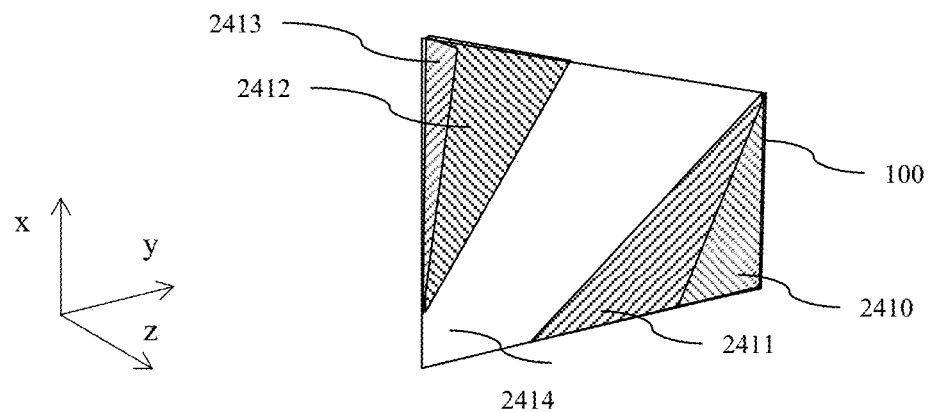
FIG. 27 is a schematic diagram illustrating in perspective front view the appearance of a display comprising the arrangement of FIG. 31 from an off-axis viewing position, in accordance with the present disclosure.

FIG. 27 is a schematic diagram illustrating in perspective front view the appearance of a display comprising multiple window planes (as will be described with reference to the arrangement of FIG. 31) from an off-axis viewing position. For an off-axis observer in the window plane 191, voids 2410, 2412 may be observed whereas voids 2411, 2413 may be observed for light that is directed to window plane 187. The voids for each region may have lower relative difference from the main region 2414 and thus may be less visible in combination from a given viewing angle. Advantageously image uniformity for off-axis viewing positions is improved in comparison to the arrangement of FIG. 26.

It would be desirable to reduce the visibility of the void regions 2412, 2410 in comparison to the main beam region 2414 to optimize uniformity by providing multiple window planes.

The formation of window planes by elongate extraction features 12 and reflective facets 310 will now be described.

Figure 28:
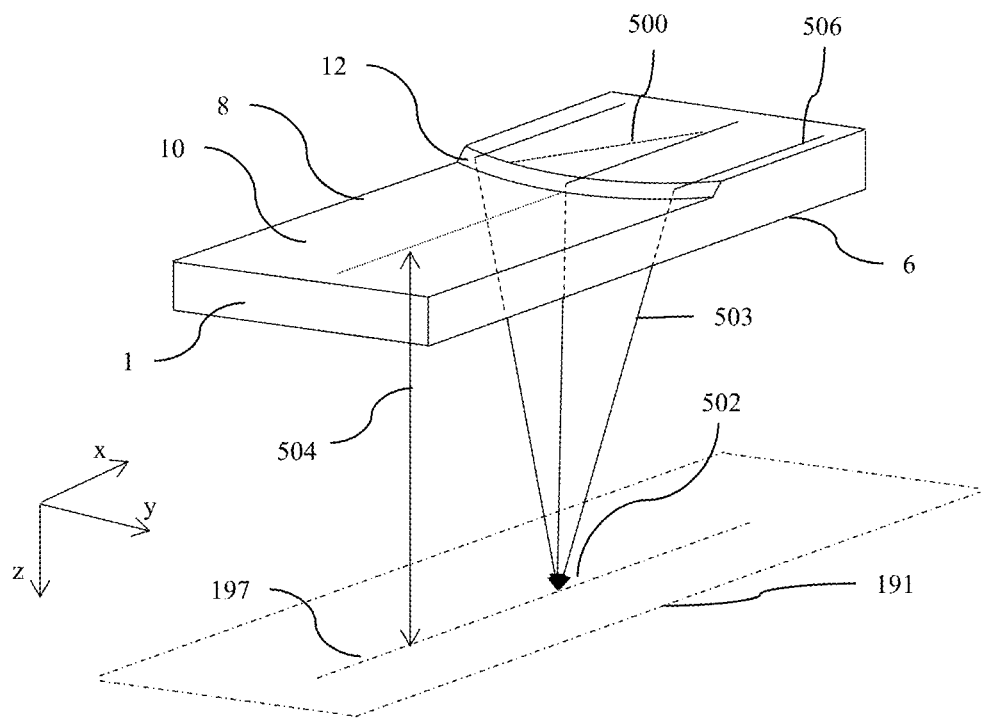
FIG. 28 is a schematic diagram illustrating in perspective view light extraction by reflection from a facet of a directional waveguide, in accordance with the present disclosure.
Figure 29:
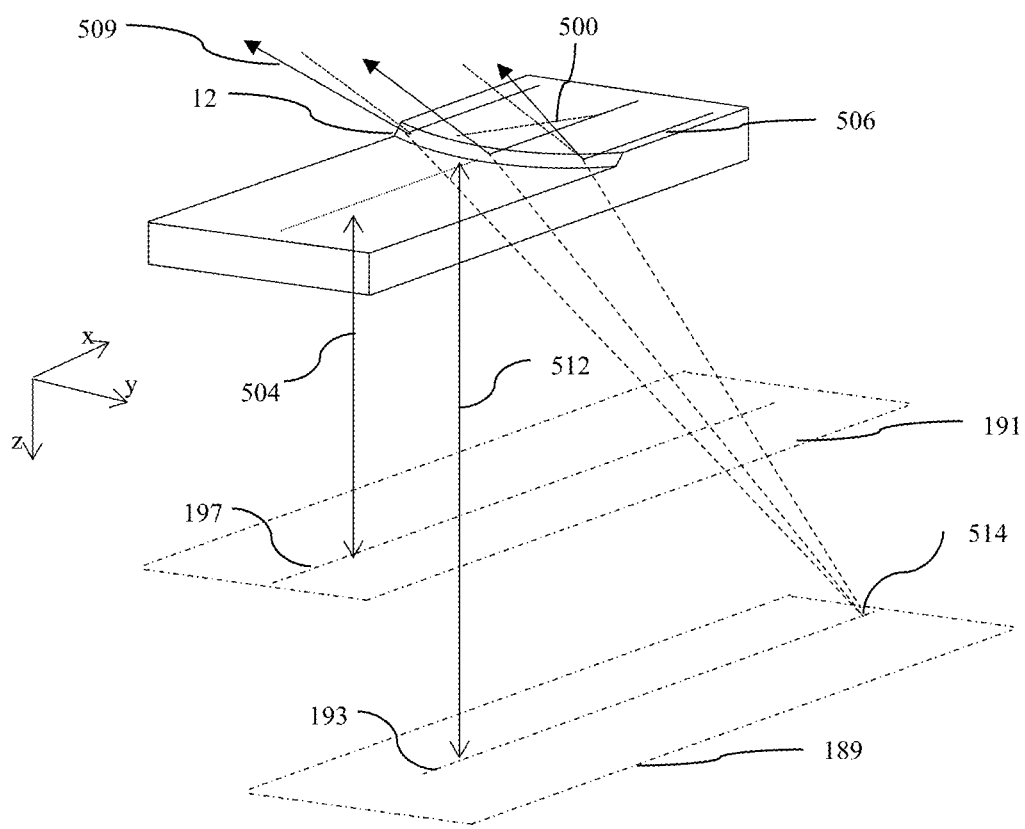
FIG. 29 is a schematic diagram illustrating in perspective view light extraction by transmission through a facet of a directional waveguide, in accordance with the present disclosure.

FIG. 28 is a schematic diagram illustrating in perspective view light extraction by reflection from a facet of a directional waveguide and FIG. 29 is a schematic diagram illustrating in perspective view light extraction by transmission through a facet of a directional waveguide.

In FIG. 28 parallel light rays 506 from an on-axis source that have been reflected at reflected end 4 are further reflected by total internal reflection at the light extraction feature 12 and converge as rays 503 to an image 502 in the window plane at a distance 504 from the waveguide that is on axis 197 in a first plane. The radius of curvature 500 of the feature 12 provides positive optical power to the rays 503, by means of deflection at the inclined curved surface of the feature. As described previously, such image 502 forms a real optical window in combination with images from a light source of the array 15 of light sources 15*a-n* (or light sources 1317*a-n*, 1319*a-n*).

In FIG. 29 light rays 507 that represent a different guiding mode in the waveguide 1 to the light rays 506 are incident on the facet 12 and are transmitted as diverging rays 509 from the facet 12. A virtual image 514 may be formed at a distance 512 in plane 189 that is greater than the distance 504.

It would be desirable to further increase the illuminance of a directional backlight by collecting and imaging light that is transmitted through the facets 12 of the waveguide 1.

Figure 30:
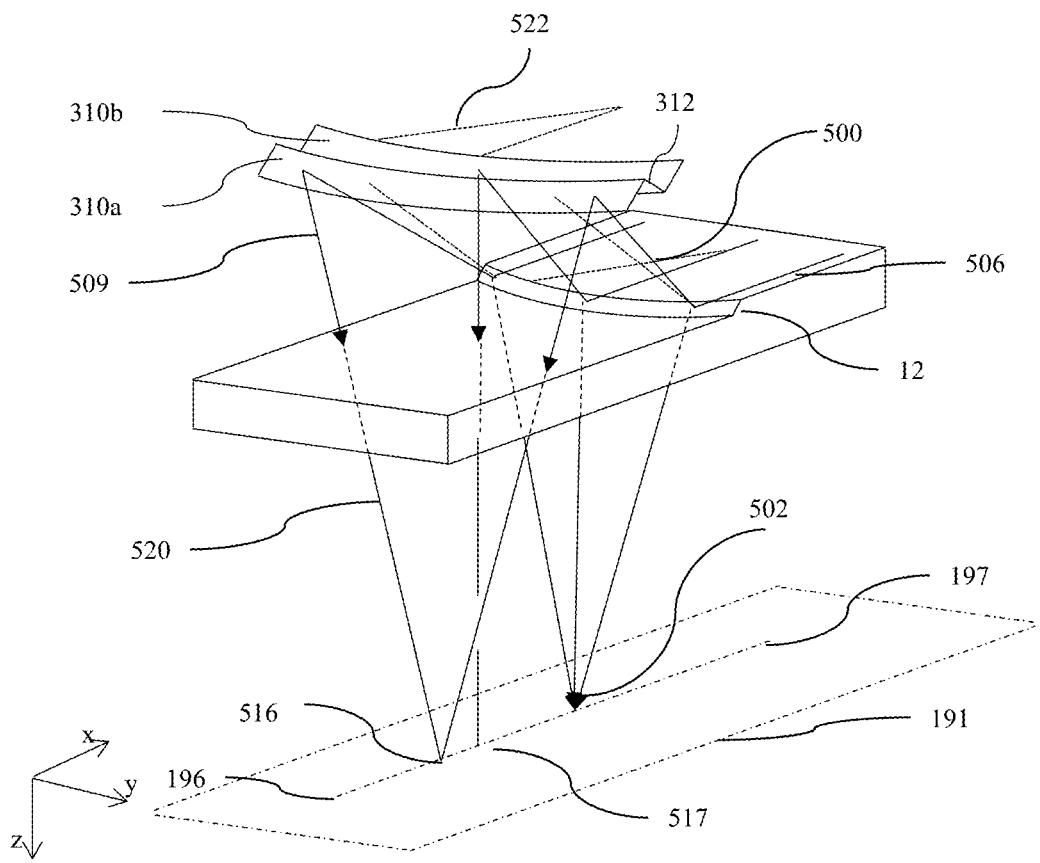
FIG. 30 is a schematic diagram illustrating in perspective view light extraction by (i) reflection by a facet of directional waveguide and (ii) transmission through a facet of a directional waveguide and reflection from a facet of a rear reflector, in accordance with the present disclosure.

FIG. 30 is a schematic diagram illustrating in perspective view light extraction by (i) reflection by a facet 12 of directional waveguide 1 and (ii) transmission through a facet 12 of a directional waveguide 1 and reflection from a facet 310 of a rear reflector 300 with radius of curvature 522. Thus transmitted diverging light rays 509 may be converged by curved facet 310*a*, 310*b* to form respective images 516, 517 that are on axis 197 but may have different locations along the axis 197. By design of curvatures 522, 500 to compensate for divergence of light rays 509, images 516, 517 may be arranged in substantially the same window plane 191 as image 502 formed directly by reflection from the light extraction feature 12 of the waveguide 1. Optical windows may be formed in a common window plane 191, comprising axis 197.

It would be desirable to provide multiple window planes to achieve increased uniformity for observers that are not in the window plane and are viewing from positions that are not on-axis.

Figure 31:
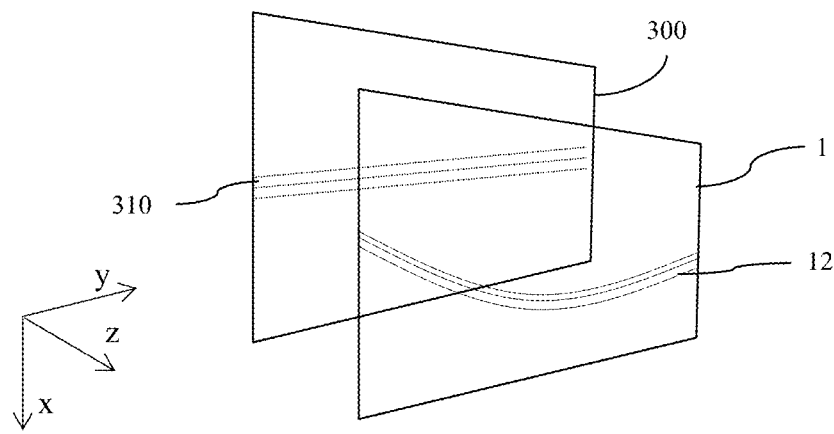
FIG. 31 is a schematic diagram illustrating in perspective front view an arrangement of rear reflector and valve with first and second facet curvatures arranged to achieve different window plane locations, in accordance with the present disclosure.
Figure 32:
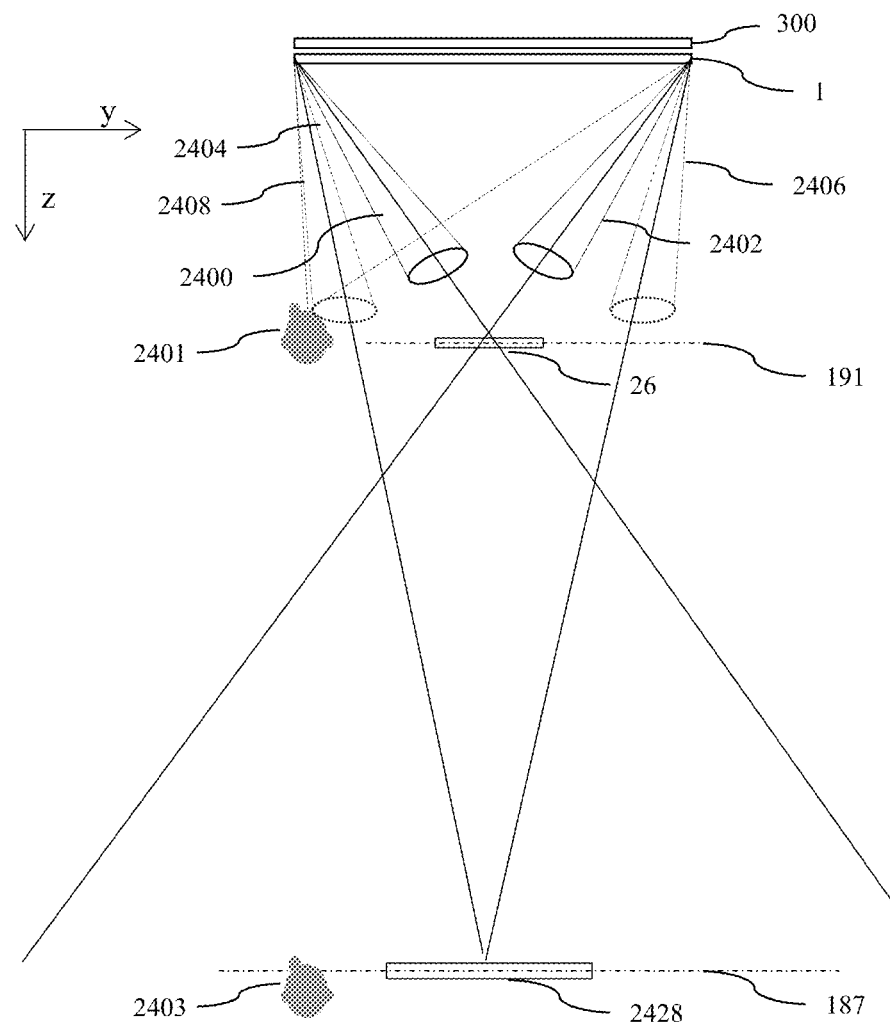
FIG. 32 is a schematic diagram illustrating in top view the formation of optical windows from the arrangement of FIG. 31, in accordance with the present disclosure.

FIG. 31 is a schematic diagram illustrating in perspective front view an arrangement of rear reflector and valve with first and second facet curvatures arranged to achieve different viewing window plane locations and FIG. 32 is a schematic diagram illustrating in top view the formation of optical windows from the arrangement of FIG. 31.

Observer 2401 at the first window plane 191 observes nominally the same display luminance provided by cones 2400, 2402, as the angular offset from the cones is the same across the width of the display. Thus for light that is directed into window 26, the display is substantially laterally uniform. However, the observer 2401 is closer to the center of cone 2408 than the cone 2406, as said cones are directed to viewing window plane 187 to form viewing window 2428. Thus the lateral uniformity of the display will be different for light that is directed to viewing window 2428.

Similarly an observer 2403 at window plane 187 sees substantially uniform illumination from cones 2406, 2408 but is closer to cone 2402 than cone 2400. Thus the luminance varies across the display for light that is directed into viewing window 26. Thus the observers 2401, 2403 see a mixture of uniformity across the display width that varies with their longitudinal and lateral position in a similar manner to that illustrated in FIGS. 21B and 22B.

Figure 33:
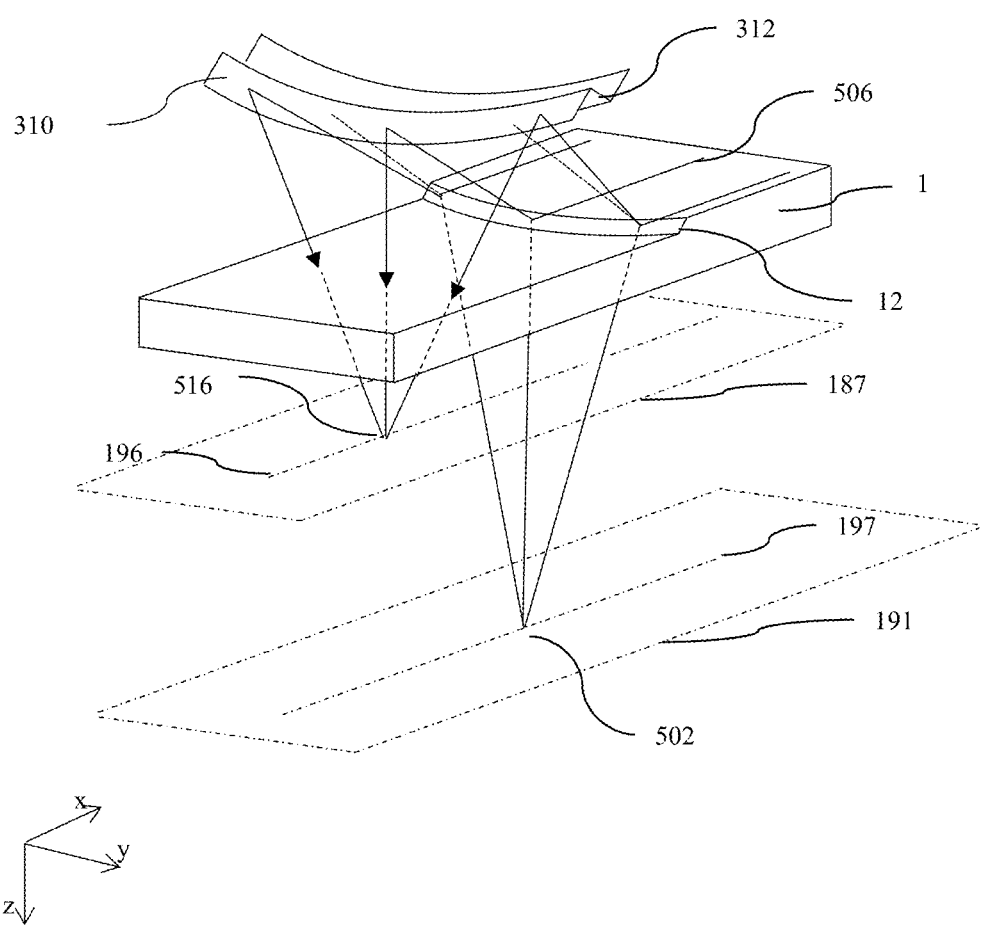
FIG. 33 is a schematic diagram illustrating in perspective view light extraction by (i) reflection by a facet of directional waveguide and (ii) transmission through a facet of a directional waveguide and reflection from a facet of a rear reflector, wherein the radius of curvature of the rear reflector is smaller than the radius of curvature of the rear reflector in the arrangement of FIG. 30, in accordance with the present disclosure.

FIG. 33 is a schematic diagram illustrating in perspective view light extraction by (i) reflection by a facet of a directional waveguide and (ii) transmission through a facet of a directional waveguide and reflection from a facet of a rear reflector 300, wherein the radius of curvature of the rear reflector is smaller than the radius of curvature of the facets 310 of the rear reflector 300 in the arrangement of FIG. 30.

As shown previously, a directional backlight may comprise a waveguide 1, an array 15 of light sources 15a-n arranged to input light into the waveguide 1 at different input positions laterally across the waveguide 1, wherein the waveguide comprises first and second, opposed guide surfaces 6, 8 for guiding input light along the waveguide 1, the first guide surface 6 being arranged to guide light by total internal reflection.

The second guide surface 8 may comprise (a) a plurality of extraction features 12 that are (i) arranged to reflect some of the input light so as to output it from the waveguide 1 through the first guide surface 6 and (ii) laterally curved to have positive optical power laterally (i.e. in the y direction) so that the input light reflected from the extraction features 12 laterally forms real images 502 of the light sources in front of the directional backlight in a first window plane 191 that provide viewing windows, the extraction features 12 also transmitting some of the input light; and (b) intermediate regions 10 between the extraction features 12 that are arranged to guide light by total internal reflection; and a rear reflector 300 comprising a linear array of reflective facets 310 that are (i) arranged to reflect at least some of the input light that is transmitted through the extraction features 12 of the waveguide 1, so as to direct it back through the waveguide 1 to exit through the first guide surface 6, and (ii) laterally curved to have optical power laterally so that the input light reflected from the reflective facets 310 laterally forms images 503 of the light sources in a second window plane 187 that is separated from the first window plane 191.

The images 502 formed from the input light 506 reflected from the reflective facets 12 are real images of the light sources 15a-n in front of the directional backlight (i.e. in the positive z direction) that provide further viewing windows 26 in the plane 191.

In this embodiment the second window plane 187 is closer to the directional backlight than the first window plane 191.

The directional backlight further comprises rear reflector 300 comprising reflective facets 310, wherein the rear reflector further comprises intermediate facets 312 extending between the reflective facets of the rear reflector and inclined in opposite senses from the reflective facets of the rear reflector so that pairs of a reflective facet and an intermediate facet together form corner facets arranged to reflect at least some of the input light that is incident thereon.

Multiple window planes are provided. Advantageously luminance uniformity for laterally moving observers that are not in the window plane is increased. Further, the near side luminance roll-off may be reduced in comparison to directional displays comprising a single window plane 191. Such displays are typically perceived as more natural to view.

Figure 34:
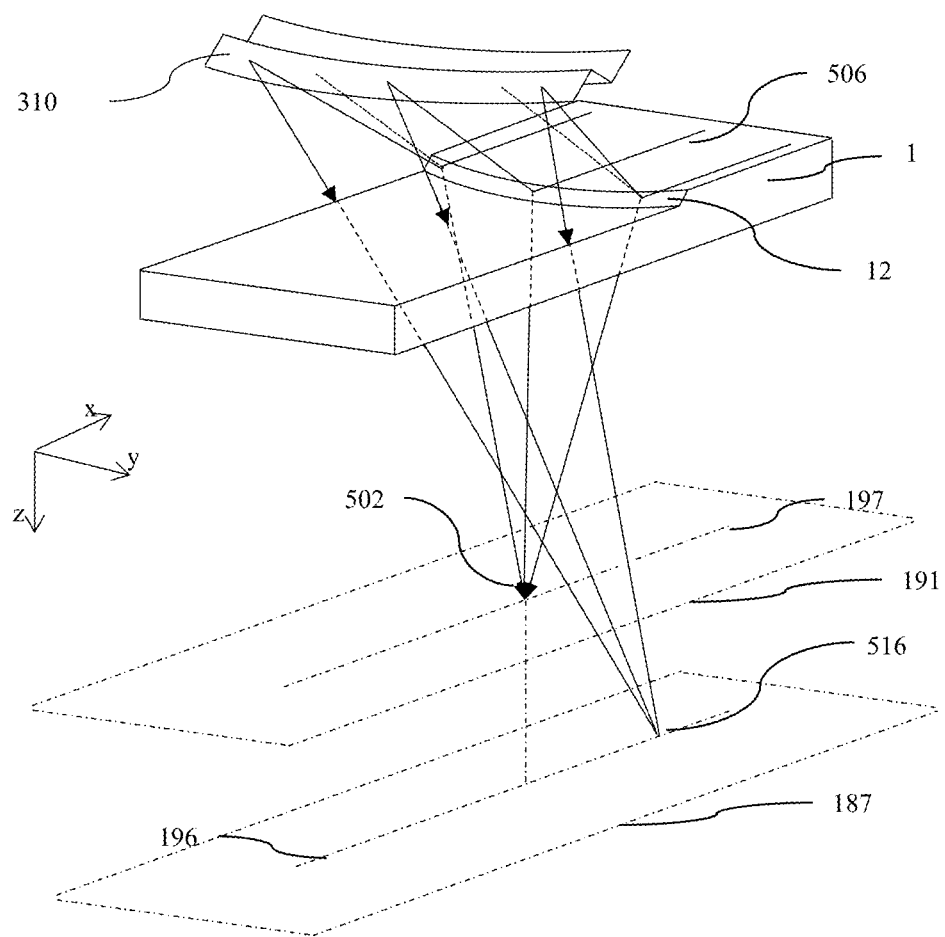
FIG. 34 is a schematic diagram illustrating in perspective view light extraction by (i) reflection by a facet of directional waveguide and (ii) transmission through a facet of a directional waveguide and reflection from a facet of a rear reflector, wherein the radius of curvature of the rear reflector is greater than the radius of curvature of the rear reflector in the arrangement of FIG. 30 in accordance with the present disclosure.

FIG. 34 is a schematic diagram illustrating in perspective view light extraction by (i) reflection by a facet of directional waveguide and (ii) transmission through a facet of a directional waveguide and reflection from a facet of a rear reflector, wherein the radius of curvature of the rear reflector is greater than the radius of curvature of the rear reflector in the arrangement of FIG. 30.

In this embodiment, the radius of the facets 310 is provided so that the second window plane 187 is further from the directional backlight (comprising waveguide 1) than the first window plane 191.

Figure 35:
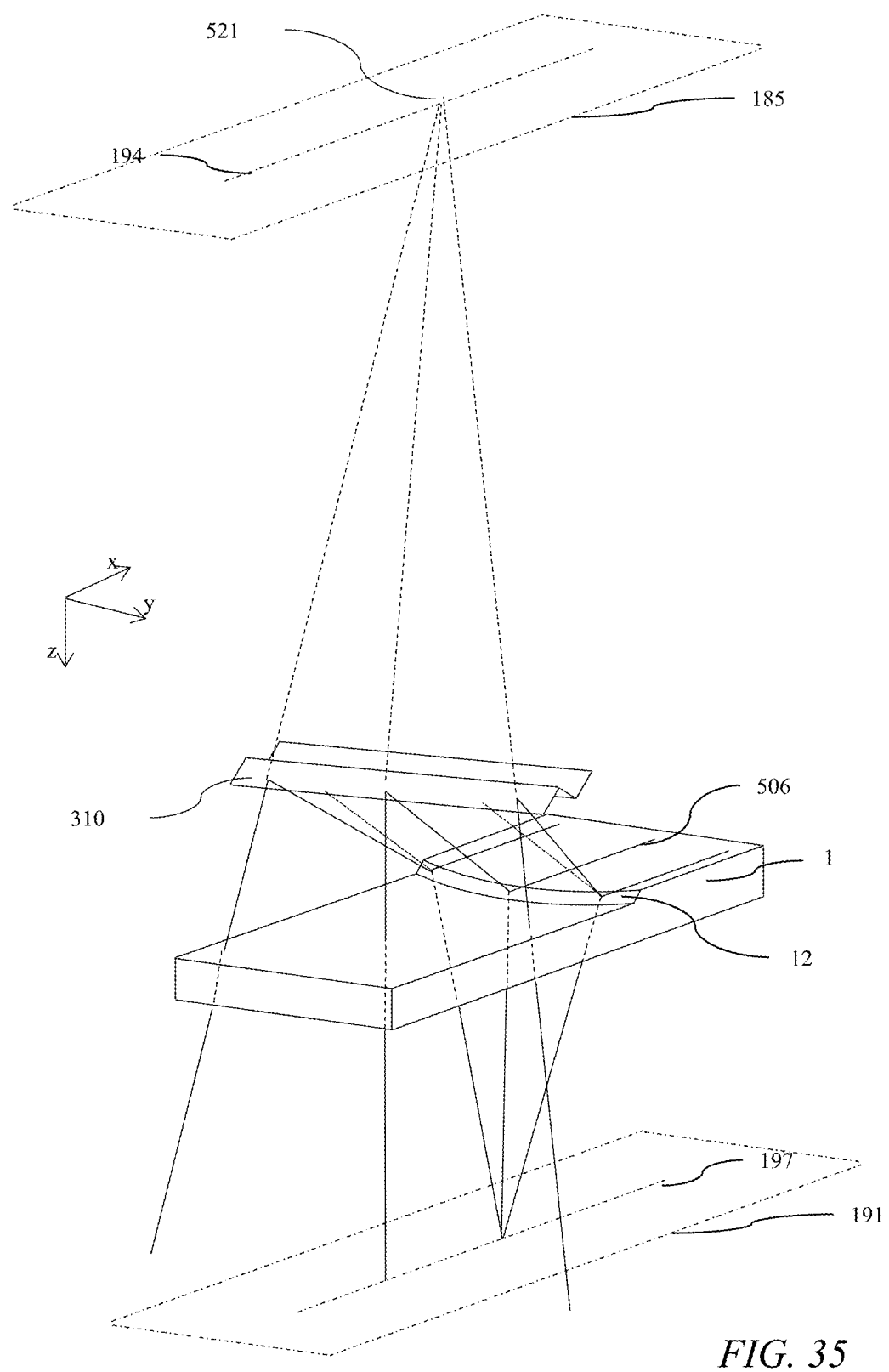
FIG. 35 is a schematic diagram illustrating in perspective view light extraction by (i) reflection by a facet of directional waveguide and (ii) transmission through a facet of a directional waveguide and reflection from a facet of a rear reflector, wherein the rear reflector has a linear extent, in accordance with the present disclosure.

FIG. 35 is a schematic diagram illustrating in perspective view light extraction by (i) reflection by a facet of directional waveguide and (ii) transmission through a facet of a directional waveguide and reflection from a facet of a rear reflector, wherein the rear reflector has a linear extent.

In this embodiment the images 521 formed from the input light reflected from the reflective facets 310 are virtual images of the light sources behind the directional backlight.

Advantageously linear facets 310 may be provided. Linear facets are more conveniently tooled and replicated than curved facets of FIG. 34, thus reducing cost and complexity.

It would be desirable to reduce the manufacturing complexity of the facets 12 of the waveguide 1, while providing multiple viewing window planes 191, 187.

Figure 36:
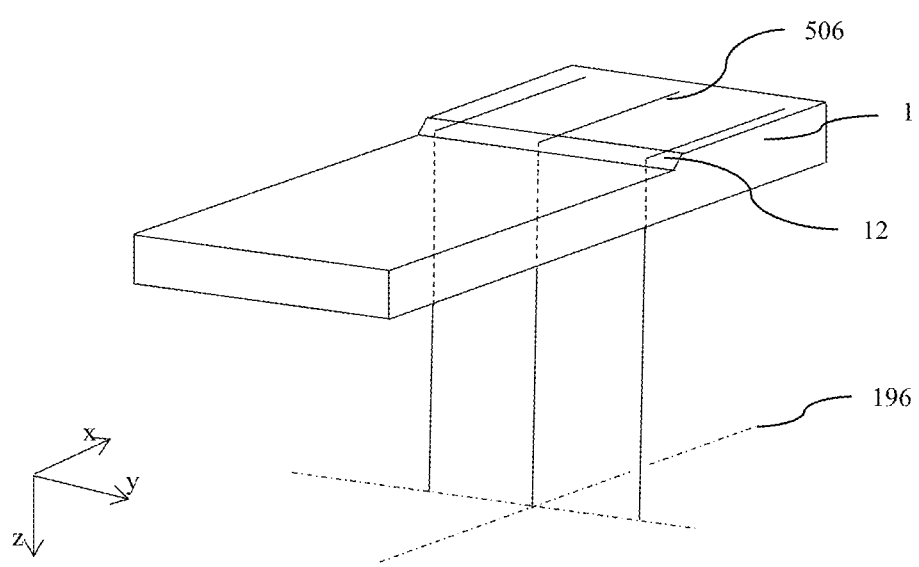
FIG. 36 is a schematic diagram illustrating in perspective view light extraction by reflection from a linear facet of a directional waveguide, in accordance with the present disclosure.

FIG. 36 is a schematic diagram illustrating in perspective view light extraction by reflection from a linear facet of a directional waveguide 1. Thus rays of reflected light 506 remain parallel and a window plane at infinity is formed, that is, the output from the waveguide 1 is collimated across the width of the waveguide.

Figure 37:
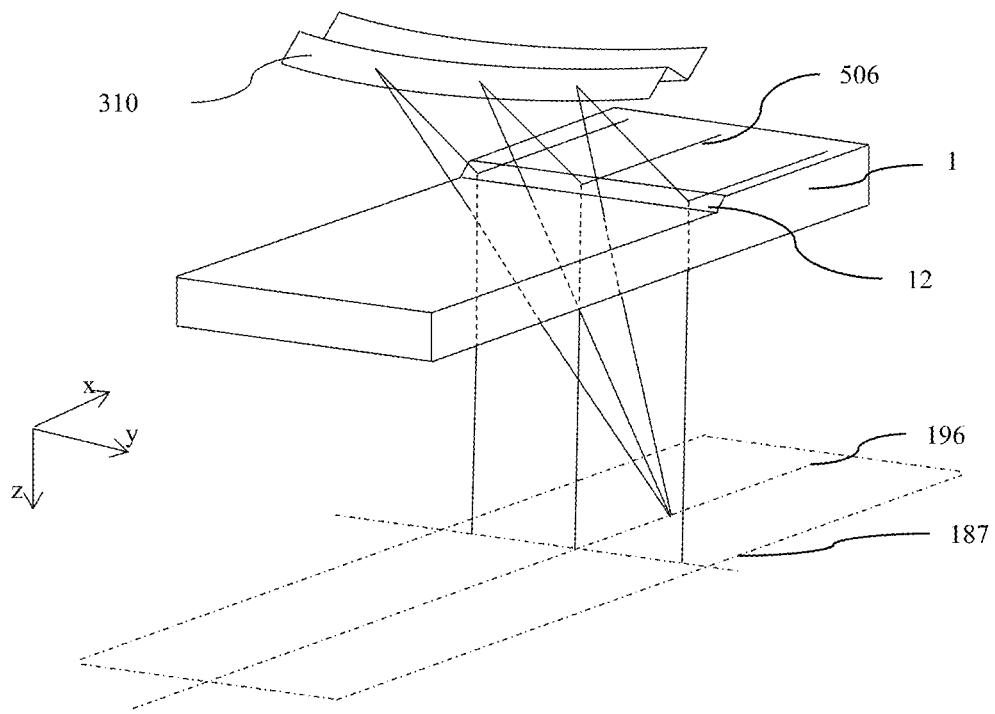
FIG. 37 is a schematic diagram illustrating in perspective view light extraction by (i) reflection by a linear facet of directional waveguide and (ii) transmission through a linear facet of a directional waveguide and reflection from a curved facet of a rear reflector, in accordance with the present disclosure.

FIG. 37 is a schematic diagram illustrating in perspective view light extraction by (i) reflection by a linear facet of directional waveguide and (ii) transmission through a linear facet of a directional waveguide and reflection from a curved facet of a rear reflector.

Figure 38A:
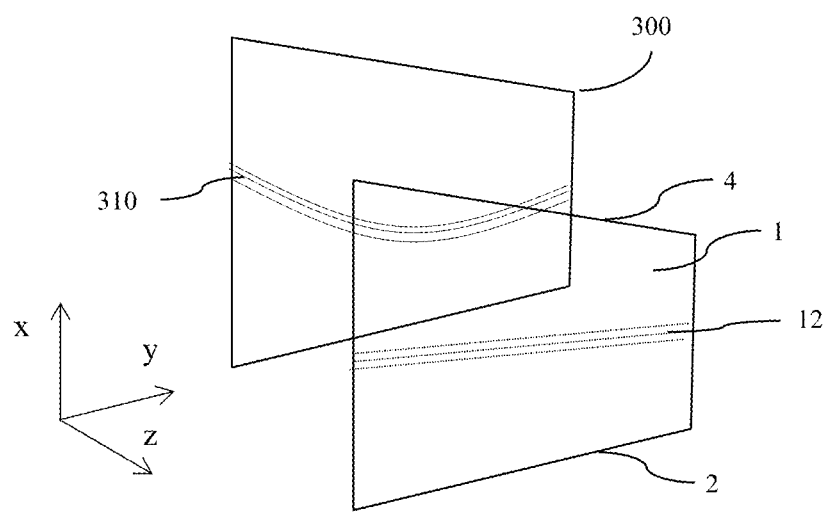
FIG. 38A, FIG. 38B, and FIG. 38C are schematic diagrams illustrating in perspective front view further arrangements of rear reflector and valve with first and second facet curvatures arranged to achieve different window plane locations, in accordance with the present disclosure.

FIG. 38A is a schematic diagram illustrating in perspective front view a further arrangement of rear reflector 300 and waveguide 1 with first and second facet curvatures arranged to achieve different window plane locations, in a similar manner to the arrangement of FIG. 37. Such an arrangement may further reduce the appearance of voids as shown in FIG. 27.

Figure 38B:
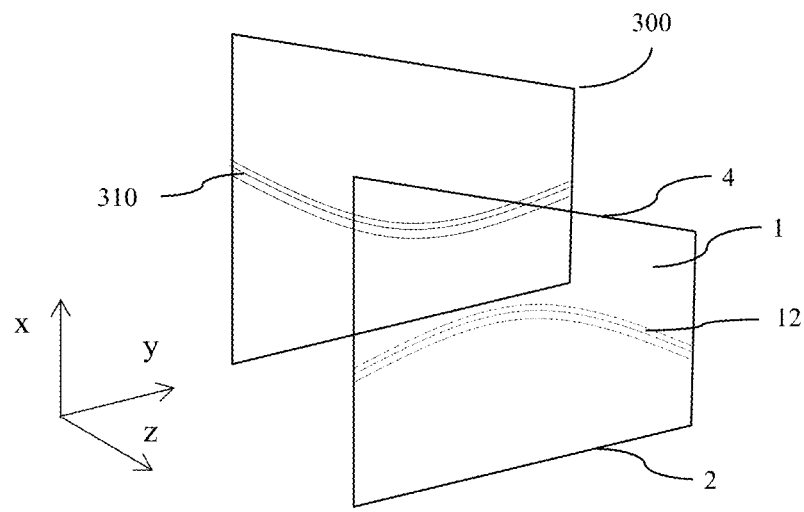
Figure 38C:
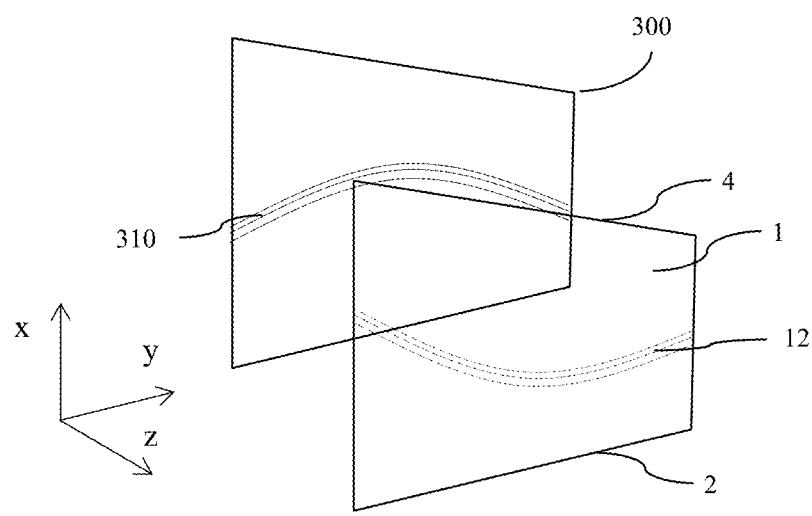

FIG. 38B further illustrates that the extraction features 12 of the waveguide 1 may be curved in the opposite direction to the rear reflector such that the waveguide 1 provides a virtual window plane and the rear reflector 300 provides a real window plane. FIG. 38C illustrates that the rear reflector may be arranged to provide a virtual window plane 185 while the waveguide 1 may be arranged to provide a real window plane. Alternatively both window planes may be virtual.

Advantageously the lateral uniformity characteristics of the display for observers not in the window plane may be adjusted.

Figure 39:
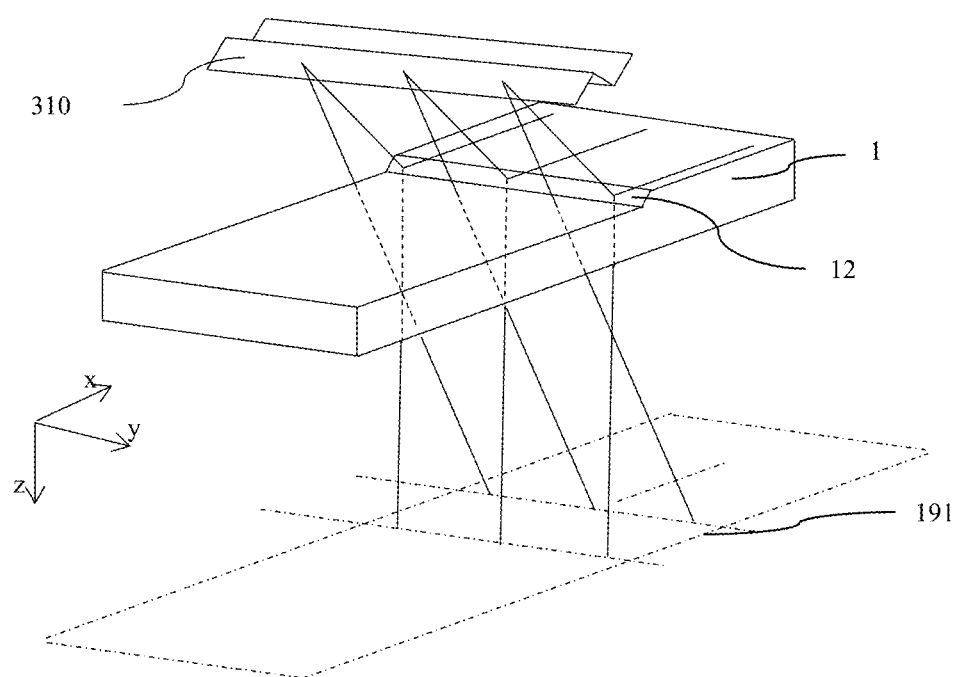
FIG. 39 is a schematic diagram illustrating in perspective view light extraction by (i) reflection by a linear facet of directional waveguide and (ii) transmission through a linear facet of a directional waveguide and reflection from a linear facet of a rear reflector, in accordance with the present disclosure.

FIG. 39 is a schematic diagram illustrating in perspective view light extraction by (i) reflection by a linear facet of directional waveguide and (ii) transmission through a linear facet of a directional waveguide and reflection from a linear facet of a rear reflector.

Advantageously a collimated display may be provided with the lateral uniformity characteristics similar to those illustrated in FIG. 20B. Further manufacturing complexity may be reduced.

It would be desirable to optimize the directionality of directional displays for use in automotive applications.

Figure 40:
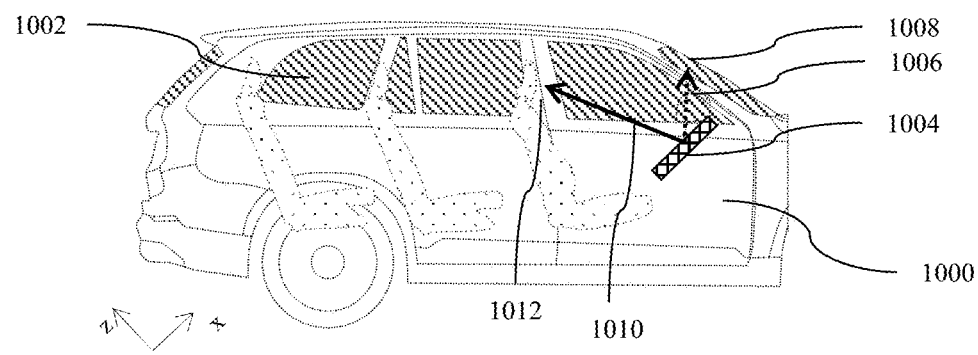
FIG. 40 is a schematic diagram illustrating in side view illumination of a car cabin by a display, in accordance with the present disclosure.
Figure 41:
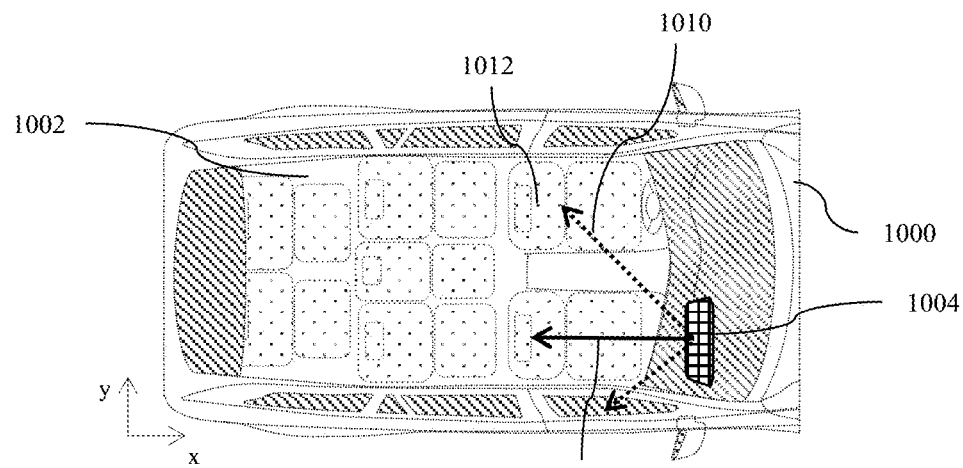
FIG. 41 is a schematic diagram illustrating in top view illumination of a car cabin by a display, in accordance with the present disclosure.

FIG. 40 is a schematic diagram illustrating in side view illumination of an automobile 100 cabin 1002 by a display 1004 and FIG. 41 is a schematic diagram illustrating in top view illumination of a car cabin by a display. Light rays 1010 may be directed to the driver location 1012 while light rays 1006 may be directed onto windscreen 1008 before being reflected to vehicle occupants 1022 including the driver location 1012.

Figure 42:
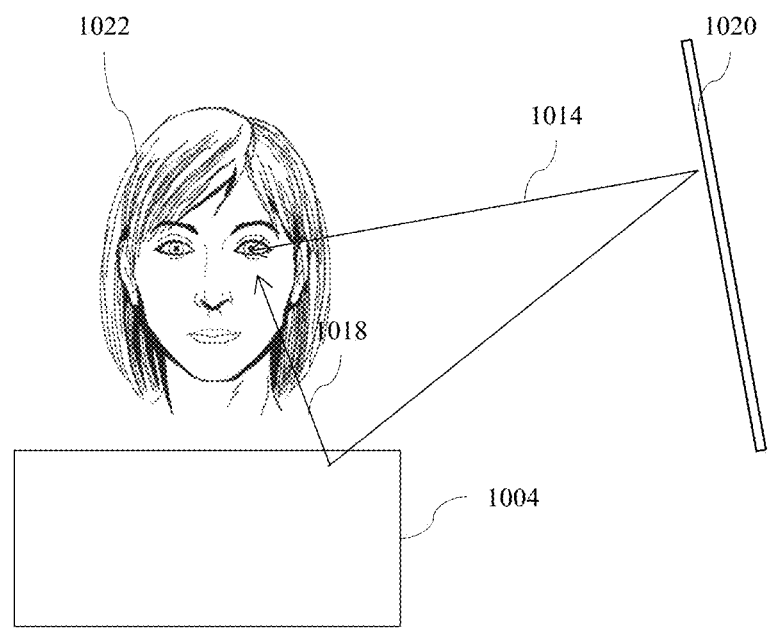
FIG. 42 is a schematic diagram illustrating in front view illumination of an occupant by various display, in accordance with the present disclosure.

FIG. 42 is a schematic diagram illustrating in front view illumination of an occupant by various display. Thus light rays 1014 may be further reflected by side windows 1020 to form unwanted images of the display.

Light cones from conventional non-directional displays will now be considered.

Figure 43:
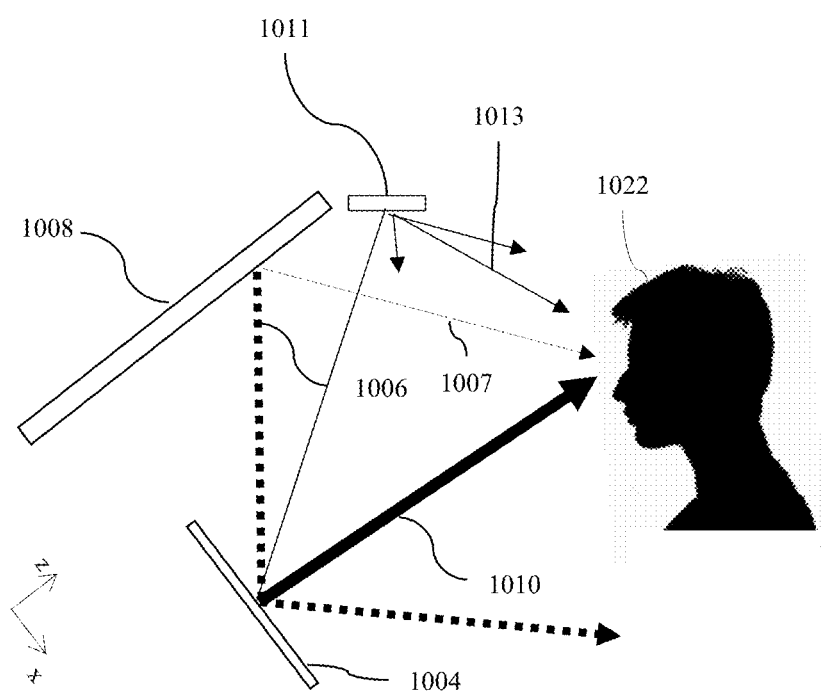
FIG. 43 is a schematic diagram illustrating in side view illumination of an occupant by a conventionally illuminated display, in accordance with the present disclosure.

FIG. 43 is a schematic diagram illustrating in side view illumination of an occupant by a conventionally illuminated display 104. Light rays 1010 are sent directly to occupant 1022 whereas light rays 1006 that are inclined in the x-z plane are directed towards windscreen 1008 and partially reflected to occupant 1022. Thus rays 1007 can provide unwanted display reflections of display 1004. Further light rays may be scattered from internal vehicle surfaces and directed as rays 1013 to the observer.

Such rays 1013, 1007 can create unwanted stray light levels for night time driving, disrupting the vision of the driver. The luminance of such rays increases with increasing display size, undesirably limiting the maximum display size in the cabin.

Figure 44:
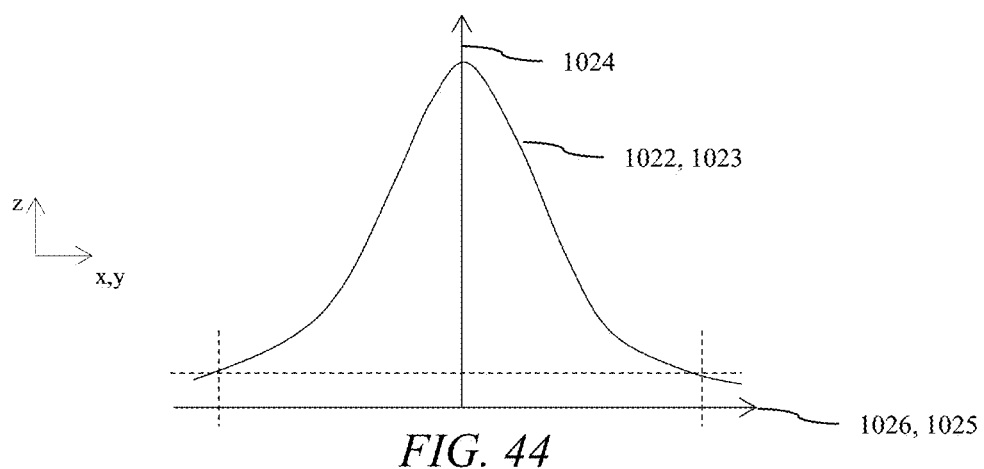
FIG. 44 is a schematic graph illustrating the angular variation of luminance of a conventionally illuminated display, in accordance with the present disclosure.

FIG. 44 is a schematic graph illustrating the angular variation of luminance of a conventionally illuminated display. Thus in the x-z plane the output may have a luminance 1024 profile 1022 that varies by angle 1026 as illustrated.

Figure 45:
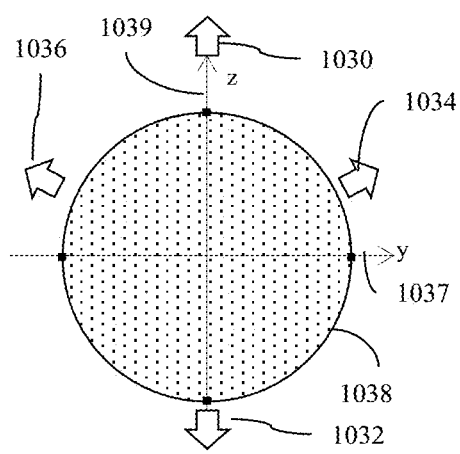
FIG. 45 is a schematic graph illustrating an isoluminance profile of a conventionally illuminated display, in accordance with the present disclosure.

FIG. 45 is a schematic graph illustrating an isoluminance profile of a conventionally illuminated display. Plotting vertical angle 1039 against horizontal angle 1037 provides isoluminance contour 1038 that is typically rotationally symmetric. The contour 1038 may, for example, represent the 5% luminance level compared to the peak luminance, illustrated by the dashed lines in FIG. 44. In the example of a display for a front passenger, the direction 1030 may be the direction towards the windscreen, the direction 1034 towards a side window, the direction 1036 towards a driver and the direction 1032 towards a footwell.

Figures 46, 47:
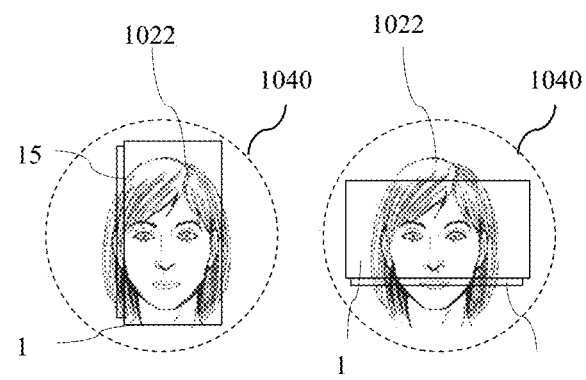
FIG. 46 is a schematic diagram illustrating the illuminance of an occupant by a conventionally illuminated display in portrait orientation, in accordance with the present disclosure.
FIG. 47 is a schematic diagram illustrating the illuminance of an occupant by a conventionally illuminated display in landscape orientation, in accordance with the present disclosure.

FIG. 46 is a schematic diagram illustrating the illuminance of an occupant by a conventionally illuminated display in portrait orientation and FIG. 47 is a schematic diagram illustrating the illuminance of an occupant by a conventionally illuminated display in landscape orientation. Thus windows 1040 may represent the location of a viewing window at an occupant in which the luminance falls above a certain level, for example 5% of the peak luminance. In a conventional display, the luminance profile is typically the same for both landscape and portrait display orientations.

FIG. 48 is a schematic graph illustrating the angular variation of luminance of a directional display in landscape orientation. Thus profile 1046 may be controlled by means of LED control to provide a narrower angular profile 1046 in the z-y plane.

FIG. 49 is a schematic graph illustrating an isoluminance profile of a directional display in landscape orientation and FIG. 50 is a schematic diagram illustrating the illuminance of an occupant by a conventionally illuminated display in landscape orientation with window shape 1044. Thus the profile 1042 has a narrower profile so that advantageously light is not directed laterally to the driver or side windows. However, light may still be undesirably directed in direction 1030 towards the windscreen 1008.

FIG. 51 is a schematic graph illustrating the angular variation of luminance of a directional display in portrait orientation for an off-axis eye position; FIG. 52 is a schematic graph illustrating an isoluminance profile of a directional display in portrait orientation; and FIG. 53 is a schematic diagram illustrating the illuminance of an occupant by a conventionally illuminated display in portrait orientation.

Thus profile 1046 may provide isoluminance contour 1048 and relative window location 1050 for the passenger. Such a profile may reduce the amount of light to a window and redirect the peak luminance to a location below the normal of the display to achieve peak luminance. Advantageously windscreen reflections are reduced and peak luminance is maintained for an observer that is not on-axis to the display.

It would be desirable to reduce the amount of light that is directed to a driver in a landscape orientation display.

FIG. 54 is a schematic graph illustrating the angular variation of luminance of a directional display in landscape orientation with increased lateral freedom; FIG. 55 is a schematic graph illustrating an isoluminance profile of a directional display in landscape orientation with increased lateral freedom; and FIG. 56 is a schematic diagram illustrating the illuminance of an occupant by a conventionally illuminated display in landscape orientation with increased lateral freedom. Thus angular profile 1052 may be arranged to reduce light that is directed towards the driver in direction 1036 with isoluminance contour 1054, while the occupant 1022 is provided with a large viewing window 1056. Advantageously a landscape display may achieve a comfortable head box for the occupant while reducing light directed towards a driver.

It would be desirable to reduce windscreen reflections, side window reflections and light that is directed to a second occupant such as a driver. Further it would be desirable to provide a landscape display orientation.

Figure 57:
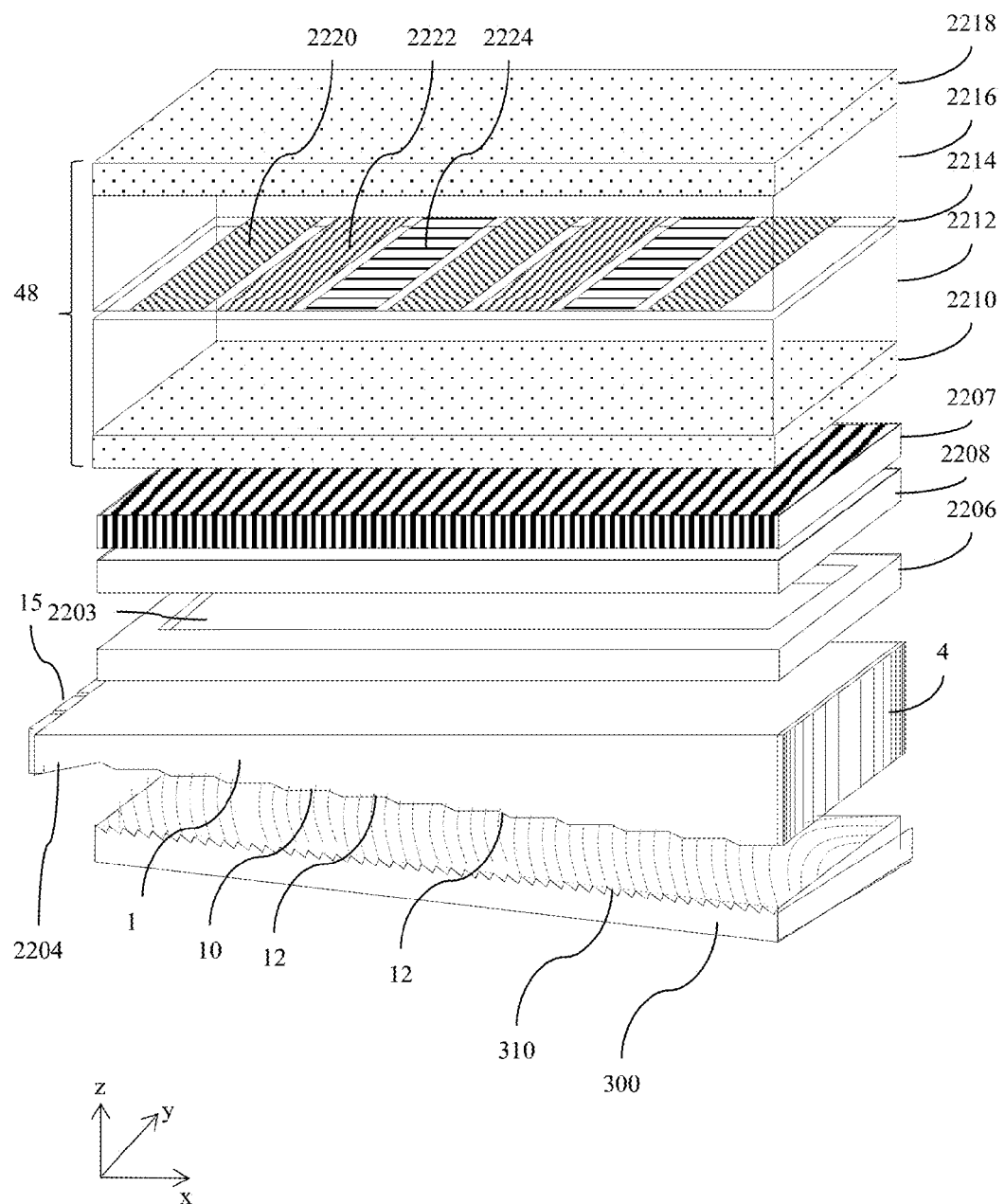
FIG. 57 is a schematic diagram illustrating in perspective view, the structure of a directional display device comprising a directional backlight comprising input on a side that is opposite the reflective end and arranged with a spatial light modulator, further comprising a micro-louvre film arranged to provide reduction of high angle luminance in an axis orthogonal to the lateral direction, in accordance with the present disclosure.

FIG. 57 is a schematic diagram illustrating in perspective view, the structure of a directional display device comprising a directional backlight comprising input on a side that is opposite the reflective end and arranged with a spatial light modulator, further comprising a micro-louvre film arranged to provide reduction of high angle luminance in an axis orthogonal to the lateral direction. FIG. 57 is similar in structure to FIGS. 18 and 19, however a further micro-louvre element 2207 such as ALCF™ from 3M Corporation may be inserted in the optical stack.

Figure 58A:
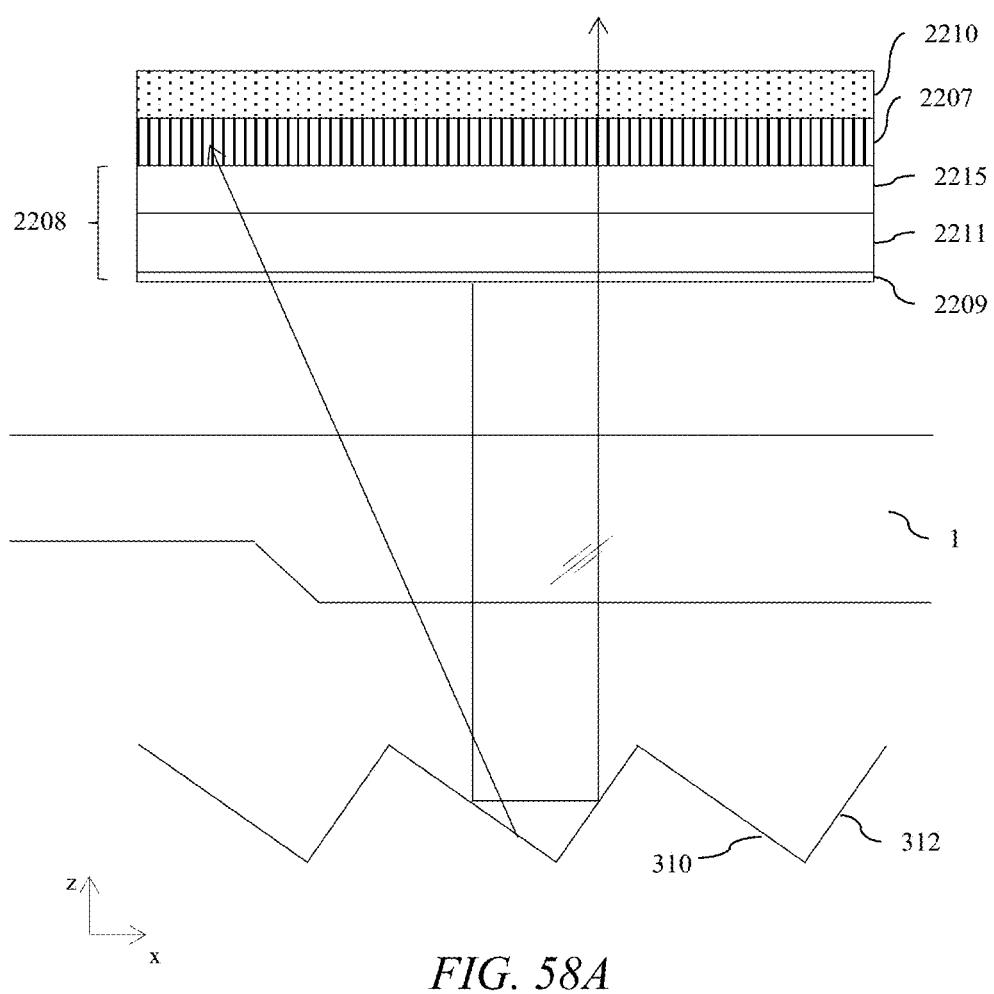
FIG. 58A and FIG. 58B are schematic diagrams illustrating in side views illumination optical stackup location of a micro-louvre film in a directional display to provide different levels of high angle luminance in an axis orthogonal to the lateral direction, in accordance with the present disclosure.
Figure 58B:
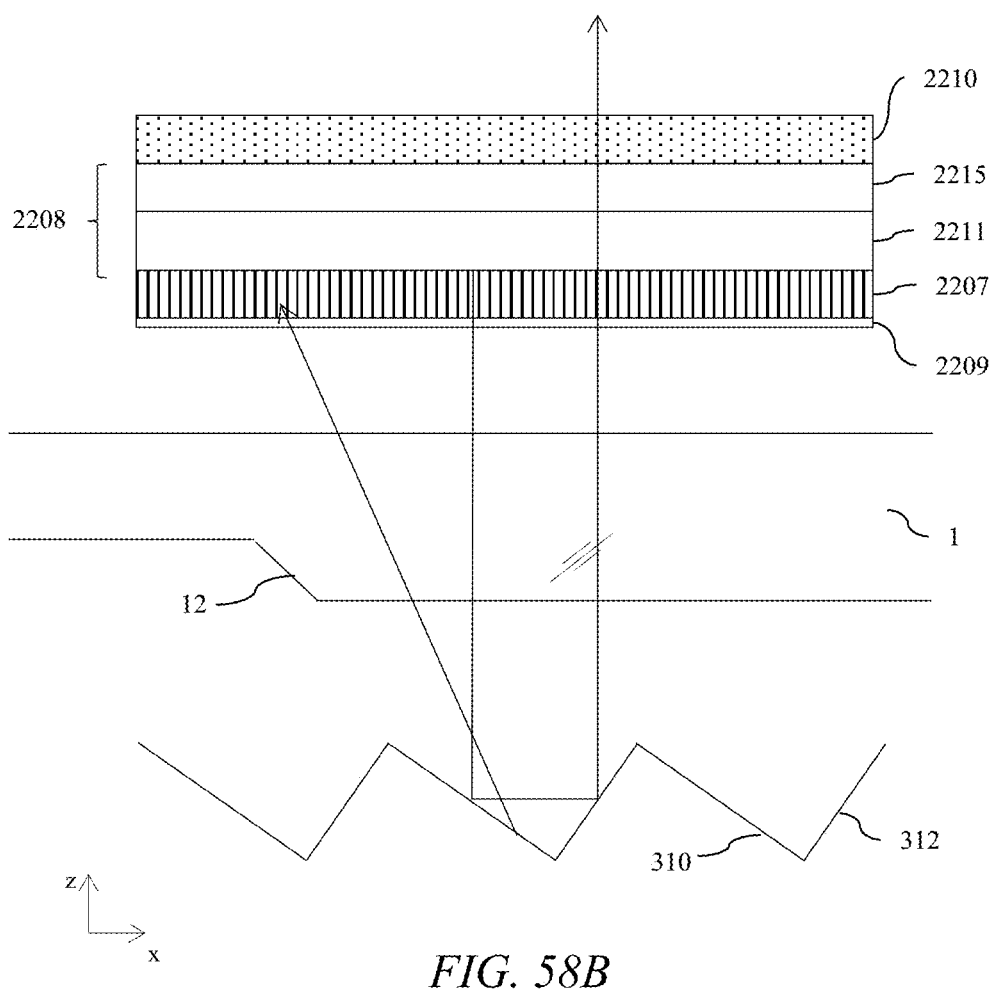

FIG. 58A-B are schematic diagrams illustrating in side views illumination optical stackup location of a micro-louvre film 2207 in a directional display to provide different levels of high angle luminance about the x-z plane. Diffuser 2209, waveplate 2211, reflective polarizer 2215 and input polarizer 2210 may be arranged in a stackup with film 2207. The location of film 2207 may be before or after the reflective polarizer 2215. The location of the film may determine the degree of reduction of high angle light in the system.

Figure 59:
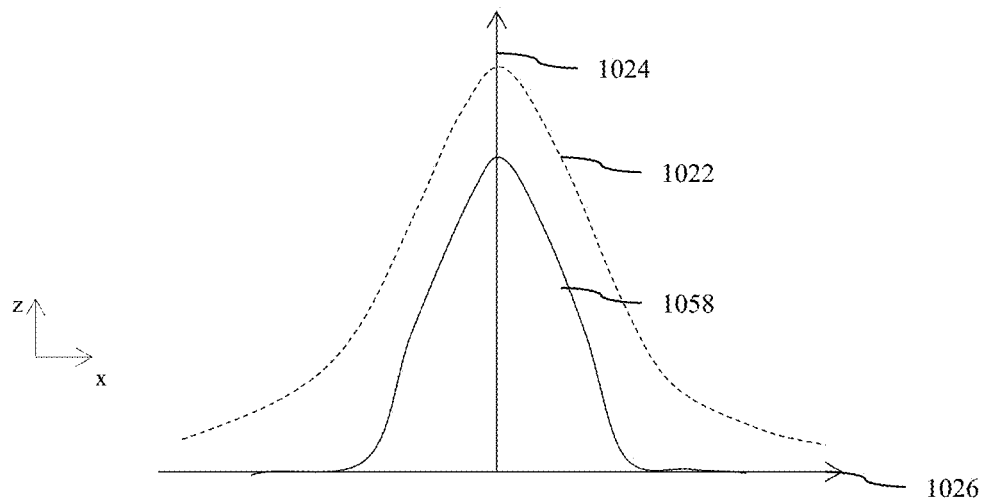
FIG. 59 is a schematic graph illustrating the angular variation of luminance of a directional display in landscape orientation with a further micro-louvre film, in accordance with the present disclosure.
Figure 60:
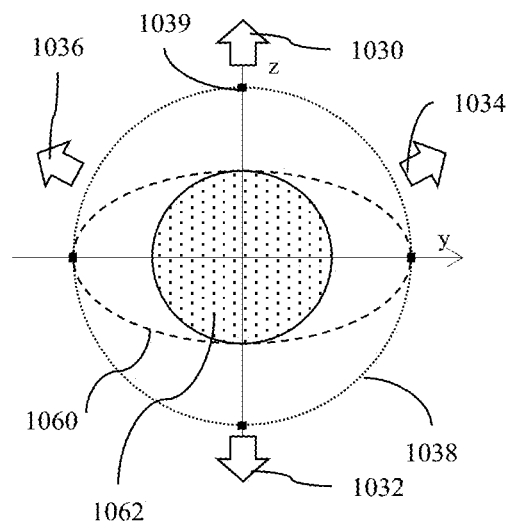
FIG. 60 is a schematic graph illustrating an isoluminance profile of a directional display in landscape orientation with a micro-louvre film, in accordance with the present disclosure.
Figure 61:
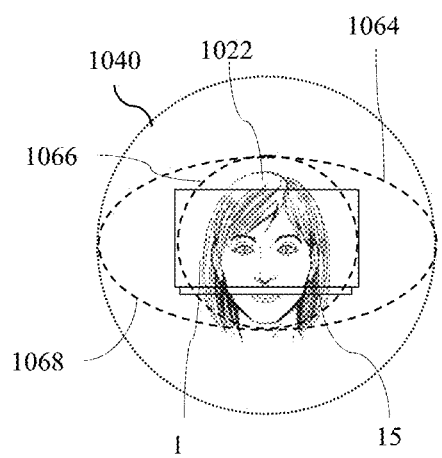
FIG. 61 is a schematic diagram illustrating the illuminance of an occupant by a conventionally illuminated display in landscape orientation with a further micro-louvre film, in accordance with the present disclosure.

FIG. 59 is a schematic graph illustrating the angular variation of luminance of a directional display in landscape orientation with a further micro-louvre film 2207; FIG. 60 is a schematic graph illustrating an isoluminance profile of a directional display in landscape orientation with a further micro-louvre film; and FIG. 61 is a schematic diagram illustrating the illuminance of an occupant by a conventionally illuminated display in landscape orientation with a further micro-louvre film.

Advantageously a landscape display may be provided with a vertical luminance profile arranged to reduce windscreen reflections. Further by means of control of angular profile of the light source illumination in the lateral direction, different isoluminance profiles 1060, 1062 may be achieved. Thus viewing windows 1064, 1066 may be provided to achieve reduction in the amount of light seen by the driver.

It would be desirable to provide a landscape directional display with reduced windscreen reflections and without the complexity and optical losses of micro-louvre film 2207.

Figure 62:
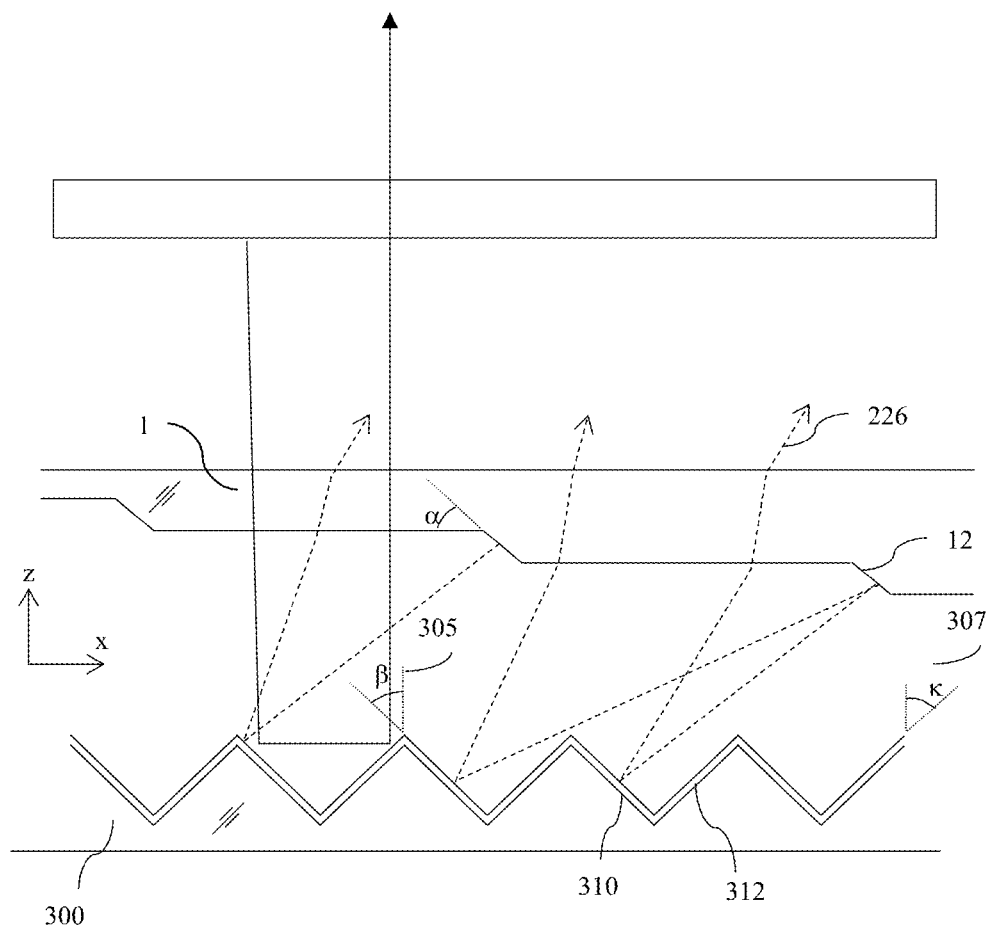
FIG. 62 is a schematic diagram illustrating in side view extraction feature and reflective facet angles, in accordance with the present disclosure.

FIG. 62 is a schematic diagram illustrating in side view extraction feature angle α and reflective facet angles β and κ as described in U.S. Pat. Publ. No. 2014-0240828.

Figure 63:
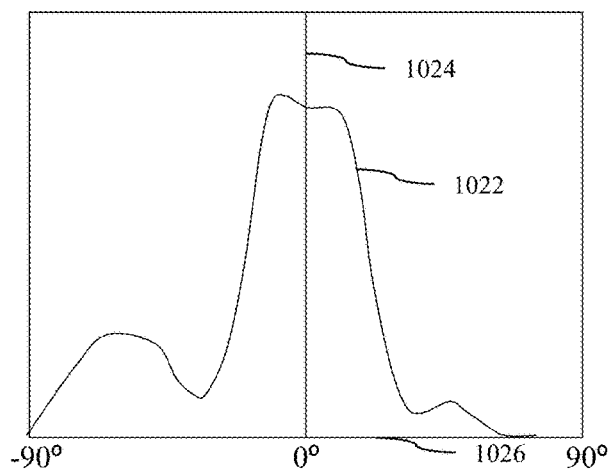
FIG. 63 is a schematic graph illustrating an angular profile of a display comprising polarization recirculation and a first combination of extraction feature and reflective facet angles, in accordance with the present disclosure.

FIG. 63 is a schematic graph illustrating a simulated angular profile of a display comprising polarization recirculation and a first combination of extraction feature and reflective facet angles, for example a waveguide facet angle α of 55 degrees from the horizontal and a reflective facet angle β of 53 degrees from the vertical.

Figure 64:
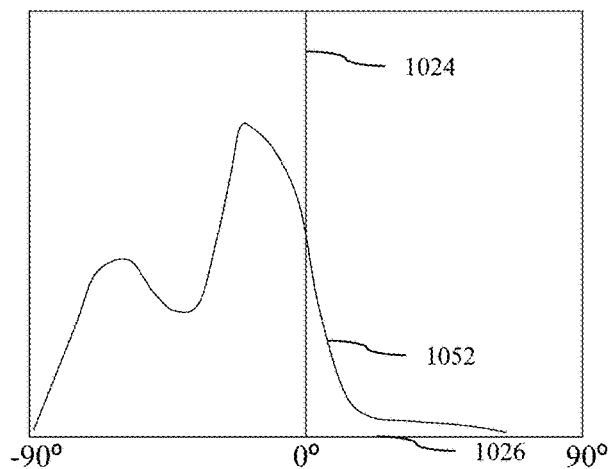
FIG. 64 is a schematic graph illustrating an angular profile of a display comprising no polarization recirculation and a second combination of extraction feature and reflective facet angles, in accordance with the present disclosure.

FIG. 64 is a schematic graph illustrating an angular profile of a display comprising no polarization recirculation and a second combination of extraction feature and reflective facet angles, for example a waveguide facet angle α of 45 degrees from the horizontal and a reflective facet angle β of 57 degrees from the vertical. Advantageously high angle light in the z-x plane can be substantially reduced in luminance.

Figure 65:
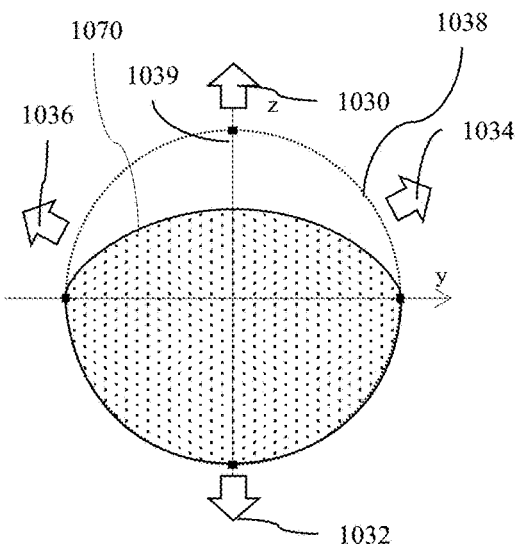
FIG. 65 is a schematic diagram illustrating an isoluminance profile of a directional display in landscape orientation with a wide lateral angular profile and the orthogonal direction angular profile of FIG. 64, in accordance with the present disclosure.
Figure 66:
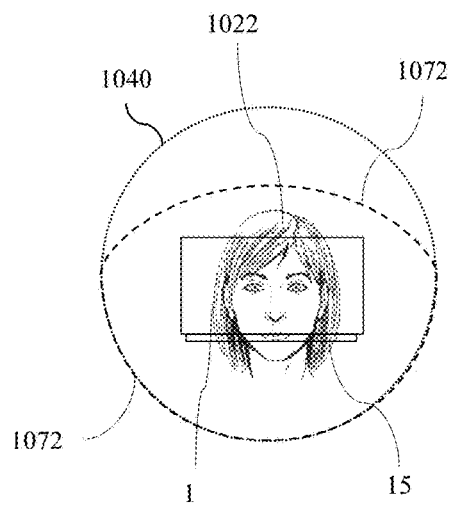
FIG. 66 is a schematic diagram illustrating the illuminance of an occupant by a directional display in landscape orientation with the wide lateral angular profile and the orthogonal direction angular profile of FIG. 64, in accordance with the present disclosure.

FIG. 65 is a schematic diagram illustrating an isoluminance profile of a directional display in landscape orientation with a wide lateral angular profile and the orthogonal direction angular profile of FIG. 64; and FIG. 66 is a schematic diagram illustrating the illuminance of an occupant by a directional display in landscape orientation with the wide lateral angular profile and the orthogonal direction angular profile of FIG. 64.

Further FIG. 67A is a schematic diagram illustrating an isoluminance profile of a directional display in landscape orientation with a narrow lateral angular profile and the orthogonal direction angular profile of FIG. 64 and FIG. 67B is a schematic diagram illustrating the illuminance of an occupant by a directional display in landscape orientation with a narrow lateral angular profile and the orthogonal direction angular profile of FIG. 64; FIG. 68A is a schematic diagram illustrating an isoluminance profile of a directional display in landscape orientation with a narrow lateral angular profile towards a driver and wide angular profile away from the driver and the orthogonal direction angular profile of FIG. 64; and FIG. 68B is a schematic diagram illustrating the illuminance of an occupant by a directional display in landscape orientation with a narrow lateral angular profile towards a driver and wide angular profile away from the driver and the orthogonal direction angular profile of FIG. 64.

Advantageously landscape displays can be provided with low luminance directed towards the windscreen, reduced luminance for the driver, and controllable head box shape for the occupant 1022. Further the cost and complexity of micro-louvre films may be reduced.

FIG. 69A is a schematic diagram illustrating an isoluminance profile of a directional display in portrait orientation with a wide lateral angular profile and the orthogonal direction angular profile of FIG. 64 and FIG. 69B is a schematic diagram illustrating the illuminance of an occupant by a directional display in portrait orientation with the wide lateral angular profile and the orthogonal direction angular profile of FIG. 64.

Further FIG. 70A is a schematic diagram illustrating an isoluminance profile of a directional display in portrait orientation with a narrow lateral angular profile and the orthogonal direction angular profile of FIG. 64 and FIG. 70B is a schematic diagram illustrating the illuminance of an occupant by a directional display in portrait orientation with a narrow lateral angular profile and the orthogonal direction angular profile of FIG. 64.

Advantageously portrait displays can be provided with low luminance directed towards the windscreen, reduced luminance for the driver, and controllable head box shape for the occupant 1022 without the cost and complexity of micro-louvre films.

In further embodiments, micro-louvre films may be combined with the angular profile shown in FIG. 64 to further reduce the luminance that is incident on windscreens, thus achieving enhanced display performance for night time use.

Light that is input into the waveguide 1 may scatter in the first direction from the input side 2 to the reflective end 4. It would be desirable to reduce or remove the appearance of the scatter.

Figure 71:
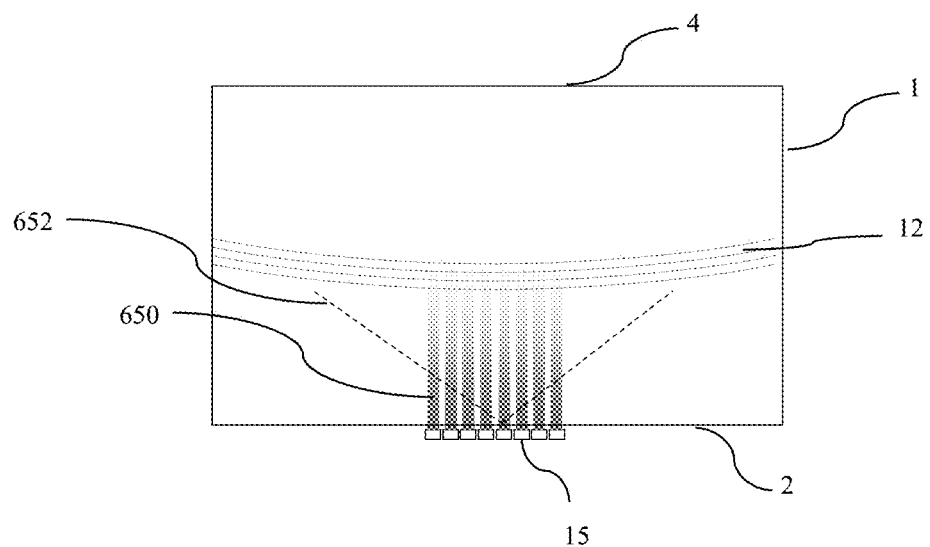
FIG. 71 is a schematic diagram illustrating in front view the appearance of input light streaks in a directional waveguide for viewing along the display normal, in accordance with the present disclosure.

FIG. 71 is a schematic diagram illustrating in front view the appearance of input light streaks in a directional waveguide for viewing along the display normal. Light cone 652 is formed from the refraction of the light from the light sources of the array 15 into the waveguide 1.

In a privacy mode of operation for example, light within the cone 652 may be scattered by features within the waveguide with appearance that may be vertical streaks 650 when viewed head on. Such head on streaks may be masked in appearance by the luminance of the head on illumination that is provided by light that is reflected from the reflective end 4 and extracted by means of features 12.

Figure 72:
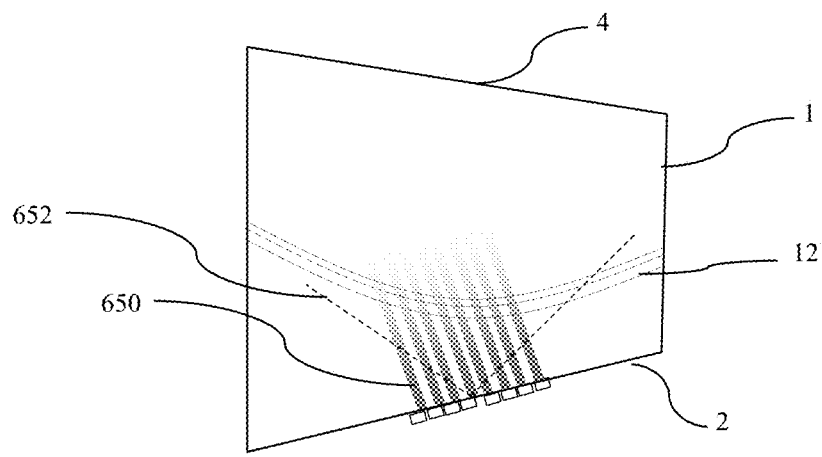
FIG. 72 is a schematic diagram illustrating in front view the appearance of input light streaks in a directional waveguide for viewing at an angle inclined to the display normal in the lateral direction, in accordance with the present disclosure.

FIG. 72 is a schematic diagram illustrating in front view the appearance of input light streaks in a directional waveguide for viewing at an angle inclined to the display normal in the lateral direction. In privacy mode of operation, low levels of light are seen from the main window 26, and thus the streaks 650 may have higher contrast. It would be desirable to remove or reduce the appearance of such streaks.

Figure 73:
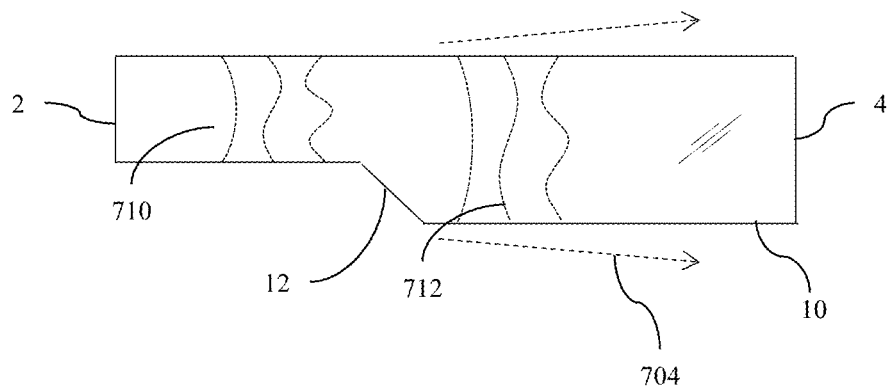
FIG. 73 is a schematic diagram illustrating in side view coupling of optical modes at an extraction feature step of the directional waveguide, in accordance with the present disclosure.

FIG. 73 is a schematic diagram illustrating in side view coupling of optical modes at an extraction feature step of the directional waveguide. During propagation from the input side 2 to the reflective end 4, optical mode coupling may take place at each extraction feature 12, so that optical modes 710 are coupled to optical modes 712 with some loss of power. Such loss may be observed as, for example, grazing angle light rays 704.

Figure 74:
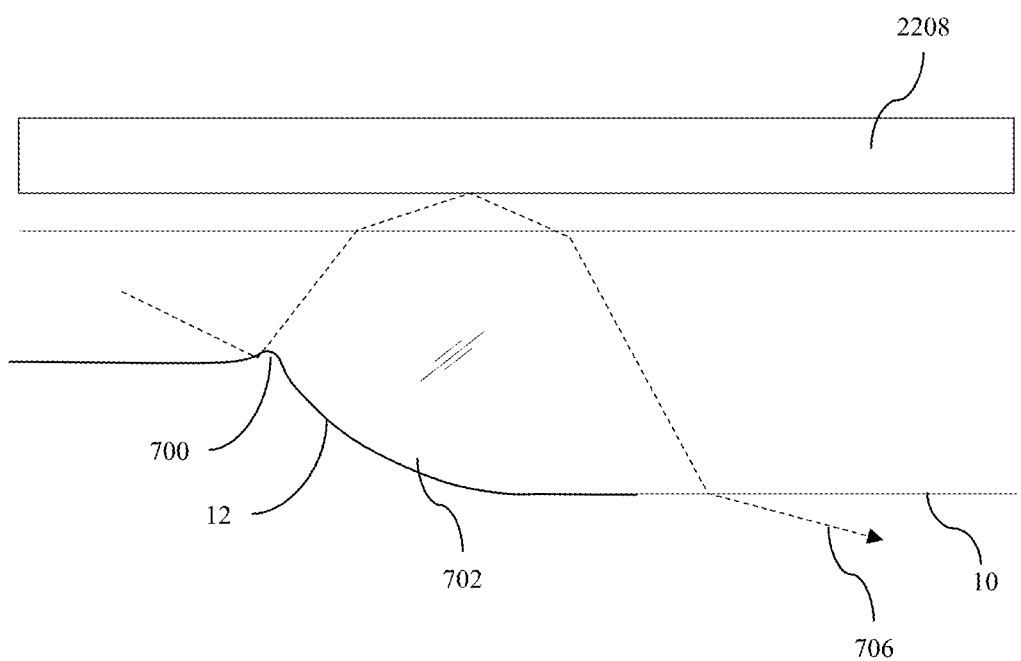
FIG. 74 is a schematic diagram illustrating in side view light deflection at an extraction feature step of the directional waveguide, in accordance with the present disclosure.

FIG. 74 is a schematic diagram illustrating in side view light deflection at an extraction feature step of the directional waveguide. In manufacture by a molding method, extraction feature 12 may comprise a thin end structure 700 which may be slightly inclined inwards to the plastic, and a rounded feature 702. Such structure 700 may provide some optical coupling losses so that rays 706 are output from the waveguide as a loss. Some of the rays 706 may be scattered or reflected by optical surfaces within the optical stack 2208 for example.

Figure 75:
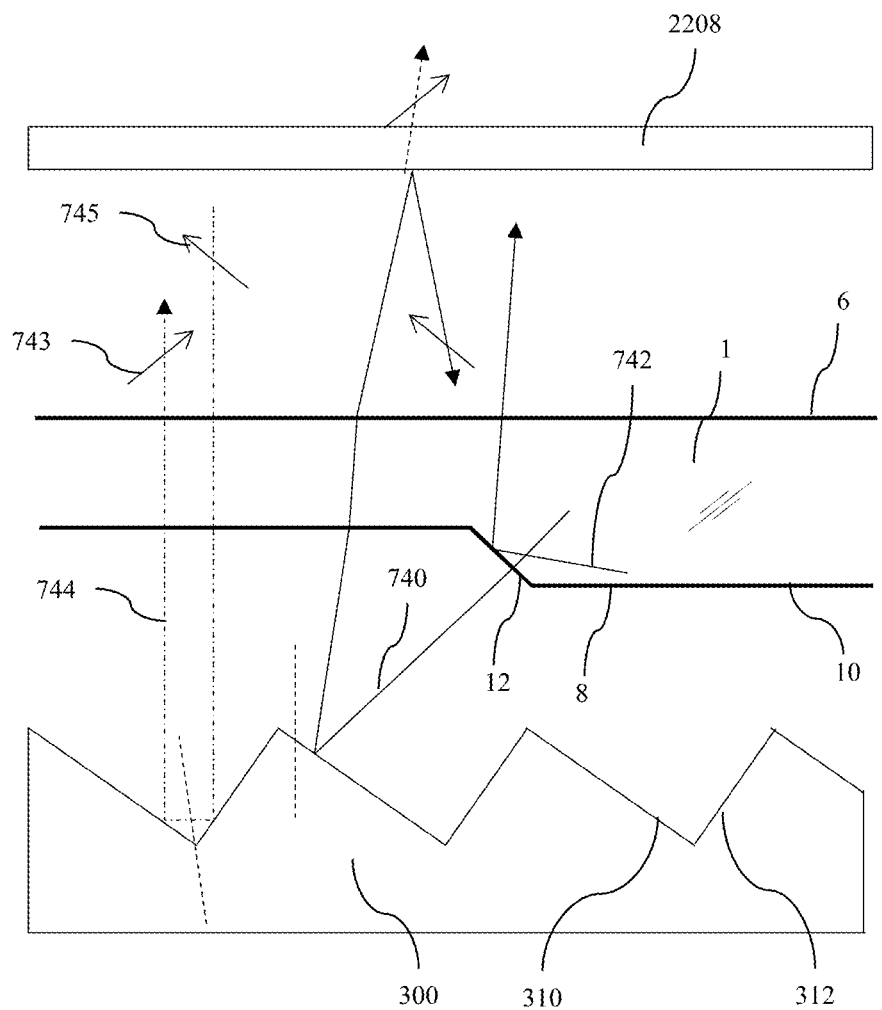
FIG. 75 is a schematic diagram illustrating in side view reflection from facets of a rear reflector for polarization recirculation light paths, in accordance with the present disclosure.

FIG. 75 is a schematic diagram illustrating in side view reflection from facets of a rear reflector for polarization recirculation light paths. Rear reflector 75 operates to reflect light rays 740 that are transmitted through feature 12. Further light rays 742 are directly reflected by the extraction feature 12. Further, polarized light that may be reflected from a reflective polarizer in the stack 2208 are retro-reflected in the corner cube between reflective facets 310 and 312.

Figure 76:
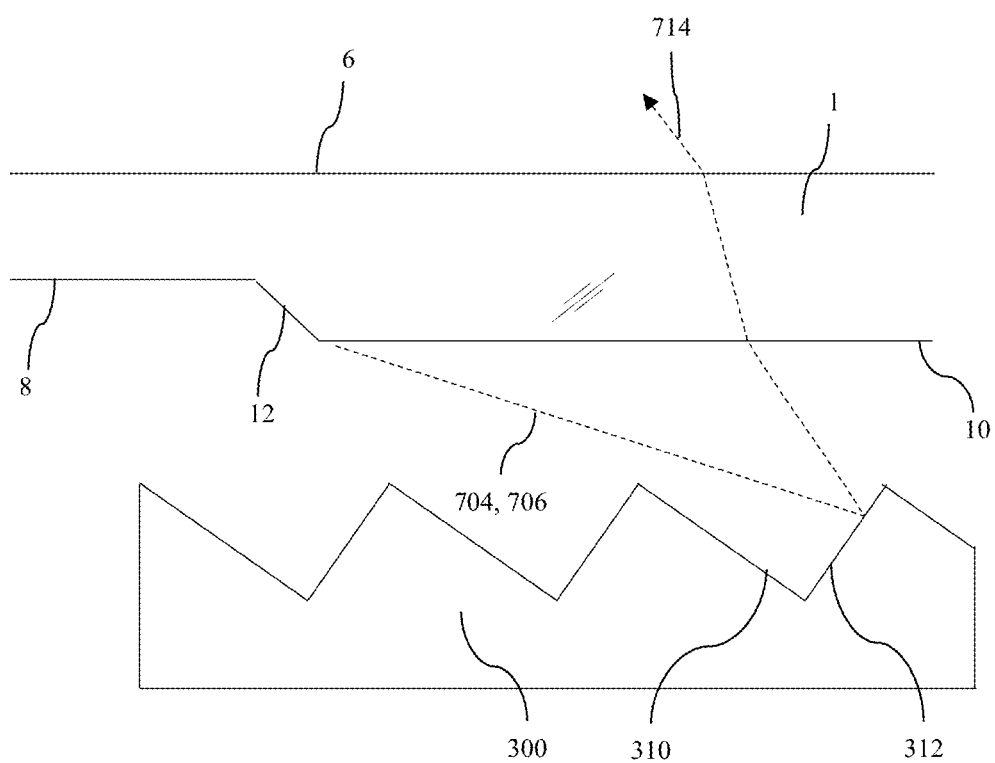
FIG. 76 is a schematic diagram illustrating in side view reflection of stray light from facets of a rear reflector, in accordance with the present disclosure.

FIG. 76 is a schematic diagram illustrating in side view reflection of stray light from facets of a rear reflector. Thus light rays 704, 706 may be undesirably reflected by draft reflective facets 312 to output light rays 714. Such rays 714 may provide light to streaks 650, with directionality arising from the waveguide 1 and rear reflector 300.

It would be desirable to reduce the visibility of hot spots due to scatter of light passing from an input side 2 to a reflective end 4.

Figure 77:
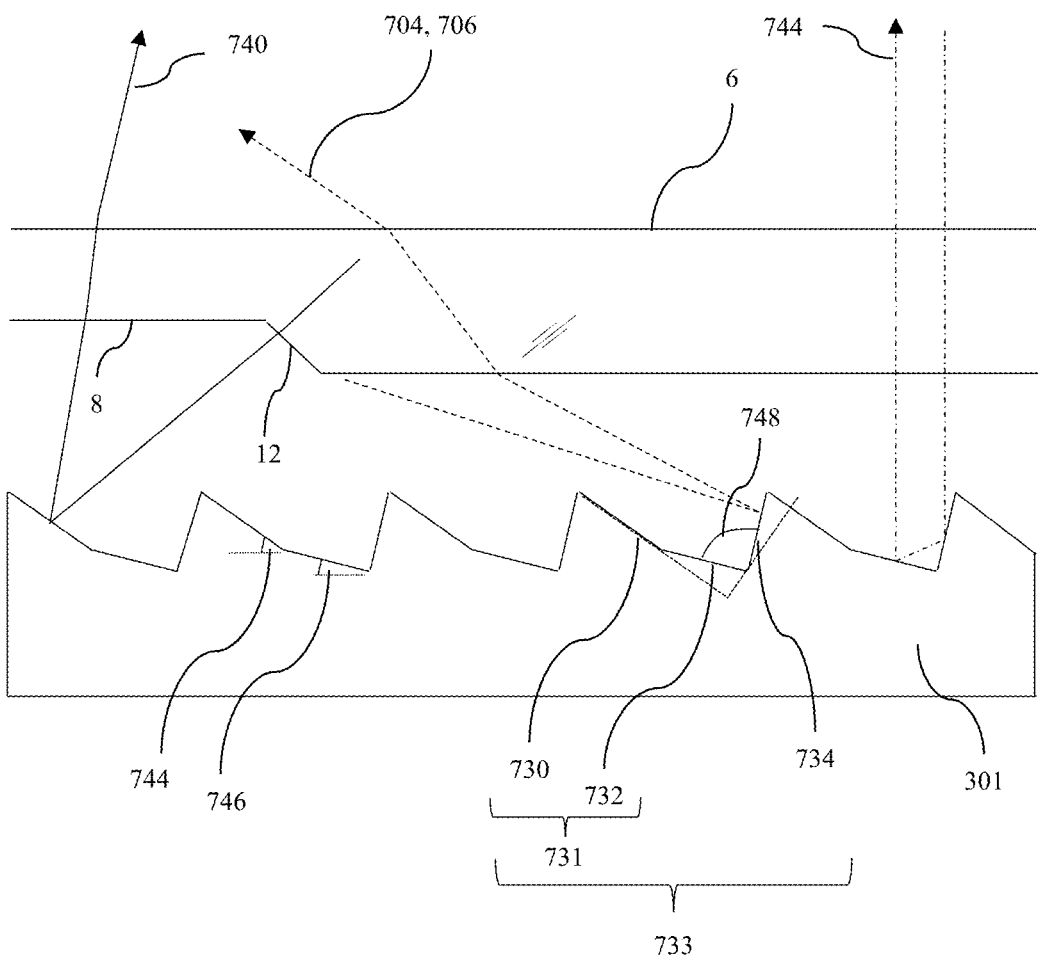
FIG. 77 is a schematic diagram illustrating in side view reflection of stray light from facets of a rear reflector comprising a kinked reflective facet, in accordance with the present disclosure.
Figure 78:
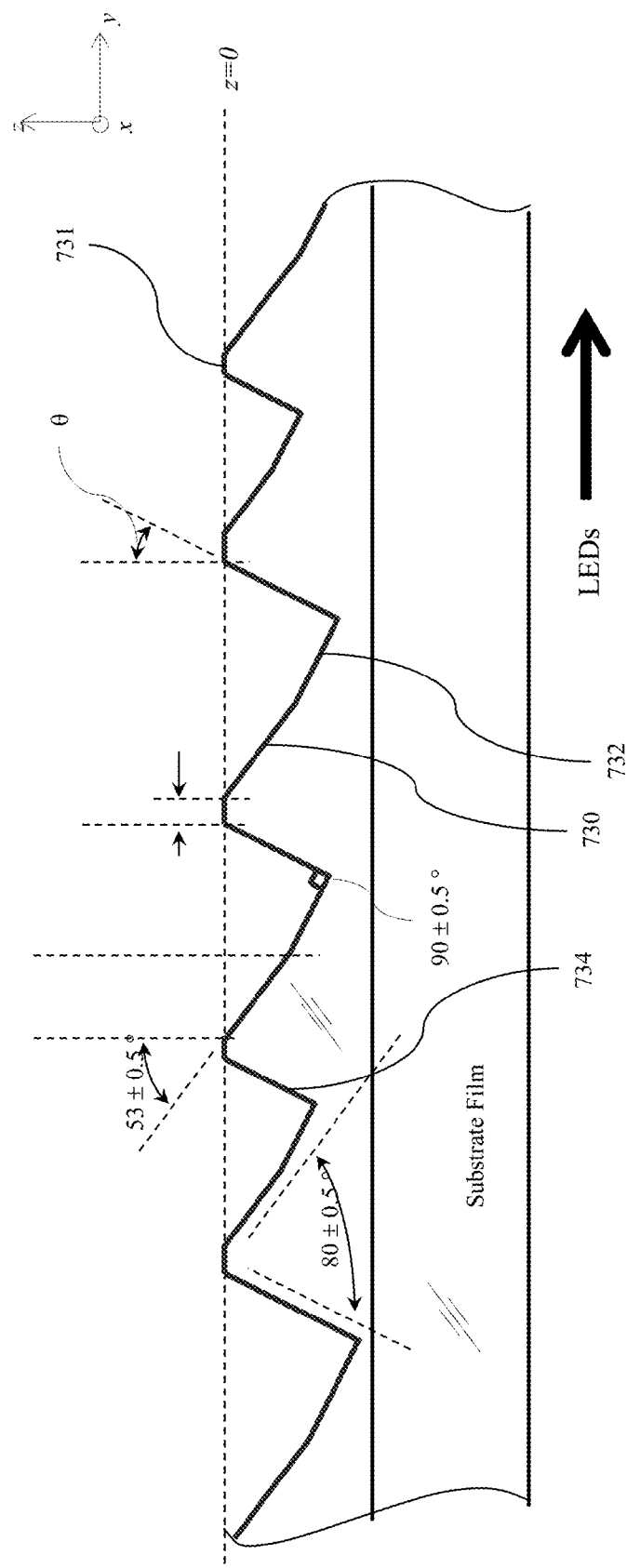
FIG. 78 is a schematic diagram illustrating in side view reflection of stray light from facets of a rear reflector comprising an array of kinked reflective facets, in accordance with the present disclosure.

FIG. 77 is a schematic diagram illustrating in side view reflection of stray light from facets of a rear reflector comprising a kinked reflective facet and FIG. 78 is a schematic diagram illustrating in side view reflection of stray light from facets of a rear reflector comprising an array of kinked reflective facets.

Thus a directional backlight may comprise a waveguide 1; an array 15 of light sources (not shown in these figures) arranged to input light into the waveguide 1 at different input positions laterally across the waveguide 1, wherein the waveguide 1 comprises first and second, opposed guide surfaces 6, 8 for guiding input light along the waveguide 1, the first guide surface 6 being arranged to guide light by total internal reflection, and the second guide surface 8 comprising: (a) a plurality of extraction features 12 that are (i) arranged to reflect some of the input light 742 so as to output it from the waveguide 1 through the first guide surface 6, the extraction features also transmitting some of the input light 740; and (b) intermediate regions 10 between the extraction features 12 that are arranged to guide light by total internal reflection; and a rear reflector 301 comprising a linear array of pairs 733 of reflective corner facets 731, 734 that are arranged to reflect at least some of the input light 740 that is transmitted through the extraction features 12 of the waveguide 1, so as to direct it back through the waveguide 1 to exit through the first guide surface 6, wherein each pair 733 of reflective corner facets 731, 734 includes a first facet 731 on which light 740 transmitted through the extraction features 12 of the waveguide is incident and second facet 734, each first facet 731 comprising an outer portion 730 and an inner portion 732 with different inclinations 744, 746.

The inner portion 732 may have a shallower inclination 746 than the inclination 744 of the outer portion 730. The inner portion 732 of the first facet 731 and the second facet 734 may have an internal angle 748 in a range from 85 to 95 degrees and preferably from 89.5 to 90.5 degrees.

In a similar manner to that shown for example in FIG. 35, the first facets 731 may be linear or as shown for example in FIG. 37 may be laterally curved to have optical power laterally so that the input light reflected from the reflective facets 731 laterally forms images of the light sources 15a-n in a second window plane 185 that is separated from the first window plane 191.

Further planar regions 731 may be provided between the facets 310 and draft facets 312 to provide improved mechanical durability in comparison to sharp points.

The embodiments related to stepped waveguide directional backlights may be applied with changes as necessary to the wedge directional backlight as described herein.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A directional backlight comprising:
    a waveguide;
    an array of light sources arranged to input light into the waveguide at different input positions laterally across the waveguide,
    wherein the waveguide comprises first and second, opposed guide surfaces for guiding input light along the waveguide, the first guide surface being arranged to guide light by total internal reflection, and the second guide surface comprising: (a) a plurality of extraction features that are (i) arranged to reflect some of the input light so as to output it from the waveguide through the first guide surface and (ii) laterally curved to have positive optical power laterally so that the input light reflected from the extraction features laterally forms real images of the light sources in front of the directional backlight in a first window plane that provide viewing windows, the extraction features also transmitting some of the input light; and (b) intermediate regions between the extraction features that are arranged to guide light by total internal reflection; and
    a rear reflector comprising a linear array of reflective facets that are (i) arranged to reflect at least some of the input light that is transmitted through the extraction features of the waveguide, so as to direct it back through the waveguide to exit through the first guide surface, and (ii) laterally curved to have optical power laterally so that the input light reflected from the reflective facets laterally forms images of the light sources in a second window plane that is separated from the first window plane.

2. A directional backlight according to claim 1, wherein the images formed from the input light reflected from the reflective facets are real images of the light sources in front of the directional backlight that provide further viewing windows.

3. A directional backlight according to claim 2, wherein the second window plane is closer to the directional backlight than the first window plane.

4. A directional backlight according to claim 2, wherein the second window plane is further from the directional backlight than the first window plane.

5. A directional backlight according to claim 1, wherein the images formed from the input light reflected from the reflective facets are virtual images of the light sources behind the directional backlight.

6. A directional backlight according to claim 1, wherein the waveguide further comprises a reflective end, the light sources being arranged to input light into the waveguide towards the reflective end, the reflective end being arranged to reflect the input light back along the waveguide, the extraction features being arranged to reflect some of the input light after reflection from the reflective end.

7. A directional backlight according to claim 6, wherein the waveguide further comprises a rear end opposite to the reflective end, and side surfaces between the first and second guide surfaces.

8. A directional backlight according to claim 7, wherein the array of light sources are arranged along the rear end.

9. A directional backlight according to claim 7, wherein the light sources include light sources arranged along a said side surface, and
the reflective end comprises first and second facets alternating with each other laterally, the first facets being reflective and forming reflective facets of a Fresnel reflector having positive optical power laterally, the second facets forming draft facets of the Fresnel reflector, the Fresnel reflector having an optical axis that is inclined towards said side surface in a direction in which the Fresnel reflector deflects input light from the array of light sources into the waveguide.

10. A directional backlight according to claim 1, herein the reflective end has positive optical power laterally.

11. A directional backlight according to claim 10, wherein the reflective end is a Fresnel reflector.

12. A directional backlight according to claim 1, wherein the rear reflector further comprises intermediate facets extending between the reflective facets of the rear reflector and inclined in opposite senses from the reflective facets of the rear reflector so that pairs of a reflective facet and an intermediate facet together form corner facets arranged to reflect at least some of the input light that is incident thereon.

13. A directional display device comprising:
a directional backlight according to claim 1; and
a transmissive spatial light modulator arranged to receive the output light from the waveguide and to modulate it to display an image.

14. A directional display apparatus comprising:
a directional display device according to claim 13; and
a control system arranged to control the light sources.

15. A directional backlight comprising:
a waveguide;
an array of light sources arranged to input light into the waveguide at different input positions laterally across the waveguide,
wherein the waveguide comprises first and second, opposed guide surfaces for guiding input light along the waveguide, the first guide surface being arranged to guide light by total internal reflection, and the second guide surface comprising: (a) a plurality of extraction features that are (i) arranged to reflect some of the input light so as to output it from the waveguide through the first guide surface, the extraction features also transmitting some of the input light; and (b) intermediate regions between the extraction features that are arranged to guide light by total internal reflection; and
a rear reflector comprising a linear array of pairs of reflective corner facets that are arranged to reflect at least some of the input light that is transmitted through the extraction features of the waveguide, so as to direct it back through the waveguide to exit through the first guide surface, wherein each pair of reflective corner facets includes a first facet on which light transmitted through the extraction features of the waveguide is incident and second facet, each first facet comprising an outer portion and an inner portion with different inclinations.

16. A directional backlight according to claim 15, wherein the inner portion has a shallower inclination than the outer portion.

17. A directional backlight according to claim 15, wherein the inner portion of the first facet and the second facet have an internal angle in a range from 89.5 to 90.5 degrees.

18. A directional backlight according to claim 15, wherein the first facets are laterally curved to have optical power laterally so that the input light reflected from the reflective facets laterally forms images of the light sources in a second window plane that is separated from the first window plane.

19. A directional backlight according to claim 15, wherein the waveguide further comprises a reflective end, the light sources being arranged to input light into the waveguide towards the reflective end, the reflective end being arranged to reflect the input light back along the waveguide, the extraction features being arranged to reflect some of the input light after reflection from the reflective end.

20. A directional backlight according to claim 19, wherein the waveguide further comprises a rear end opposite to the reflective end, and side surfaces between the first and second guide surfaces.

21. A directional backlight according to claim 20, wherein the array of light sources are arranged along the rear end.

22. A directional backlight according to claim 20, wherein the light sources include light sources arranged along a said side surface, and
the reflective end comprises first and second facets alternating with each other laterally, the first facets being reflective and forming reflective facets of a Fresnel reflector having positive optical power laterally, the second facets forming draft facets of the Fresnel reflector, the Fresnel reflector having an optical axis that is inclined towards said side surface in a direction in which the Fresnel reflector deflects input light from the array of light sources into the waveguide.

23. A directional backlight according to claim 15, wherein the reflective end has positive optical power laterally.

24. A directional backlight according to claim 23, wherein the reflective end is a Fresnel reflector.

25. A directional display device comprising:
a directional backlight according to claim 15; and
a transmissive spatial light modulator arranged to receive the output light from the waveguide and to modulate it to display an image.

26. A directional display apparatus comprising:
a directional display device according to claim 25; and
a control system arranged to control the light sources.

* * * * *